United States Patent
Yamada et al.

[11] Patent Number: 5,988,307
[45] Date of Patent: Nov. 23, 1999

[54] POWER TRANSMISSION APPARATUS, FOUR-WHEEL DRIVE VEHICLE WITH POWER TRANSMISSION APPARATUS INCORPORATED THEREIN, METHOD OF TRANSMITTING POWER, AND METHOD OF FOUR-WHEEL DRIVING

[75] Inventors: Eiji Yamada, Owariasahi; Masanao Shiomi; Takao Miyatani, both of Toyota; Yasutomo Kawabata; Ryouji Mizutani, both of Aichi-ken; Shigeru Matsuhashi, Toyota; Shoichi Sasaki, Mishima; Shigetaka Nagamatsu, Nissin; Kyomi Shimada; Hidetsugu Hamada, both of Toyota, all of Japan

[73] Assignee: Toyota Jidosha Kabushiki Kaisha, Toyota, Japan

[21] Appl. No.: 08/765,367

[22] PCT Filed: May 20, 1996

[86] PCT No.: PCT/JP96/01321

§ 371 Date: Feb. 27, 1997

§ 102(e) Date: Feb. 27, 1997

[87] PCT Pub. No.: WO96/36507

PCT Pub. Date: Nov. 21, 1996

[30] Foreign Application Priority Data

| May 19, 1995 | [JP] | Japan | 7-145575 |
| Aug. 9, 1995 | [JP] | Japan | 7-225869 |
| Aug. 29, 1995 | [JP] | Japan | 7-245462 |
| Aug. 29, 1995 | [JP] | Japan | 7-245463 |
| Aug. 29, 1995 | [JP] | Japan | 7-245464 |
| Sep. 4, 1995 | [JP] | Japan | 7-251944 |
| Sep. 19, 1995 | [JP] | Japan | 7-266475 |
| Sep. 22, 1995 | [JP] | Japan | 7-269241 |
| Sep. 22, 1995 | [JP] | Japan | 7-269242 |
| Sep. 22, 1995 | [JP] | Japan | 7-269243 |
| Oct. 24, 1995 | [JP] | Japan | 7-300742 |
| Dec. 15, 1995 | [JP] | Japan | 7-347862 |

[51] Int. Cl.⁶ ............................................. B60K 17/356
[52] U.S. Cl. ................................... 180/243; 180/65.3
[58] Field of Search ........................... 180/233, 242, 180/243, 65.3, 65.4, 65.1

[56] References Cited

U.S. PATENT DOCUMENTS 3,623,568 11/1971 Mori .

(List continued on next page.)

FOREIGN PATENT DOCUMENTS

58401/73 1/1975 Australia .

(List continued on next page.)

OTHER PUBLICATIONS

I.E.E. Proceedings—D/control Theory & Applications vol. 134 (1987), Nov., No. 6, Part D, Stevenage, Herts, Great Britain, J.R. Bumby et al., pp. 373–387.

*Primary Examiner*—Lanna Mai
*Assistant Examiner*—Avraham H. Lerner
*Attorney, Agent, or Firm*—Oliff & Berridge, PLC

[57] ABSTRACT

A clutch motor 30 that includes a rotatable outer rotor 32 and a rotatable inner rotor 34 and is driven to carry out power operation or regenerative operation is attached to an output shaft of an engine 50. The output of the clutch motor 30 is transmitted to front wheels 26 and 28 via a drive shaft 22A. An assist motor 40 is directly linked with a drive shaft 22B that transmits power to rear wheels 27 and 29. Slip rotation in the clutch motor 30 enables part of the energy of the engine 50 to be regenerated. The assist motor 40 is driven with at least part of the regenerated energy or energy stored in a battery 94. This structure allows torques to be output to the two different shafts and thereby realizes four-wheel-drive. In accordance with another possible structure, the assist motor 40 regenerates electric power, while the clutch motor 30 carries out over-drive operation. The structure of distributing power of the engine by the clutch motor may be replaced by another structure including a planetary gear 120 and two motors MG1 and MG2 to distribute the power by the planetary gear 120. This structure enables the power to be transmitted to one shaft by the output of the planetary gear 120 and to the other shaft by the output of the second motor MG2, thereby realizing four-wheel-drive.

40 Claims, 38 Drawing Sheets

U.S. PATENT DOCUMENTS

| | | |
|---|---|---|
| 3,683,249 | 8/1972 | Shibata . |
| 3,789,281 | 1/1974 | Shibata . |
| 4,319,140 | 3/1982 | Paschke . |
| 5,064,013 | 11/1991 | Lenz ............ 180/65.3 |
| 5,120,282 | 6/1992 | Fjällström . |
| 5,264,764 | 11/1993 | Kuang . |
| 5,301,764 | 4/1994 | Gardner . |
| 5,465,806 | 11/1995 | Higasa et al. ............ 180/242 |
| 5,495,906 | 3/1996 | Furutani ............ 180/65.2 |
| 5,564,519 | 10/1996 | Katoh et al. ............ 180/243 |

FOREIGN PATENT DOCUMENTS

| | | |
|---|---|---|
| 1-0-645-278 | 3/1995 | European Pat. Off. . |
| 1-0-725-474 | 8/1996 | European Pat. Off. . |
| 1-30-25-756 | 1/1982 | Germany . |
| 49-43311 | 4/1974 | Japan . |
| 51-22132 | 7/1976 | Japan . |
| 53-133814 | 11/1978 | Japan . |
| 55-103100 | 8/1980 | Japan . |
| 56-145702 | 11/1981 | Japan . |
| 57-97301 | 6/1982 | Japan . |
| 58-130704 | 8/1983 | Japan . |
| 63-38031 | 2/1988 | Japan . |
| 6-144020 | 5/1994 | Japan . |
| 2-267-364 | 12/1993 | United Kingdom . |
| WO 82/00928 | 3/1982 | WIPO . |

POWER TRANSMISSION APPARATUS, FOUR-WHEEL DRIVE VEHICLE WITH POWER TRANSMISSION APPARATUS INCORPORATED THEREIN, METHOD OF TRANSMITTING POWER, AND METHOD OF FOUR-WHEEL DRIVING

TECHNICAL FIELD

The present invention relates to a power transmission apparatus, a four-wheel drive vehicle with a power transmission apparatus incorporated therein as well as a method of transmitting power and a method of four-wheel driving. More particularly, the invention pertains to a power transmission apparatus for efficiently transmitting or utilizing power obtained by an engine and a four-wheel drive vehicle with such a power transmission apparatus incorporated therein.

BACKGROUND ART

Torque converters utilizing a fluid are generally used to convert an output torque of an engine or the like to a power and transmit the converted power. In the conventional fluid-based torque converters, an input shaft and an output shaft are not fully locked with each other and there is accordingly an energy loss corresponding to a slip occurring between the input shaft and the output shaft. The energy loss, which is consumed as a heat, is expressed as the product of the revolving speed difference between the input shaft and the output shaft and the torque transmitted at that time. In vehicles with such a power transmission apparatus mounted thereon, a large energy loss occurs in a transient state like a starting time. The efficiency of power transmission is not 100% even in stationary driving. Compared with manual transmissions, the torque converters lead to a lower fuel consumption.

A proposed power transmission apparatus does not use a fluid for torque conversion or power transmission unlike the conventional power transmission apparatuses, but transmits power through mechanical-electrical-mechanical conversion (for example, 'ARRANGEMENT OF ROTARY ELECTRIC MACHINES' disclosed in JAPANESE PATENT PUBLICATION GAZETTE No. 51-22132). The proposed technique couples an output of an engine with power transmission means including an electromagnetic coupling and a revolving armature and realizes a reduction ratio (ratio of torque conversion) of 1+P2/P1, wherein P1 and P2 respectively denote the number of poles in the revolving armature and the number of poles in the electromagnetic coupling. This structure has no energy loss by the fluid. It is accordingly possible to make the energy loss in the power transmission means relatively small by enhancing the efficiency of the electromagnetic coupling and the revolving armature.

This proposed power transmission apparatus, however, has a fixed ratio of torque conversion and is thus not applicable to vehicles or other mechanisms requiring a wide variation in conversion ratio. This system can not realize a desired conversion ratio according to the driving conditions of the vehicle and the engine. As discussed previously, the fluid-based system can not be free from the energy loss corresponding to the slip between the input shaft and the output shaft. These known power transmission apparatuses can transmit power only to one shaft and are thus not applicable for the four-wheel-drive vehicle.

One object of the present invention is thus to provide an improved power transmission apparatus that transmits or utilizes power output from an engine with a high efficiency and appropriately distributes the output of the engine to two different shafts. Another object of the invention is to provide a novel structure of four-wheel-drive vehicle with such an improved power transmission apparatus incorporated therein.

DISCLOSURE OF INVENTION

At least part of the above and the other related objects is realized by a first power transmission apparatus including a rotating shaft, to which power output from an engine is transmitted, and transmitting the power output from the engine and input to the rotating shaft to a first output shaft and a second output shaft, which is different from the first output shaft, the first power transmission apparatus including:

a first motor related to rotation of the rotating shaft;

distribution means for regulating distribution of the power input to the rotating shaft, power input to and output from the first output shaft in a mechanical form, and power input to and output from the first motor in an electrical form, in such a manner as to balance a total input power with a total output power;

a second motor linked with the second output shaft;

first power control means for controlling the power input to and output from the first motor in the electrical form, thereby varying a driving state of the first motor and controlling the distribution of the power executed in the distribution means; and second power control means for controlling operation of the second motor based on the power input to and output from the first motor in the electrical form by the first power control means, thereby regulating power output to the second output shaft.

In the first power transmission apparatus of the present invention, the first motor is connected to rotation of the rotating shaft, to which power of the engine is transmitted. The first power control means controls the power input to and output from the first motor in an electrical form. In response to the control of the power input to and output from the first motor in the electrical form, the distribution means regulates distribution of the power input to the rotating shaft, the power input to and output from the first output shaft in a mechanical form, and the power input to and output from the first motor in the electrical form, in such a manner as to balance a total input power with a total output power, thereby determining the power input to and output from the first output shaft. The second power control means controls operation of the second motor based on the power input to and output from the first motor in the electrical form by the first power control means, thereby regulating power output to the second output shaft. This structure enables the power of the engine to be transmitted to the first output shaft and the second output shaft which is different from the first output shaft.

The process of power distribution carried out by the distribution means is shown in FIG. 46 as the relationship between the revolving speed and the torque. When the engine is driven at a certain output, energy defined by torque T×revolving speed N is output to the rotating shaft. By way of example, it is assumed that the engine is driven at a driving point P1 defined by a revolving speed Ne and a torque Te and that the first output shaft is rotated at a revolving speed Ndf. Under such conditions, the distribution means takes out the energy corresponding to an area G1 in the electrical form and gives the energy as an output to the second output shaft. In case that the second output shaft is rotated at the same revolving speed Ndf as that of the first output shaft and all the energy taken out by the distribution means in the electrical form is output to the second output shaft, a torque Tdf satisfying the relationship of (Ne−Ndf)·Te =Ndf·Tdr is output to the second output shaft. Since the torque to the first output shaft is equal to Te, in case that the first output shaft and the second output shaft drive an identical object, the total torque is equal to (Te+Tdr). The object receiving the transmitted power is accordingly driven at a driving point P2 defined by the revolving speed Ndf and the torque (Te+Tdr). The power transmission apparatus of the present invention can thus be regarded as a device for implementing torque conversion based on the relationship between the torque and the revolving speed. Torque conversion may be carried out in a reverse direction, that is, from the driving point P2 to the driving point P1. In a four-wheel-drive vehicle discussed later, a first axle and a second axle are generally rotated at an identical revolving speed. By considering the power output to the axles based on the relationship between the torque and the revolving speed, the above discussion of torque conversion is also applicable to the four-wheel-drive vehicle.

In accordance with one preferable structure, the first power transmission apparatus further includes:

a third motor connected with the first output shaft; and third power control means for controlling operation of the third motor, so as to input and output power by the third motor to and from the first output shaft, to and from which the distribution means inputs and outputs the power in the mechanical form.

This preferable structure enables the input and output of the power by the third motor to be added to the power input to and output from the first output shaft. The power eventually input to and output from the first output shaft is thus not restricted to the range of the power mechanically input and output by the distribution means, but can be varied in a wider range.

There are several structures applicable to the distribution means in the first power transmission apparatus of the present invention. In accordance with one preferable structure, the first motor includes a first rotor mechanically linked with a rotating shaft of the engine and a second rotor that is electromagnetically connected with the first rotor so as to rotate relative to the first rotor and is mechanically linked with the first output shaft, thereby constituting the distribution means. In the power transmission apparatus of this structure, the first power control means and the second power control means includes: a first motor-driving circuit for controlling electromagnetic connection between the first rotor and the second rotor in the first motor by multi-phase alternating current, so as to enable transmission of electric power between the first motor-driving circuit and the first motor at least in one direction; a second motor-driving circuit for enabling transmission of electric power between the second motor-driving circuit and the second motor at least in one direction; and power distribution control means for controlling the first motor-driving circuit and the second motor-driving circuit to regulate distribution of the power input to and output from the first output shaft and the second output shaft.

In the power transmission apparatus of the preferable structure, the distribution means distributes the power input to the rotating shaft of the engine in the following manner. The power is input to and output from the first output shaft in the mechanical form based on the intensity of electromagnetic connection between the first rotor and the second rotor, whereas the power is input and output in the electrical form based on the revolving speed difference between the first rotor and the second rotor. The sum of the input and output powers is balanced except some loss due to friction or the like. The system having the distribution means constructed as a motor is hereinafter referred to as the electrical distribution system. In the power transmission apparatus of the electrical distribution system, the electric power can be transmitted between the first motor and the first motor-driving circuit and between the second motor and the second motor-driving circuit at least in one direction. The power distribution control means controls the first and the second motor-driving circuits, thus allowing the power to be freely distributed and output to the first output shaft and the second output shaft.

The power transmission apparatus of the electrical distribution system may further include a storage battery for storing at least part of electric power that is regenerated by either between the first motor and the first motor-driving circuit or between the second motor and the second motor-driving circuit, wherein the power distribution control means controls storage of electric power into the storage battery and discharge of electric power from the storage battery, in addition to the transmission of electric power between the first motor and the first motor-driving circuit and the transmission of electric power between the second motor and the second motor-driving circuit executed through the control of the first motor-driving circuit and the second motor-driving circuit, thereby regulating distribution of the power input to and output from the first output shaft and the second output shaft. In this case, there is no restriction of driving one motor with the electric power regenerated by the other motor. Namely it is not required to balance the electric power in the first motor-driving circuit with that in the second motor-driving circuit. This structure allows both the motors to carry out the power operation, and further increases the degree of freedom in control procedure.

In the power transmission apparatus of the electrical distribution system, the power distribution control means may include: regenerative operation control means for controlling the first motor-driving circuit, thereby enabling electric power corresponding to slip rotation between the first rotor and the second rotor to be regenerated by the first motor via the first motor-driving circuit; and power operation control means for enabling the second motor to carry out power operation via the second motor-driving circuit with at least part of the electric power regenerated by the first motor. In this structure, the first motor regenerates electric power via the first motor-driving circuit, while the second motor carries out the power operation with at least part of the regenerated electric power. The torque of the engine can thus be distributed freely to the first output shaft and the second output shaft.

In the power transmission apparatus of the above structure, the power distribution control means includes: first power operation control means for controlling the first motor-driving circuit, thereby enabling the first motor to carry out power operation by the electric power stored in said storage battery; and second power operation control means for controlling the second motor-driving circuit, thereby enabling the second motor to carry out power operation by the electric power stored in said storage battery. This structure enables both the motors to carry out the power operation, and thereby allows a large torque to be output from the first output shaft and the second output shaft.

Another preferable structure of the power transmission apparatus of the present invention is based on a mechanical distribution system. In the mechanical distribution system, the distribution means includes three-shaft power input-output means having three shafts respectively connected to a rotating shaft of the engine, the first output shaft, and a rotating shaft of the first motor, the three-shaft power input-output means determining power input to and output from the shaft connected to the first output shaft, based on powers input to and output from the shaft connected to the rotating shaft of the engine and the shaft connected to the rotating shaft of the first motor. In this power transmission apparatus, the first power control means and the second power control means includes: a first motor-driving circuit for enabling transmission of electric power between the first motor-driving circuit and the first motor at least in one direction; a second motor-driving circuit for enabling transmission of electric power between the second motor-driving circuit and the second motor at least in one direction; and power distribution control means for controlling the first motor-driving circuit and the second motor-driving circuit to regulate distribution of the power input to and output from the first output shaft and the second output shaft.

In the power transmission apparatus of the mechanical distribution system, the distribution means distributes the power input to the rotating shaft of the engine in the following manner. The three-shaft power input-output means determines the power input to and output from the shaft connected to the first output shaft, based on the predetermined powers input to and output from the shaft connected to the rotating shaft of the engine and the shaft connected to the rotating shaft of the first motor. The power is input to and output from the first output shaft in the mechanical form, whereas the power is input to and output from the first motor in the electrical form. In the power transmission apparatus of the mechanical distribution system, the electric power can be transmitted between the first motor and the first motor-driving circuit and between the second motor and the second motor-driving circuit at least in one direction. The power distribution control means controls the first and the second motor-driving circuits, thus allowing the power to be freely distributed and output to the first output shaft and the second output shaft.

Like the power transmission apparatus of the electrical distribution system, the power transmission apparatus of the mechanical distribution system may further include a storage battery for storing at least part of electric power that is regenerated by said first motor via said first motor-driving circuit and that is regenerated by said second motor via said second motor-driving circuit, wherein the power distribution control means controls storage of electric power into the storage battery and discharge of electric power from the storage battery, in addition to the transmission of electric power between the first motor and the first motor-driving circuit and the transmission of electric power between the second motor and the second motor-driving circuit executed through the control of the first motor-driving circuit and the second motor-driving circuit, thereby regulating distribution of the power input to and output from the first output shaft and the second output shaft.

Like the power transmission apparatus of the electrical distribution system, in the power transmission apparatus of the mechanical distribution system, the power distribution control means may include: regenerative operation control means for controlling the first motor-driving circuit, so as to enable electric power corresponding to a difference between the power input to and output from the rotating shaft of the engine and the power input to and output from the first output shaft to be regenerated by the first motor via the first motor-driving circuit; and power operation control means for enabling the second motor to carry out power operation via the second motor-driving circuit with at least part of the electric power regenerated by the first motor.

Like the power transmission apparatus of the electrical distribution system, in the power transmission apparatus of the mechanical distribution system, the power distribution control means may utilize the electric power stored in the storage battery and include: first power operation control means for controlling the first motor-driving circuit, thereby enabling the first motor to carry out power operation; and second power operation control means for controlling the second motor-driving circuit, thereby enabling the second motor to carry out power operation.

The present invention is also directed to a second power transmission apparatus for transmitting mechanical energy output from an engine via a rotating shaft to a first motor and enabling part of the transmitted mechanical energy to be converted to and taken out as electrical energy by the first motor, the residual mechanical energy being output to a first output shaft while at least part of the electrical energy taken out of the first motor being used to drive a second motor and being output to a second output shaft, which is different from the first output shaft, distribution of the mechanical energy transmitted to the first motor and the electrical energy taken out of the first motor being controlled to regulate power allocations output to the first output shaft and the second output shaft to target magnitudes respectively.

The second power transmission apparatus controls the distribution of the mechanical energy transmitted to the first motor and the electrical energy taken out of the first motor, and drives the second motor with at least part of the electrical energy. This structure enables power allocations output to the first output shaft and the second output shaft to be regulated to target magnitudes respectively.

The first power transmission apparatus discussed above may further include distribution determination means for determining distribution of power into a power allocation output to the first output shaft and a power allocation output to the second output shaft, wherein the first power control means and the second power control means carry out the control by setting the power allocations determined by the distribution determination means to target values.

In the power transmission apparatus of this structure, the distribution determination means determines the distribution of the power to the first output shaft and the second output shaft. The first power control means and the second power control means carry out the control by setting the predetermined power allocations to the respective target values. This structure carries out the control with priority to the distribution of the power input to and output from the first output shaft and the second output shaft.

In accordance with one preferable application, the power transmission apparatus having the third motor further includes: engine operation means for controlling power of the first motor via the first power control means, thereby enabling the engine to be driven within a desired operation range; and distribution determination means for determining distribution of power into a power allocation output to the first output shaft and a power allocation output to the second output shaft, wherein the third power control means carries out the control by setting the power allocation for the first output shaft determined by the distribution determination means to a target value, and the second power control means carries out the control by setting the power allocation for the second output shaft determined by the distribution determination means to a target value. This power transmission apparatus can freely control the distribution of the power input to and output from the first output shaft and the second output shaft, while driving the engine in a desired operating condition, for example, an operating condition to reduce the amount of fuel consumption.

In this power transmission apparatus, the first motor may include a first rotor mechanically linked with a rotating shaft of the engine and a second rotor that is electromagnetically connected with the first rotor so as to rotate relative to the first rotor and is mechanically linked with the first output shaft, thereby constituting the distribution means. In this case, the above control can be realized by the power transmission apparatus of the electrical distribution system.

Alternatively, in this power transmission apparatus, the distribution means may include three-shaft power input-output means having three shafts respectively connected to a rotating shaft of the engine, the first output shaft, and a rotating shaft of the first motor, the three-shaft power input-output means determining power input to and output from the shaft connected to the first output shaft, based on powers input to and output from the shaft connected to the rotating shaft of the engine and the shaft connected to the rotating shaft of the first motor. In this case, the above control can be realized by the power transmission apparatus of the mechanical distribution system.

In the first power transmission apparatus of the present invention, each of the first motor and the second motor (and the third motor if exists) may be a synchronous motor rotated by interaction between a revolving magnetic field formed by multi-phase alternating current and a magnetic field formed by a permanent magnet. The synchronous motor is small in size and light in weight but can generate a relatively large power, thus effectively reducing the size of the power transmission apparatus.

The present invention is also directed to a first four-wheel-drive vehicle for transmitting power independently to a first axle and a second axle of the vehicle, the first four-wheel-drive vehicle including:

an engine having a rotating shaft, from which power is taken out, the engine rotating the rotating shaft;

a first motor related to rotation of the rotating shaft;

distribution means for regulating distribution of power input to the rotating shaft, power input to and output from the first axle in a mechanical form and power input to and output from the first motor in an electrical form, in such manner as to balance a total input power with a total output power;

a second motor linked with the second axle;

first power control means for controlling the power input to and output from the first motor in the electrical form, thereby varying a driving state of the first motor and controlling the distribution of the power executed in the distribution means; and second power control means for controlling operation of the second motor based on the power input to and output from the first motor in the electrical form by the first power control means, thereby regulating power output to the second axle.

In the first four-wheel-drive vehicle of the present invention, the first motor is connected to rotation of the rotating shaft, to which power of the engine is transmitted. The first power control means controls the power input to and output from the first motor in an electrical form. In response to the control of the power input to and output from the first motor in the electrical form, the distribution means regulates distribution of the power input to the rotating shaft, the power input to and output from the first axle in a mechanical form, and the power input to and output from the first motor in the electrical form, in such a manner as to balance a total input power with a total output power, thereby determining the power input to and output from the first axle. The second power control means controls operation of the second motor based on the power input to and output from the first motor in the electrical form by the first power control means, thereby regulating power output to the second axle. This structure enables the power of the engine to be transmitted to the first axle and the second axle.

In accordance with one preferable application, the first four-wheel-drive vehicle further includes:

a third motor connected with the first axle; and third power control means for controlling operation of the third motor, so as to input and output power by said third motor to and from the first axle, to and from which the distribution means inputs and outputs the power in the mechanical form.

This preferable structure enables the input and output of the power by the third motor to be added to the power input to and output from the first axle. The power eventually input to and output from the first axle is thus not restricted to the range of the power mechanically input and output by the distribution means, but can be varied in a wider range.

In the four-wheel-drive vehicle of the above structure, the first motor includes a first rotor mechanically linked with the rotating shaft of the engine and a second rotor that is electromagnetically connected with the first rotor so as to rotate relative to the first rotor and is mechanically linked with the first axle, thereby constituting the distribution means, the first power control means and the second power control means including:

a first motor-driving circuit for controlling electromagnetic connection between the first rotor and the second rotor in the first motor by multi-phase alternating current, so as to enable transmission of electric power between the first motor-driving circuit and the first motor at least in one direction;

a second motor-driving circuit for enabling transmission of electric power between the second motor-driving circuit and the second motor at least in one direction; and power distribution control means for controlling the first motor-driving circuit and the second motor-driving circuit, so as to output the power of the engine to the first axle and the second axle at a predetermined distribution ratio.

In this structure, the distribution means is based on the electrical distribution system.

The four-wheel-drive vehicle of the electrical distribution system may further include a storage battery for storing at least part of electric power that is regenerated by the first motor via the first motor-driving circuit and that is regenerated by the second motor via the second motor-driving circuit, wherein the power distribution control means controls storage of electric power into the storage battery and discharge of electric power from the storage battery, in addition to the transmission of electric power between the first motor and the first motor-driving circuit and the transmission of electric power between the second motor and the second motor-driving circuit executed through the control of the first motor-driving circuit and the second motor-driving circuit, thereby regulating distribution of the power input to and output from the first axle and the second axle. In this case, there is no restriction of driving one motor with the electric power regenerated by the other motor. Namely it is not required to balance the electric power in the first motor-driving circuit with that in the second motor-driving circuit. This structure allows both the motors to carry out the power operation, and further increases the degree of freedom in control procedure.

In the four-wheel-drive vehicle of the electrical distribution system, the power distribution control means may include: regenerative operation control means for controlling the first motor-driving circuit, thereby enabling electric power corresponding to slip rotation between the first rotor and the second rotor to be regenerated by the first motor via the first motor-driving circuit; and power operation control means for enabling the second motor to carry out power operation via the second motor-driving circuit with at least part of the electric power regenerated by the first motor. In this structure, the first motor regenerates electric power via the first motor-driving circuit, while the second motor carries out the power operation with at least part of the regenerated electric power. The torque of the engine can thus be distributed freely to the first axle and the second axle. Such torque distribution enables an accelerating run and a free run of the vehicle as a whole.

Alternatively, in the four-wheel-drive vehicle of the electrical distribution system, the power distribution control means may include: regenerative operation control means for controlling the second motor-driving circuit, thereby enabling electric power to be regenerated by the second motor driven by rotation of the second axle; and power operation control means for enabling the first motor to carry out power operation via the first motor-driving circuit with at least part of the electric power regenerated by the second motor. In case of the four-wheel-drive vehicle, the four wheels are related to one another via the road surface. This enables the regenerative operation on the side of the second axle and the power operation on the side of the first axle. Such torque distribution enables an accelerating run, a free run, and braking of the vehicle as a whole.

In the four-wheel-drive vehicle having the storage battery, the power distribution control means may include: first regenerative operation control means for controlling the first motor-driving circuit, thereby enabling electric power corresponding to slip rotation between the first rotor and the second rotor to be regenerated by the first motor via the first motor-driving circuit; second regenerative operation control means for controlling the second motor-driving circuit, thereby enabling electric power to be regenerated by the second motor driven by rotation of the second axle; and means for storing at least part of the regenerated electric power into said storage battery.

This structure generates a braking force at least on the second axle, while enabling electric power to be recovered from both the motors linked with the respective axles and stored into the storage battery. The vehicle can thus be set in a free run state or in a braking state as a whole.

In the four-wheel-drive vehicle having the storage battery, the power distribution control means may utilize the electric power stored in the storage battery and include: first power operation control means for controlling the first motor-driving circuit, thereby enabling the first motor to carry out power operation; and second power operation control means for controlling the second motor-driving circuit, thereby enabling the second motor to carry out power operation. This structure allows the power to be given to both the axles utilizing the electric power of the storage battery. The power output to the axles, in combination with the driving force by the engine, sets the vehicle in a free run state or in an accelerating state. Compared with the state of regenerating electric power through the slip rotation in the first motor, the accelerating state outputs a greater power to the axles, thereby realizing higher acceleration. Even when the engine is at a stop, the driving force can be applied to the first axle and the second axle.

In the first four-wheel-drive vehicle of the above structure, the distribution means may include three-shaft power input-output means having three shafts respectively connected to the rotating shaft of the engine, the first axle, and a rotating shaft of the first motor, the three-shaft power input-output means determining power input to and output from the shaft connected to the first axle, based on powers input to and output from the shaft connected to the rotating shaft of the engine and the shaft connected to the rotating shaft of the first motor, the first power control means and the second power control means including:

a first motor-driving circuit for enabling transmission of electric power between the first motor-driving circuit and the first motor at least in one direction;

a second motor-driving circuit for enabling transmission of electric power between the second motor-driving circuit and the second motor at least in one direction; and power distribution control means for controlling the first motor-driving circuit and the second motor-driving circuit to regulate distribution of the power input to and output from the first axle and the second axle.

In this structure, the distribution means is based on the mechanical distribution system.

In the four-wheel-drive vehicle of the mechanical distribution system, the distribution means distributes the power input to the rotating shaft of the engine in the following manner. The three-shaft power input-output means determines the power input to and output from the shaft connected to the first axle, based on the predetermined powers input to and output from the shaft connected to the rotating shaft of the engine and the shaft connected to the rotating shaft of the first motor. The power is input to and output from the first axle in the mechanical form, whereas the power is input to and output from the first motor in the electrical form. In the four-wheel-drive vehicle of the mechanical distribution system, the electric power can be transmitted between the first motor and the first motor-driving circuit and between the second motor and the second motor-driving circuit at least in one direction. The power distribution control means controls the first and the second motor-driving circuits, thus allowing the power to be freely distributed and output to the first axle and the second axle.

Like the four-wheel-drive of the electrical distribution system, the four-wheel-drive vehicle of the mechanical distribution system may further include a storage battery for storing at least part of electric power that is regenerated by either between the first motor and the first motor-driving circuit or between the second motor and the second motor-driving circuit, wherein the power distribution control means controls storage of electric power into the storage battery and discharge of electric power from the storage battery, in addition to the transmission of electric power between the first motor and the first motor-driving circuit and the transmission of electric power between the second motor and the second motor-driving circuit executed through the control of the first motor-driving circuit and the second motor-driving circuit, thereby regulating distribution of the power input to and output from the first axle and the second axle.

Like the four-wheel-drive of the electrical distribution system, in the four-wheel-drive vehicle of the mechanical distribution system, the power distribution control means may include: regenerative operation control means for controlling the first motor-driving circuit, so as to enable electric power corresponding to a difference between the power input to and output from the rotating shaft of the engine and the power input to and output from the first axle to be regenerated by the first motor via the first motor-driving circuit; and power operation control means for enabling the second motor to carry out power operation via the second motor-driving circuit with at least part of the electric power regenerated by the first motor.

Like the four-wheel-drive of the electrical distribution system, in the four-wheel-drive vehicle of the mechanical distribution system, the power distribution control means may include: regenerative operation control means for controlling the second motor-driving circuit, thereby enabling electric power to be regenerated by the second motor driven by rotation of the second axle; and power operation control means for enabling the first motor to carry out power operation via the first motor-driving circuit with at least part of the electric power regenerated by the second motor.

Like the four-wheel-drive of the electrical distribution system, in the four-wheel-drive vehicle of the mechanical distribution system having the storage battery, the power distribution control means may include: first regenerative operation control means for controlling the first motor-driving circuit, so as to enable electric power corresponding to a difference between the power input to and output from the rotating shaft of the engine and the power input to and output from the first axle to be regenerated by the first motor via the first motor-driving circuit; and second regenerative operation control means for controlling the second motor-driving circuit, thereby enabling electric power to be regenerated by the second motor driven by rotation of the second axle, wherein at least part of the regenerated electric power is stored into the storage battery.

In the four-wheel-drive vehicle having the storage battery, the power distribution control means may utilize the electric power stored in the storage battery and include: first power operation control means for controlling the first motor-driving circuit, thereby enabling the first motor to carry out power operation; and second power operation control means for controlling the second motor-driving circuit, thereby enabling the second motor to carry out power operation.

The present invention is further directed to a second four-wheel-drive vehicle for transmitting mechanical energy output from an engine via a rotating shaft to a first motor and enabling part of the transmitted mechanical energy to be converted to and taken out as electrical energy by the first motor, the residual mechanical energy being output to a first axle while at least part of the electrical energy taken out of the first motor being used to drive a second motor and being output to a second axle, distribution of the mechanical energy transmitted to the first motor and the electrical energy taken out of the first motor being controlled to regulate power allocations output to the first axle and the second axle to target magnitudes respectively.

The second four-wheel-drive vehicle controls the distribution of the mechanical energy transmitted to the first motor and the electrical energy taken out of the first motor, and drives the second motor with at least part of the electrical energy. This structure enables power allocations output to the first axle and the second axle to be regulated to target magnitudes respectively.

The second four-wheel-drive vehicle discussed above may further include distribution determination means for determining distribution of power into a power allocation output to the first axle and a power allocation output to the second axle, wherein the first power control means carries out the control by setting the distribution of power determined by the distribution determination means to a target value.

In the four-wheel-drive vehicle of this structure, the distribution determination means determines the distribution of the power to the first axle and the second axle. The first power control means and the second power control means carry out the control by setting the predetermined power allocations to the respective target values. This structure carries out the control with priority to the distribution of the power input to and output from the first axle and the second axle.

In accordance with one preferable application, the four-wheel-drive vehicle having the third motor further includes: engine operation means for controlling power of the first motor via the first power control means, thereby enabling the engine to be driven within a desired operation range; and distribution determination means for determining distribution of power into a power allocation output to the first axle and a power allocation output to the second axle, wherein the third power control means carries out the control by setting the power allocation for the first axle determined by the distribution determination means to a target value, and the second power control means carries out the control by setting the power allocation for the second axle determined by the distribution determination means to a target value. This four-wheel-drive vehicle can freely control the distribution of the power input to and output from the first axle and the second axle, while driving the engine in a desired operating condition, for example, an operating condition to reduce the amount of fuel consumption.

In this four-wheel-drive vehicle, the first motor may include a first rotor mechanically linked with the rotating shaft of the engine and a second rotor that is electromagnetically connected with the first rotor so as to rotate relative to the first rotor and is mechanically linked with the first axle, thereby constituting the distribution means. In this case, the above control can be realized by the electrical distribution system.

Alternatively, in this four-wheel-drive vehicle, the distribution means may include three-shaft power input-output means having three shafts respectively connected to the rotating shaft of the engine, the first axle, and a rotating shaft of the first motor, the three-shaft power input-output means determining power input to and output from the shaft connected to the first axle, based on powers input to and output from the shaft connected to the rotating shaft of the engine and the shaft connected to the rotating shaft of the first motor. In this case, the above control can be realized by the mechanical distribution system.

The present invention is also directed to a third four-wheel-drive vehicle including a power transmission apparatus for transmitting power of an engine to a first axle of the vehicle and a second axle, which is not in direct mechanical connection with the first axle, the four-wheel-drive vehicle including:

the engine having a rotating shaft for outputting the power, the engine rotating the rotating shaft;

a first motor including a first rotor mechanically linked with the rotating shaft of the engine and a second rotor electromagnetically connected with the first rotor so as to rotate relative to the first rotor, the second rotor being mechanically linked with the first axle;

a first motor-driving circuit for controlling electromagnetic connection between the first rotor and the second rotor in the first motor by multi-phase alternating current, so as to enable transmission of electric power between the first motor-driving circuit and the first motor at least in one direction;

a second motor including a third rotor mechanically linked with another rotating shaft of the engine and a fourth rotor electromagnetically connected with the third rotor so as to rotate relative to the third rotor, the fourth rotor being mechanically linked with the second axle;

a second motor-driving circuit for controlling electromagnetic connection between the third rotor and the fourth rotor in the second motor by multi-phase alternating current, so as to enable transmission of electric power between the second motor-driving circuit and the second motor at least in one direction; and power distribution control means for controlling the first motor-driving circuit and the second motor-driving circuit, thereby enabling the power of the engine to be output to the first axle and the second axle at a predetermined distribution ratio.

In the third four-wheel-drive vehicle, the motors of an identical structure having the rotors that relatively rotate to each other are arranged in a pathway from either ends of the rotating shaft of the engine to the first axle and the second axle. This structure controls the power transmission between the motors attached to the respective axles and the motor-driving circuits, thereby enabling the power of the engine to be freely distributed and output to the first axle and the second axle.

The third four-wheel-drive vehicle may further include a storage battery for storing at least part of electric power that is regenerated by either between the first motor and the first motor-driving circuit or between the second motor and the second motor-driving circuit, wherein the power distribution control means includes storage battery control means for controlling storage of electric power into the storage battery and/or discharge of electric power from the storage battery, in addition to regeneration and consumption of electric power through the control of the first motor-driving circuit and the second motor-driving circuit. In this case, it is not required to balance the electric power in the first motor with the electric power in the second motor. The power transmission including the storage battery allows the distribution of the power to the first axle and the second axle to be further freely controlled.

The present invention is further directed to a fourth four-wheel-drive vehicle including a power transmission apparatus for transmitting power of an engine to a first axle and a second axle of the vehicle, the four-wheel-drive vehicle including:

the engine having a rotating shaft for outputting the power, the engine rotating the rotating shaft;

a first motor including a first rotor mechanically linked with the rotating shaft of the engine and a second rotor electromagnetically connected with the first rotor so as to rotate relative to the first rotor, the second rotor being mechanically linked with the first axle;

a first motor-driving circuit for controlling electromagnetic connection between the first rotor and the second rotor in the first motor by multi-phase alternating current, so as to enable transmission of electric power between the first motor-driving circuit and the first motor at least in one direction;

a second motor linked with the second axle, which is not in direct mechanical connection with the first axle;

a second motor-driving circuit for enabling transmission of electric power between the second motor-driving circuit and the second motor at least in one direction; and braking force control means for controlling the first motor-driving circuit and the second motor-driving circuit, thereby giving a braking torque to the first axle and/or the second axle.

In the fourth four-wheel-drive vehicle, the braking force is applied to the first axle and/or the second axle by controlling the first motor-driving circuit and the second motor-driving circuit. This structure realizes free regulation of the braking force in the four-wheel-drive vehicle. During the braking operation, energy is regenerated either via the first motor-driving circuit or the second motor-driving circuit. This further enhances the energy efficiency of the vehicle.

The present invention is also directed to a method of controlling distribution of power input from an engine via a rotating shaft into a power allocation input to and output from a first output shaft connected to a first motor and a power allocation input to and output from a second output shaft which is different from the first output shaft and linked with a second motor, the method including the steps of:

providing distribution means for regulating distribution of the power input to the rotating shaft, the power input to and output from the first output shaft in a mechanical form, and power input to and output from the first motor in an electrical form, in such a manner as to balance a total input power with a total output power;

controlling the power input to and output from the first motor in the electrical form, thereby varying a driving state of the first motor and controlling the distribution of the power executed in the distribution means; and controlling operation of the second motor based on the power input to and output from the first motor in the electrical form through the operation of the distribution means, thereby regulating the power output to the second output shaft.

The present invention is further directed to a method of controlling four-wheel-drive, the method controlling distribution of power input from an engine via a rotating shaft into a power allocation input to and output from a first axle connected to a first motor and a power allocation input to and output from a second axle which is different from the first axle and linked with a second motor, the method including the steps of:

providing distribution means for regulating distribution of the power input to the rotating shaft, the power input to and output from the first axle in a mechanical form, and power input to and output from the first motor in an electrical form, in such a manner as to balance a total input power with a total output power;

controlling the power input to and output from the first motor in the electrical form, thereby varying a driving state of the first motor and controlling the distribution of the power executed in the distribution means; and controlling operation of the second motor based on the power input to and output from the first motor in the electrical form through the operation of the distribution means, thereby regulating the power output to the second axle.

In any of the above structures of the present invention, the engine may be an internal combustion engine, such as a gasoline engine or a Diesel engine, a rotary engine, a gas turbine, a starling engine, or the like. The engine may be subjected to a control in a stationary operating condition, to an on-off control, to an output control according to the accelerator pedal position or the required torque. When the structure has the storage battery, the engine may be controlled according to the charging state of the storage battery. It is also natural that the engine is controlled according to the comprehensive state of the whole vehicle.

A variety of motors are applicable for the first motor and the second motor. Available examples include permanent magnet-type synchronous motors, permanent magnet-type DC motors, standard DC motors, induction motors, reluctance-type synchronous motors, permanent magnet-type or reluctance-type vernier motors, stepping motors, and superconducting motors. The motor-driving circuits for controlling these motors are selected according to the type of the motors. Available examples include IGBT inverters, transistor inverters, thyristor inverters, voltage PWM inverters, electric current inverters, and resonance inverters. Any structure that can store the regenerated energy, such as a lead battery, a nickel-hydrogen (NiMH) battery, a lithium battery, a large-scaled capacitor, and a mechanical fly wheel, may be adopted for the storage battery. When the regenerated electric power exceeds the capacity of the storage battery, the excess electric power may be utilized, for example, methane reforming, and stored in the form of hydrogen gas.

These and other objects, features, aspects, and advantages of the present invention will become more apparent from the following detailed description of the preferred embodiments with the accompanying drawings.

BEST MODES FOR CARRYING OUT INVENTION

Figure 1:
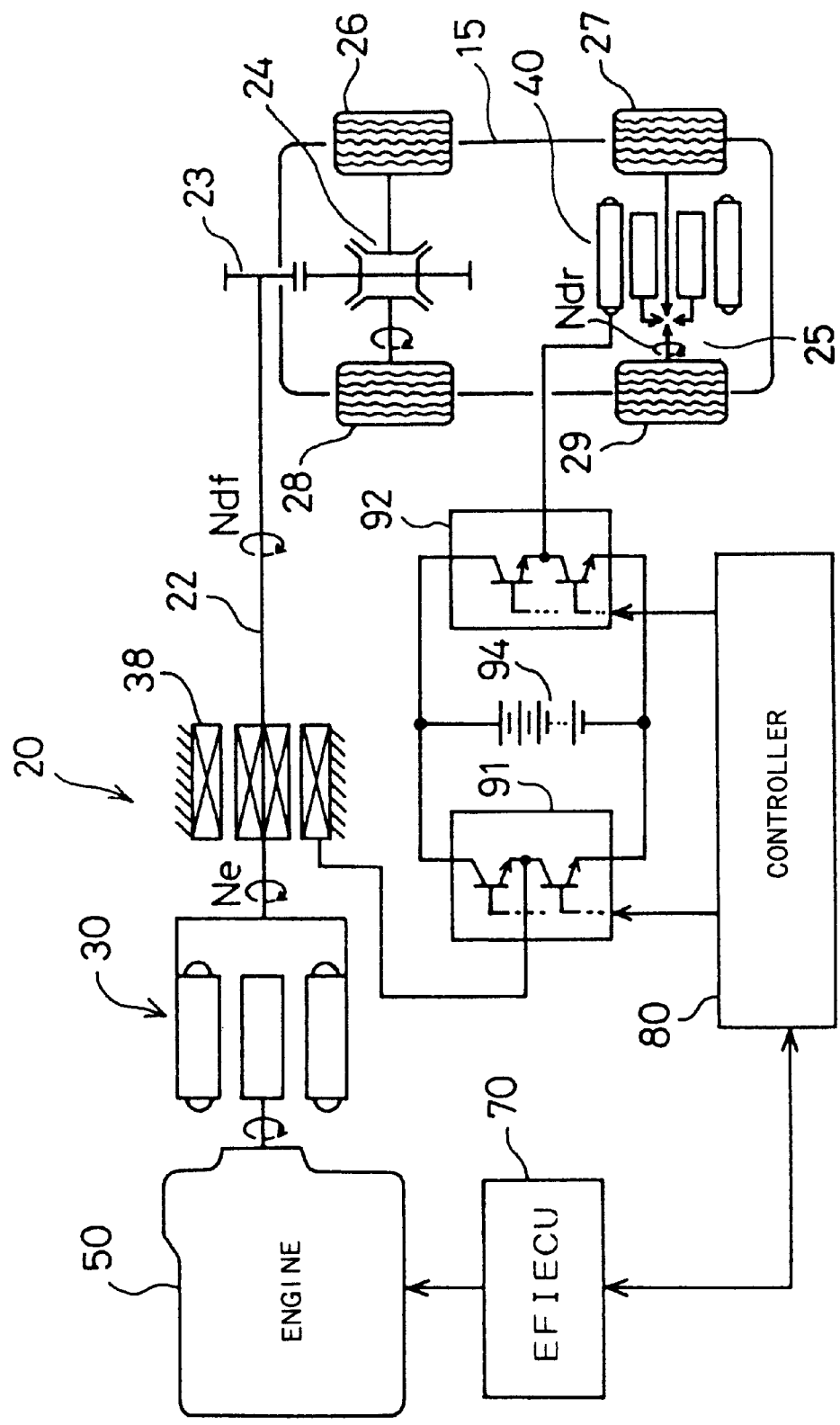
FIG. 1 schematically illustrates structure of a four-wheel-drive vehicle 15 as a first embodiment according to the present invention.
Figure 2:
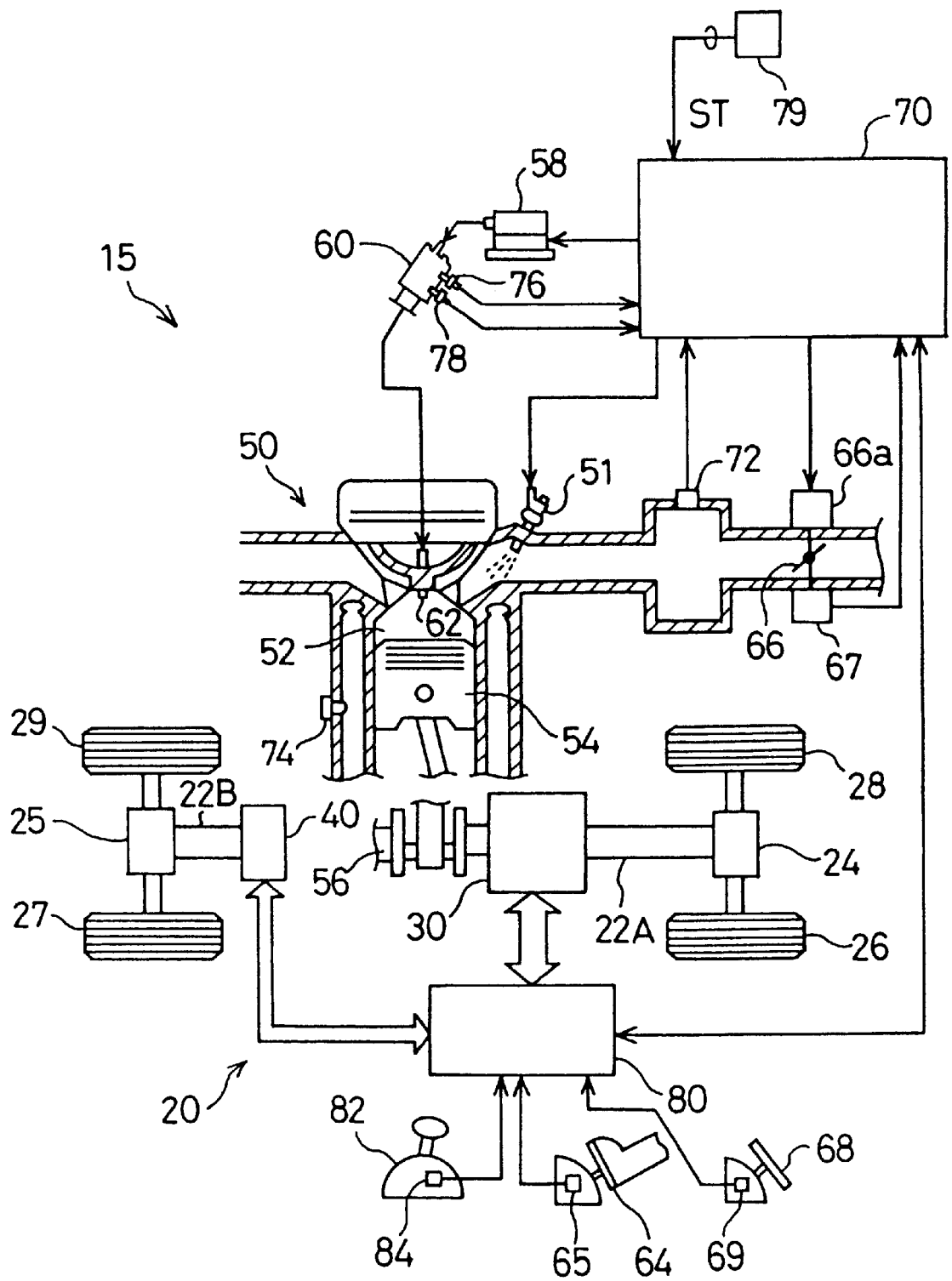
FIG. 2 illustrates general structure of the four-wheel-drive vehicle 15 of FIG. 1.
Figure 3:
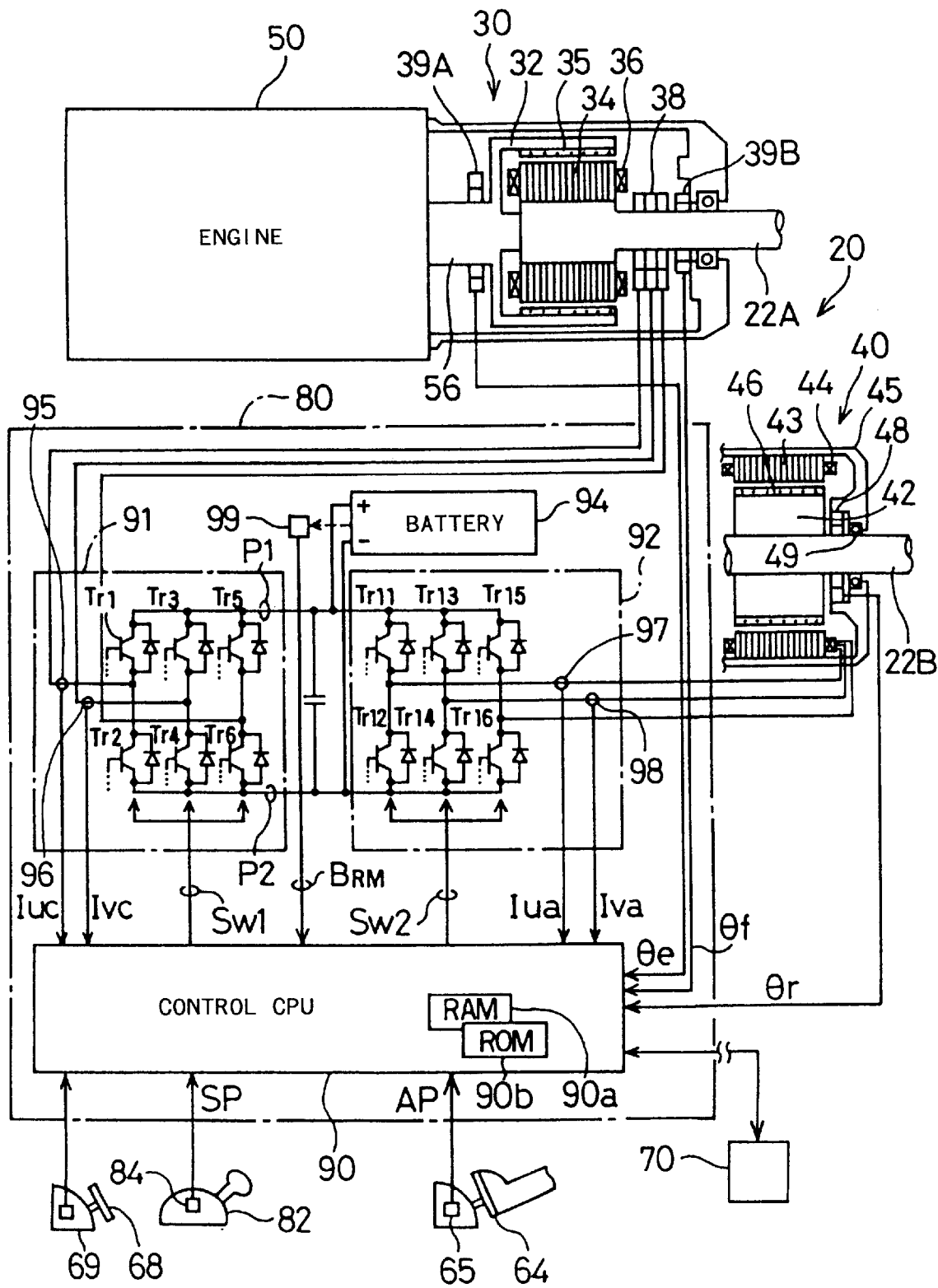
FIG. 3 schematically illustrates structure of a power transmission apparatus 20 incorporated in the four-wheel-drive vehicle 15 of FIG. 1 including electrical connection.

Some modes of carrying out the present invention are described as preferred embodiments. FIG. 1 schematically illustrates structure of a four-wheel-drive vehicle 15 with a power transmission apparatus 20 incorporated therein as a first embodiment according to the present invention; FIG. 2 schematically illustrates general structure of the four-wheel-drive vehicle 15 including an engine 50; and FIG. 3 shows details of electrical structure of the four-wheel-drive vehicle 15 of FIG. 1. The general structure of the vehicle is described first based on FIG. 2 for convenience.

Referring to FIG. 2, the vehicle is provided with an engine 50 driven by gasoline. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by a motor 66a. An ignition plug 62 converts a high voltage applied from an igniter 58 via a distributor 60 to a spark, which explosively ignites and combusts the air/fuel mixture. The energy obtained through the explosion and combustion works as a power source for driving the vehicle.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting a valve travel or position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The crankshaft 56 of the engine 50 is linked with a drive shaft 22A via a clutch motor 30. The drive shaft 22A further connects with a differential gear 24 for driving front wheels via a reduction gear 23, so that a torque output from the drive shaft 22A is eventually transmitted to left and right front wheels 26 and 28. An assist motor 30 connects with left and right rear wheels 27 and 29 via a differential gear 25 for driving rear wheels. The vehicle 15 is accordingly constructed as the four-wheel-drive vehicle, wherein the front wheels 26 and 28 are driven by the engine 50 and the clutch motor 30 and the rear wheels 27 and 29 are driven by the assist motor 40.

The clutch motor 30 and the assist motor 40 are controlled by a controller 80. The controller 80 includes an internal control CPU and receives inputs from a gearshift position sensor 84 attached to a gearshift 82, an accelerator pedal position sensor 65 attached to an accelerator pedal 64 for measuring the amount of operation of the accelerator pedal 64, a brake pedal position sensor 69 for measuring the amount of operation of the brake pedal 68, as described later in detail. The controller 80 sends and receives a variety of data and information to and from the EFIECU 70 through communication. Details of the control procedure including a communication protocol will be described later.

The following describes the structure of the power transmission apparatus 20. Referring to FIG. 3, the power transmission apparatus 20 essentially includes the engine 50 for generating power, the clutch motor 30 with an outer rotor 32 mechanically linked with one end of the crankshaft 56 of the engine 50, the assist motor 40 that is separate from the clutch motor 30 and has a rotor 42 linked with a rear-wheel drive shaft 22B, and the controller 80 for driving and controlling the clutch motor 30 and the assist motor 40.

Figure 4:
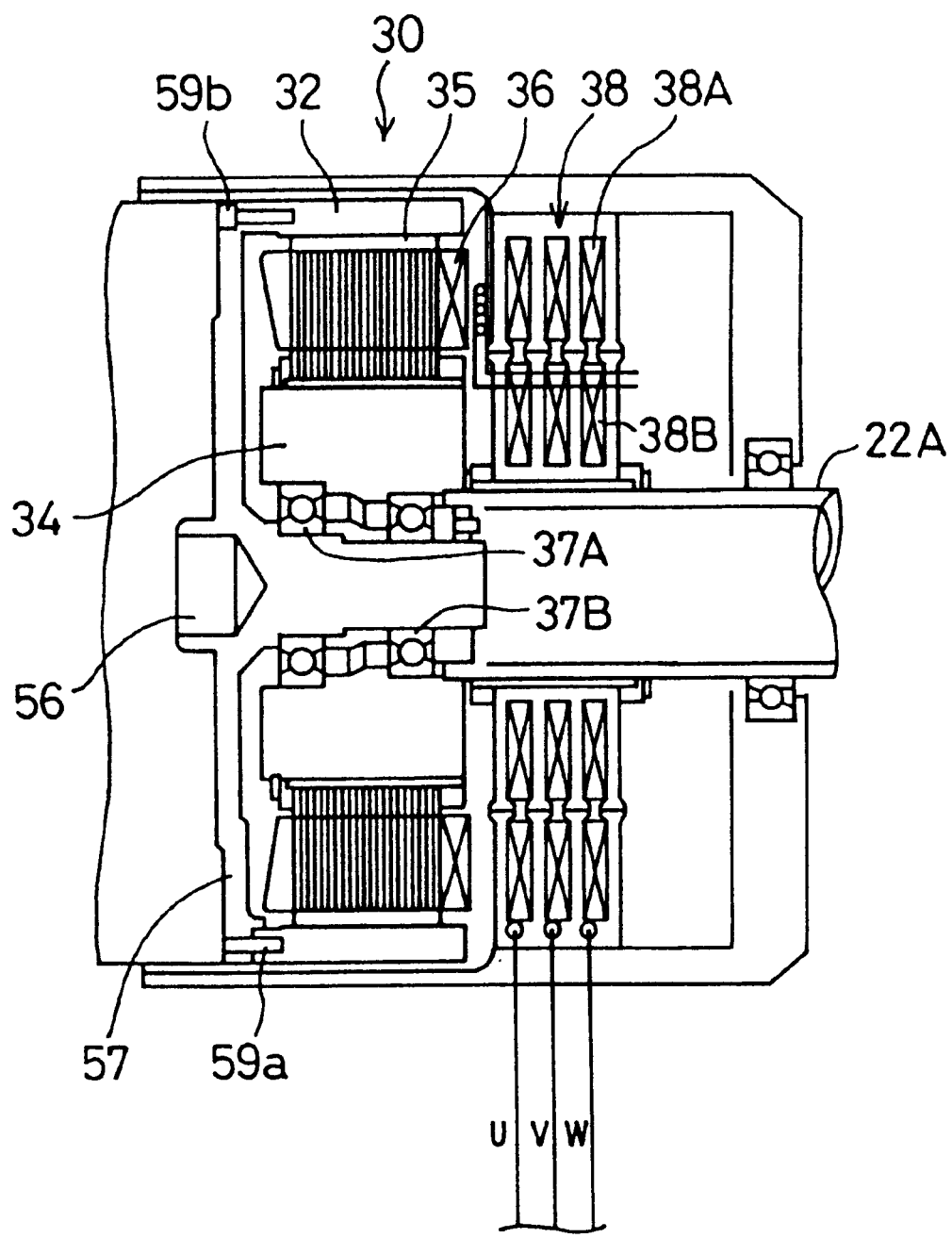
FIG. 4 is a cross sectional view illustrating structure of the clutch motor 30 of the first embodiment.

Structure of the clutch motor 30 and the assist motor 40 is described with FIGS. 3 and 4. As shown in FIGS. 3 and 4, the clutch motor 30 is constructed as a synchronous motor having permanent magnets 35 attached to an inner surface of the outer rotor 32 and three-phase coils 36 wound on slots formed in an inner rotor 34. Electric power is transmitted between the clutch motor 30 and the three-phase coils 36 via a rotary transformer 38. As discussed later in detail, the clutch motor 30 supplies electric power to the three-phase coils 36 for power control and receives electric power from the three-phase coils 36 for regenerative control. Laminated sheets of non-directional electromagnetic steel are used to form teeth and slots for the three-phase coils 36 in the inner rotor 34. The inner rotor 34 is connected with the drive shaft 22A, and the force rotating the drive shaft 22A is amplified by the reduction ratio (approximately 1:4 in this embodiment) of the reduction gear 23 and used as the driving force of the front wheels 26 and 28. A resolver 39A is attached to the crankshaft 56 for measuring a rotational angle θe of the crankshaft 56, and a resolver 39B is attached to the drive shaft 22A for measuring a rotational angle θf of the drive shaft 22A. The controller 80 receives data of rotational angle (electrical angle) of the inner rotor 34 relative to the outer rotor 32 in the clutch motor 30, based on the rotational angle θe of the crankshaft 56 and the rotational angle θf of the drive shaft 22A measured by the resolvers 39A and 39B.

Like the clutch motor 30, the assist motor 40 that is separate from the clutch motor 30 is also constructed as a synchronous motor having three-phase coils 44, which are wound on a stator 43 fixed to a casing 45 to generate a revolving magnetic field. The stator 43 is also made of laminated sheets of non-directional electromagnetic steel. A plurality of permanent magnets 46 are attached to an outer surface of the rotor 42. In the assist motor 40, interaction between a magnetic field formed by the permanent magnets 46 and a revolving magnetic field formed by the three-phase coils 44 results in rotations of the rotor 42 during the power operation. Electric power is taken out of the three-phase coils 44 by the rotations of the rotor 42, on the other hand, during the regenerative operation. The rotor 42 is mechanically linked with the drive shaft 22B for driving the rear wheels 27 and 29. A resolver 48 is attached to the drive shaft 22B, for measuring a rotational angle θr of the drive shaft 22B. The drive shaft 22B is supported by a bearing 49 held in the casing 45.

While the assist motor 40 is constructed as a conventional permanent magnet-type three-phase synchronous motor, the clutch motor 30 includes two rotating elements or rotors, that is, the outer rotor 32 with the permanent magnets 35 mounted thereon and the inner rotor 34 with the three-phase coils 36 attached thereto. The detailed structure of the clutch motor 30 is described with the cross sectional view of FIG. 4. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22A is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30 and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38A fixed to the casing 45 and secondary windings 38B attached to the drive shaft 22A coupled with the inner rotor 34. Electromagnetic induction enables electric power to be transmitted from the primary windings 38A to the secondary windings 38B or vice versa. The rotary transformer 38 has windings for the three phases, that is, U, V, and W phases, to allow for the transmission of three-phase electric currents.

Interaction between a magnetic field formed by one adjoining pair of permanent magnets 35 and a revolving magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (the number of revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 functioning as the constituent of the distribution means and corresponding to the first motor in the present invention and the assist motor 40 corresponding to the second motor in the present invention will be described later, based on the flowcharts.

As mentioned above, the clutch motor 30 and the assist motor 40 are driven and controlled by the controller 80. Referring back to FIG. 3, the controller 80 includes a first driving circuit 91 for supplying and receiving electric power to and from the clutch motor 30, a second driving circuit 92 for supplying and receiving electric power to and from the assist motor 40, a control CPU 90 for controlling both the first and the second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data via the input port. The input data include a rotational angle θe of the crankshaft 56 of the engine 50 measured with the resolver 39A, a rotational angle θf of the drive shaft 22A measured with the resolver 39B, a rotational angle θr of the drive shaft 22B measured with the resolver 48, an accelerator pedal position AP (step-on amount of the accelerator pedal 64) output from the accelerator pedal position sensor 65, a gearshift position SP output from the gearshift position sensor 84, a brake pedal position BP output from the brake pedal position sensor 69, clutch motor currents Iuc and Ivc from two ammeters 95 and 96 disposed in the first driving circuit 91, assist motor currents Iua and Iva from two ammeters 97 and 98 disposed in the second driving circuit 92, and a remaining charge BRM of the battery 94 measured with a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 thus successively controls the power-on time of the paired transistors Tr1 through Tr6. The electric current flowing through each coil 36 undergoes PWM (pulse width modulation) to give a quasi-sine wave, which enables the three-phase coils 36 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form a revolving magnetic field.

Figure 46:
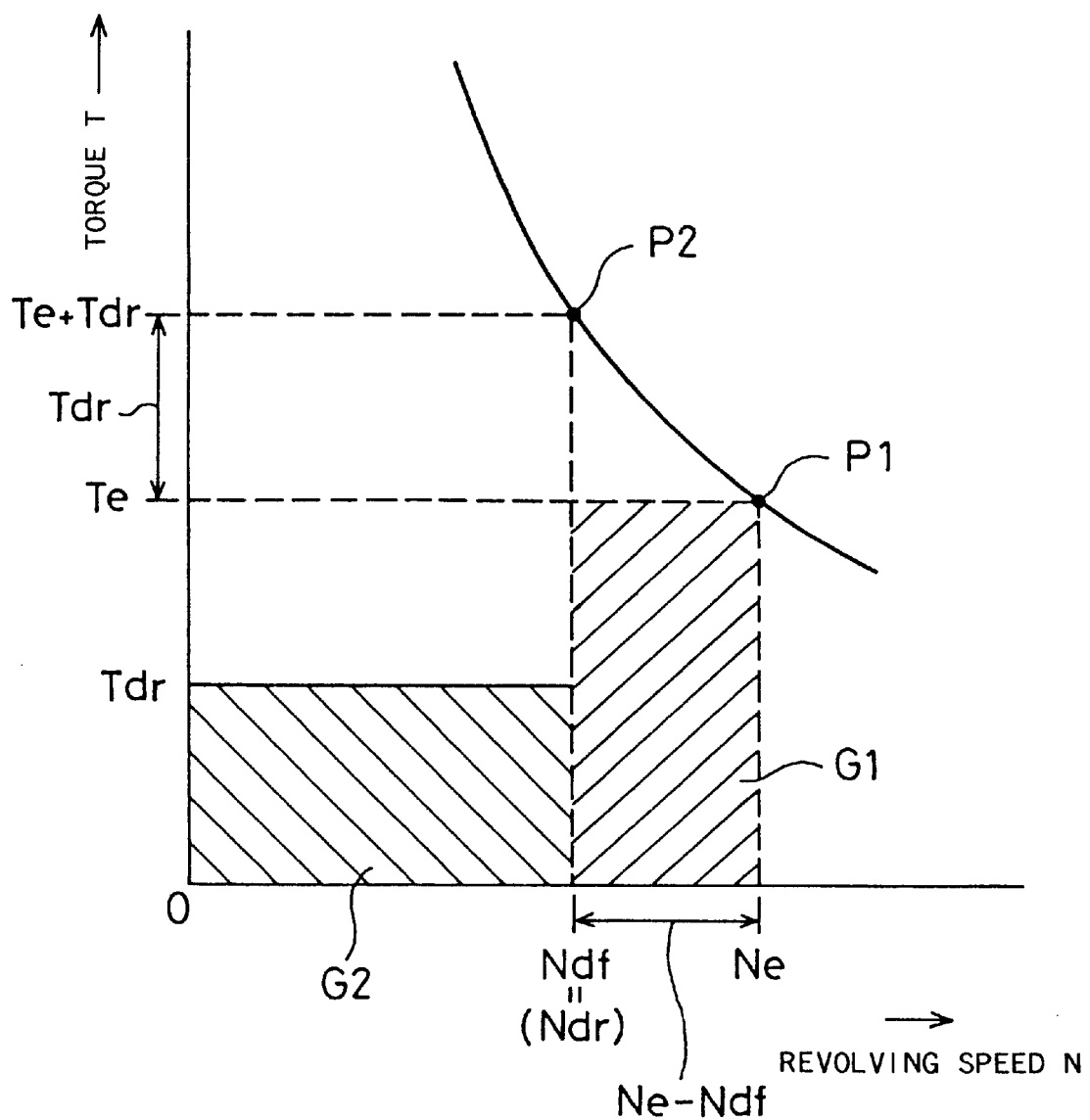
FIG. 46 is a graph showing the principle of the present invention.

The controller 80 and the clutch motor 30 and the assist motor 40 controlled by the controller 80 are separately arranged, but work in a cooperative manner as the power transmission apparatus 20 to distribute and transmit the power to the four wheels. FIG. 46 is a graph schematically illustrating distribution and transmission of the driving force. Energy (torque revolving speed) taken out of the engine 50 is transmitted to the drive shaft 22A via the clutch motor 30. In case that a slipping rotation occurs in the clutch motor 30, energy corresponding to the revolving speed difference transmitted torque is regenerated by the three-phase coils 36 of the clutch motor 30. The energy is recovered via the rotary transformer 38 and the first driving circuit 91 and stored in the battery 94. The assist motor 40, on the other hand, generates a torque, which is substantially identical with the torque output to the drive shaft 22A via the clutch motor 30. The torque is obtained by the power operation of the assist motor 40 with the energy stored in the battery 94 or with the energy regenerated by the clutch motor 30. As a result, the torque is applied to the front wheels 26 and 28 and the rear wheels 27 and 29 at a predetermined distribution ratio. When the torques distributed to the respective wheels are substantially equal to one another, the driving force is distributed substantially in the same manner as the full-time 4WD.

The power transmission apparatus 20 thus constructed carries out a variety of operations other than the operation as the full-time 4WD. The following describes the operations of the power transmission apparatus 20. The power transmission apparatus 20 works in accordance with the operation principles discussed below, especially with the principle of torque conversion. By way of example, it is assumed that the crankshaft 56 of the engine 50 driven by the EFIECU 70 rotates at a predetermined revolving speed N1. While the transistors Tr1 through Tr6 in the first driving circuit 91 are in OFF position, the controller 80 does not supply any electric current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current flows through the three-phase coils 36 of the clutch motor 30, based on the difference between the revolving speed of the crankshaft 56 of the engine 50 and a revolving speed of the drive shaft 22A (in other words, a difference between the revolving speed of the outer rotor 32 and that of the inner rotor 34 in the clutch motor 30). In this state, the clutch motor 30 functions as a generator, and the battery 94 is charged with the electric current regenerated via the first driving circuit 91. At this moment, a certain slip exists between the outer rotor 32 and the inner rotor 34 connected with each other in the clutch motor 30. Namely the inner rotor 34 rotates at a revolving speed, which is lower than the revolving speed of the crankshaft 56 of the engine 50. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque. Referring back to FIG. 46, when the crankshaft 56 of the engine 50 is driven at a revolving speed Ne and a torque Te and the drive shaft 22A receiving the output of the clutch motor 30 is rotated at a revolving speed Ndf, the clutch motor 30 regenerates energy of an area G1 corresponding to (Ne−Ndf)×Te, wherein (Ne−Ndf) is the revolving speed difference in the clutch motor 30 and Te is the transmitted torque. The energy of the area G1 is given to the assist motor 40, so that the drive shaft 22B rotates at a revolving speed Ndr (=Ndf) and a torque Tdr. Energy corresponding to the slip (revolving speed difference) in the clutch motor 30 is accordingly given as the torque Tdf to the drive shaft 22B, and the four-wheel-drive vehicle 15 is driven by the torque Te+Tdr, which is greater than the output torque Te of the engine 50. When the four-wheel-drive vehicle 15 runs on a straight road in a stationary state, the front wheel 26 and the rear wheel 27 of the four-wheel-drive vehicle 15 have identical revolving speeds (that is, the revolving speed Ndf of the front-wheel drive shaft 22A is identical with the revolving speed Ndr of the rear-wheel drive shaft 22B). In the course of cornering, however, the revolving speeds of the front wheel 26 and the rear wheel 27 may be different from each other. Without consideration of the efficiency, the torque Tdr transmitted from the assist motor 40 to the rear wheel 27 is expressed as:

$Tdr=(Ne-Ndf) \cdot Te/Ndr$

Figure 5:
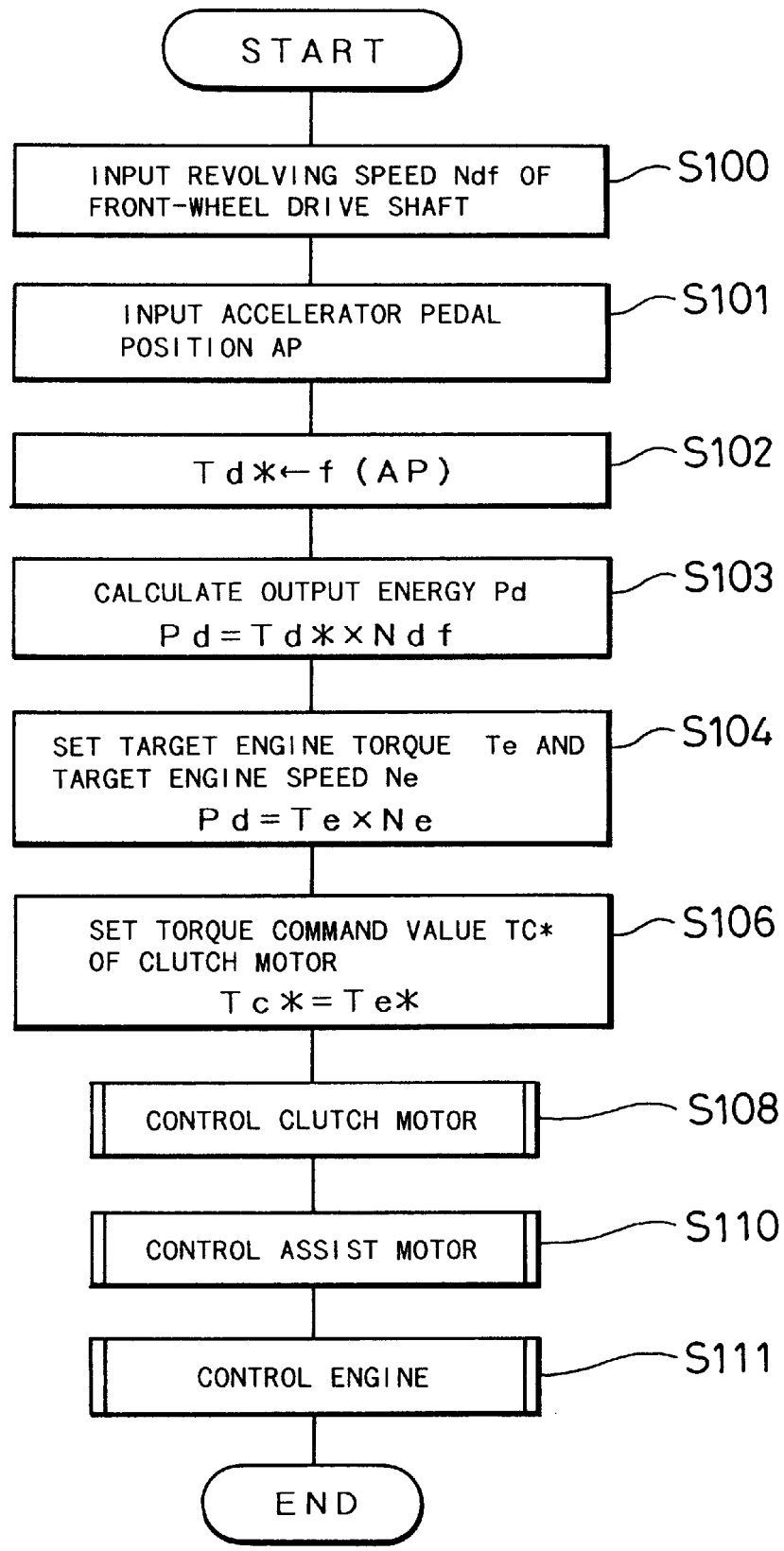
FIG. 5 is a flowchart showing a torque control routine executed by the control CPU 90.

The following describes the control procedure of the controller 80 in detail. FIG. 5 is a flowchart showing a torque control routine executed by the control CPU 90 of the controller 80. When the program enters the torque control routine, the control CPU 90 first receives data of revolving speed Ndf of the drive shaft 22A at step S100. The revolving speed Ndf of the drive shaft 22A can be computed from the rotational angle θf of the drive shaft 22A read from the resolver 39B. The control CPU 90 then reads the accelerator pedal position AP from the accelerator pedal position sensor 65 at step S101. The driver steps on the accelerator pedal 64 when feeling insufficiency of output torque. The value of the accelerator pedal position AP accordingly represents the desired output torque (that is, the total torque of the drive shafts 22A and 22B) which the driver requires. At subsequent step S102, the control CPU 90 computes a target output torque (torque required for whole vehicle) Td* corresponding to the input accelerator pedal position AP. The target output torque Td* is also referred to as the output torque command value. Output torque command values Td* have been set in advance for the respective accelerator pedal positions AP. In response to an input of the accelerator pedal position AP, the output torque command value Td* corresponding to the input accelerator pedal position AP is selected among the preset output torque command values Td*.

At step S103, an energy Pd to be output from the drive shaft 22A is calculated from the selected output torque command value Td* and the input revolving speed Ndf of the drive shaft 22A (Pd=Td*·Ndf). The program then proceeds to step S104 at which the control CPU 90 sets a target engine torque Te and a target engine speed Ne based on the output energy Pd thus obtained. Here it is assumed that all the energy Pd to be output from the drive shafts 22A and 22B is supplied by the engine 50. Since the energy supplied by the engine 50 is equal to the product of the engine torque Te and the engine speed Ne, the relationship between the output energy Pd and the engine torque Te and the engine speed Ne can be expressed as Pd=Te·Ne. There are, however, numerous combinations of the engine torque Te and the engine speed Ne satisfying the above relationship. In this embodiment, an optimal combination of the engine torque Te and the engine speed Ne is selected in order to realize operation of the engine 50 with the highest possible efficiency. The control procedure of the first embodiment gives priority to the operating efficiency of the engine 50. In the four-wheel-drive vehicle 50, however, priority to the torque distribution into the four wheels is required in some cases. The control procedure with the priority to the torque distribution will be discussed later as a second embodiment.

At subsequent step S106, the control CPU 90 sets a torque command value Tc* of the clutch motor 30 according to the engine torque Te set at step S104. In order to keep the revolving speed Ne of the engine 50 at a substantially constant level, it is required to make the torque of the clutch motor 30 balance the torque of the engine 50. The processing at step S106 accordingly sets the torque command value Tc* of the clutch motor 30 equal to the engine torque Te.

After setting the torque command value Tc* of the clutch motor 30 at step S106, the program proceeds to steps S108, S110, and S111 to control the clutch motor 30, the assist motor 40, and the engine 50, respectively. As a matter of convenience of illustration, the control operations of the clutch motor 30, the assist motor 40, and the engine 50 are shown as separate steps. In the actual procedure, however, these control operations are carried out comprehensively. For example, the control CPU 90 simultaneously controls the clutch motor 30 and the assist motor 40 by interrupt process, while transmitting an instruction to the EFIECU 70 through communication to control the engine 50 concurrently.

Figure 6:
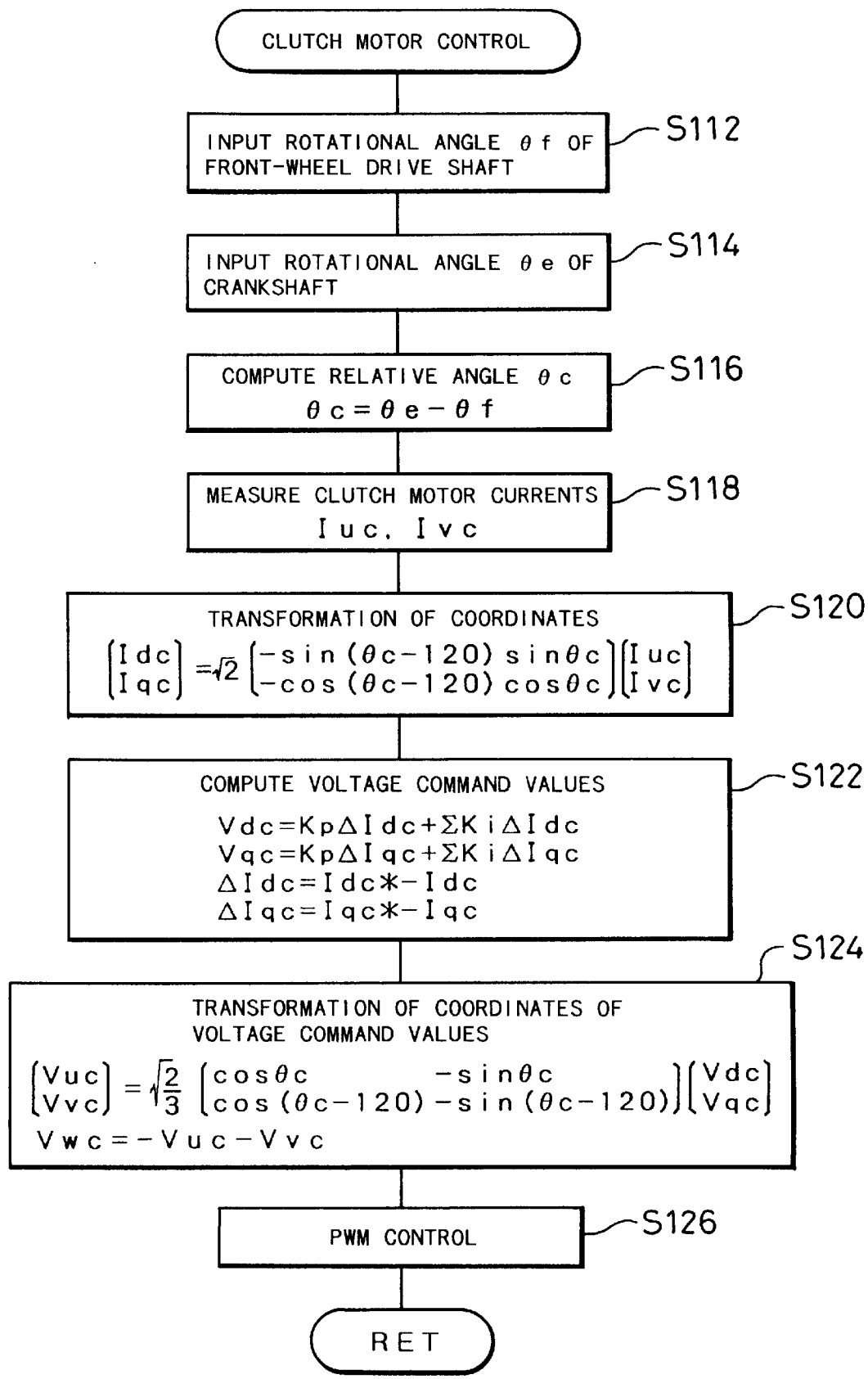
FIG. 6 is a flowchart showing a basic control routine of the clutch motor 30.

The control of the clutch motor 30 (step S108 in FIG. 5) is implemented according to a clutch motor control routine shown in the flowchart of FIG. 6. When the program enters the clutch motor control routine of FIG. 6, the control CPU 90 of the controller 80 first reads the rotational angle θf of the drive shaft 22A from the resolver 39B at step S112 and the rotational angle θe of the crankshaft 56 of the engine 50 from the resolver 39A at step S114. The control CPU 90 then computes a relative angle c of the drive shaft 22 and the crankshaft 56 according to the equation θc=θe−θf at step S116.

The program proceeds to step S118, at which the control CPU 90 receives inputs of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S120, the control CPU 90 executes transformation of coordinates (three-phase to two-phase transformation) using the values of currents flowing through the three phases obtained at step S118. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes the control CPU 90 computes deviations of currents Idc and Iqc actually flowing through the d and q axes from current command values Idc* and Iqc* of the respective axes, which are calculated from the torque command value Tc* of the clutch motor 30, and determines voltage command values Vdc and Vqc for the d and q axes at step S122. In accordance with a concrete procedure, the control CPU 90 executes operations following Equations (2) and Equations (3) given below:

$$\Delta Idc = Idc^* - Idc$$

$$\Delta Iqc = Iqc^* - Iqc \quad (2)$$

$$Vdc = Kp1 \cdot \Delta Idc + Ki1 \cdot \Delta Idc$$

$$Vqc = Kp2 \cdot Iqc + Ki2 \cdot \Delta Iqc \quad (3)$$

wherein Kp1, Kp2, Ki1, and Ki2 represent coefficients, which are adjusted to be suited to the characteristics of the motor applied.

The voltage command value Vdc (Vqc) includes a part in proportion to the deviation I from the current command value I* (first term in right side of Equation (3)) and a summation of historical data of the deviations I for 'i' times (second term in right side). The control CPU 90 then re-transforms the coordinates of the voltage command values thus obtained (two-phase to three-phase transformation) at step S124. This corresponds to an inverse of the transformation executed at step S120. The inverse transformation determines voltages Vuc, Vvc, and Vwc actually applied to the three-phase coils 36 as Equations (4) given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix} \quad (4)$$

$$Vwc = -Vuc - Vvc$$

The actual voltage control is accomplished by on-off operation of the transistors Tr1 through Tr6 in the first driving circuit 91. At step S126, the on- and off-time of the transistors Tr1 through Tr6 in the first driving circuit 91 is PWM (pulse width modulation) controlled in order to attain the voltage command values determined by Equation (4) above. This process enables the clutch motor 30 to mechanically transmit the target torque to the drive shaft 22A.

Figure 7:
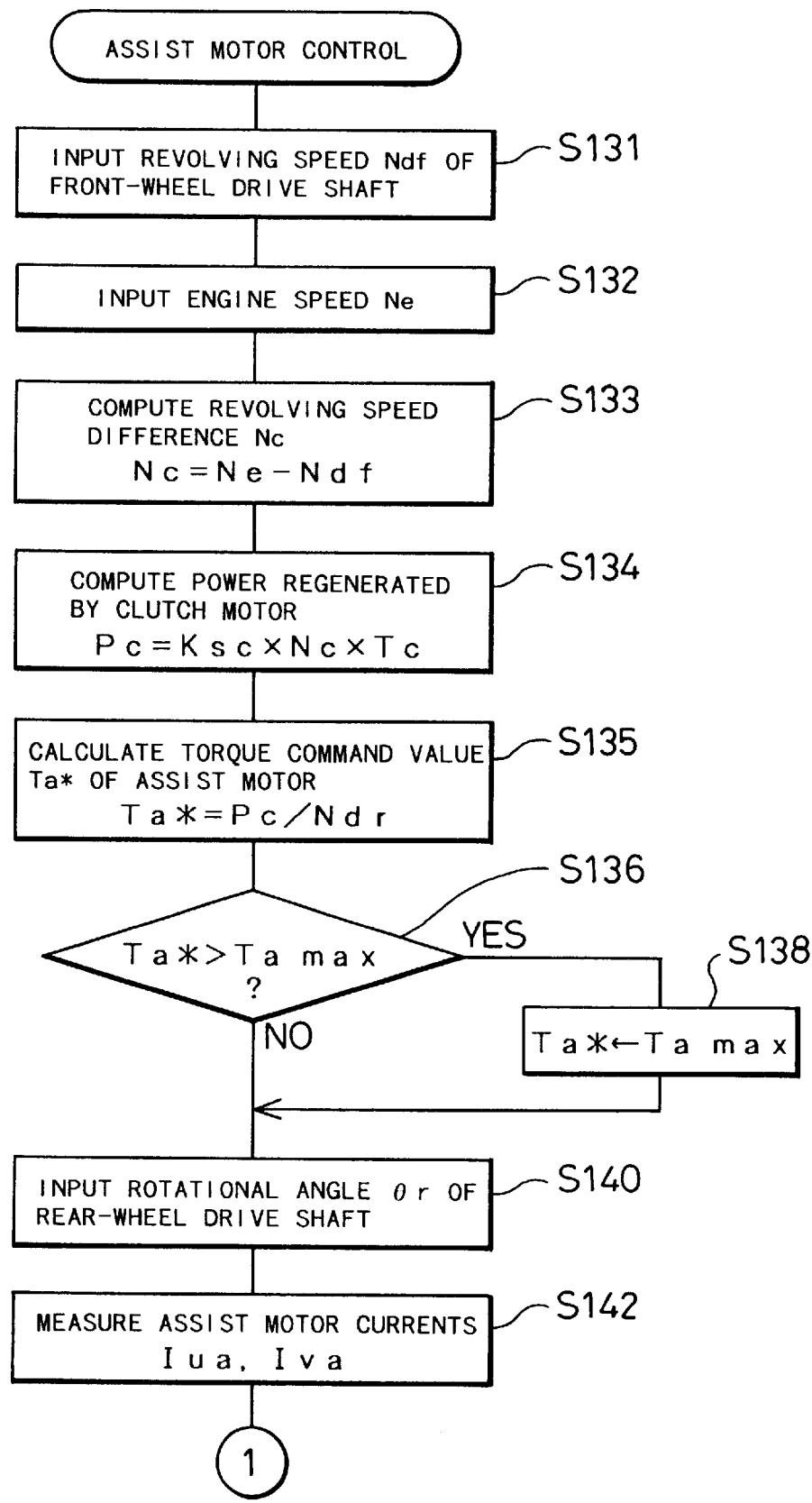
FIGS. 7 and 8 are flowcharts showing a basic control routine of the assist motor 40.
Figure 8:
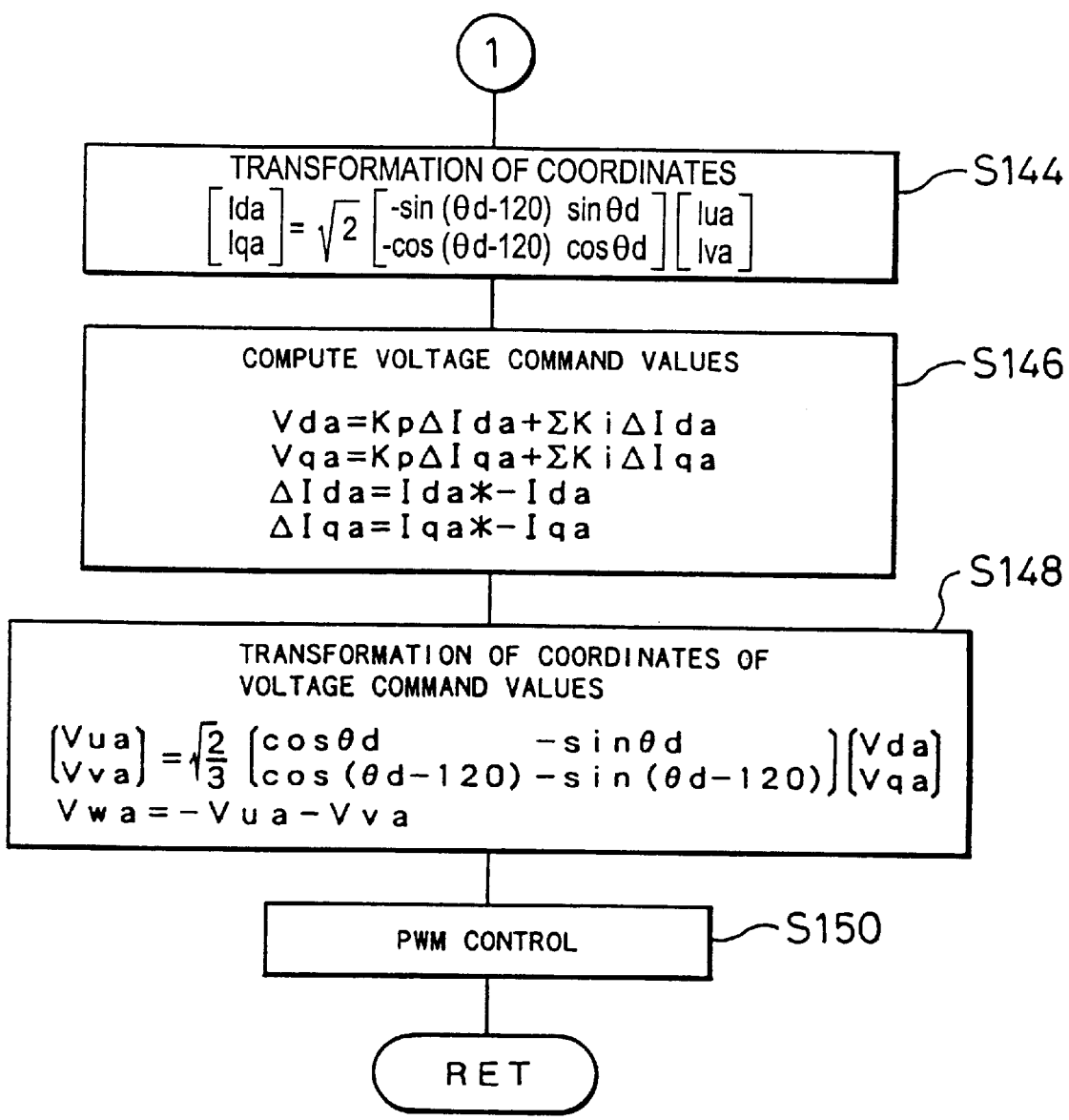

The control of the assist motor 40 (step S110 in FIG. 5) is implemented according to an assist motor control routine shown in the flowcharts of FIGS. 7 and 8. When the program enters the assist motor control routine of FIG. 7, the control CPU 90 first receives data of revolving speed Ndf of the drive shaft 22A for driving the front wheels 26 and 28 at step S131. The revolving speed Ndf of the drive shaft 22A is computed from the rotational angle θf of the drive shaft 22A read from the resolver 39B. The control CPU 90 then receives data of revolving speed Ne of the engine 50 at step S132. The revolving speed Ne of the engine 50 may be computed from the rotational angle θe of the crankshaft 56 read from the resolver 39A or directly measured by the speed sensor 76 mounted on the distributor 60. In the latter case, the control CPU 90 receives data of revolving speed Ne of the engine 50 through communication with the EFIECU 70, which connects with the speed sensor 76.

A revolving speed difference Nc between the input revolving speed Ndf of the drive shaft 22A and the input revolving speed Ne of the engine 50 is calculated according to the equation Nc=Ne−Ndf at step S133. At subsequent step S134, an electric power (energy) Pc regenerated by the clutch motor 30 is calculated according to the equation given as:

$$Pc = Ksc \cdot Nc \cdot Tc$$

The product NcTc, wherein NC and Tc respectively denote the revolving speed difference and the actual torque in the clutch motor 30, defines electrical energy corresponding to the area G1 in the graph of FIG. 46. In the above equation, Ksc represents an efficiency of generation (regeneration) by the clutch motor 30.

At step S135, a torque command value Ta* of the assist motor 40 is determined by the equation given as:

$$Ta^* = ksa \cdot Pc/Ndr$$

wherein ksa represents an efficiency of the assist motor 40. The torque command value Ta* of the assist motor 40 thus obtained is compared with a maximum torque Tamax, which the assist motor 40 can potentially apply, at step S136. When the torque command value Ta* exceeds the maximum torque Tamax, the program proceeds to step S138 at which the torque command value Ta* is restricted to the maximum torque Tamax.

After the torque command value Ta* is set equal to the maximum torque Tamax at step S138 or after the torque command value Ta* is determined not to exceed the maximum torque Tamax at step S136, the control CPU 90 reads the rotational angle θr of the drive shaft 22B from the resolver 48 at step S140, and receives data of assist motor currents Iua and Iva, which respectively flow through the U phase and V phase of the three-phase coils 44 in the assist motor 40, from the ammeters 97 and 98 at step S142. Referring to the flowchart of FIG. 8, the control CPU 90 then executes transformation of coordinates for the currents of the three phases at step S144, computes voltage command values Vda and Vqa at step S146, and executes inverse transformation of coordinates for the voltage command values at step S148. At subsequent step S150, the control CPU 90 determines the on- and off-time of the transistors Tr11 through Tr16 in the second driving circuit 92 for PWM (pulse width modulation) control. The processing executed at steps S144 through S150 is identical with that executed at steps S120 through S126 of the clutch motor control routine shown in the flowchart of FIG. 6.

The control of the engine 50 (step S111 in FIG. 5) is executed in the following manner. In order to attain stationary driving at the target engine torque Te and the target engine speed Ne (set at step S104 in FIG. 5), the control CPU 90 regulates the torque Te and the revolving speed Ne of the engine 50 to make them approach the target engine torque Te and the target engine speed Ne, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the engine 50 eventually approach the target engine torque Te and the target engine speed Ne.

According to the process described above, the clutch motor 30 converts the torque to an electric power at a predetermined efficiency Ksc. In other words, the clutch motor 30 regenerates an electric power in proportion to the difference between the revolving speed of the crankshaft 56 of the engine 50 and the revolving speed of the inner rotor 34 of the clutch motor 30. The assist motor 40 receives the electric power thus regenerated and applies a corresponding torque to the drive shaft 22B for driving the rear wheels. The torque applied to the drive shaft 22B by the assist motor 40 coincides with the torque converted to an electric power by the clutch motor 30. In the graph of FIG. 46, the electrical energy in the area G1 is converted to that in an area G2 to implement the torque conversion.

There is naturally a certain amount of energy loss in the clutch motor 30, the assist motor 40, the first driving circuit 91, and the second driving circuit 92. It is accordingly rare that the energy in the area G1 perfectly coincides with the energy in the area G2 in the practical state. The energy loss in the clutch motor 30 and the assist motor 40 is relatively small since some synchronous motors recently developed have the efficiency very close to 1. The energy loss in the first driving circuit 91 and the second driving circuit 92 can also be sufficiently small since the ON-state resistance of known transistors, such as GTOs, applicable to the transistors Tr1 through Tr16 is extremely small. Most part of the revolving speed difference between the crankshaft 56 and the drive shaft 22A or the slip of rotations in the clutch motor 30 is thus converted to a regenerative energy by the three-phase coils 36 and output by the assist motor 40 as a torque for driving the rear-wheel drive shaft 22B.

A second embodiment according to the present invention is described below. The structure of the power transmission apparatus 20 in the second embodiment is identical with that of the first embodiment discussed above. When the rear wheels 27 and 29 are stuck in mud to run at an idle or are slipped on the snowy road, the structure of the first embodiment realized as the power transmission apparatus 20 or the four-wheel-drive vehicle 15 with the power transmission apparatus 20 incorporated therein enables the front wheels 26 and 28 to be driven with the torque Tc. The vehicle can accordingly escape from the idling state and run stably with the driving force of the front wheels 26 and 28. When the front wheels 26 and 28 driven by the engine 50 and the clutch motor 30 are stuck in mud to lose their driving force, on the other hand, the clutch motor 30 may not regenerate the sufficient electric power. Referring back to FIG. 46, the torque Tdr obtained by the assist motor 40 (the target torque Ta* of the assist motor 40) corresponds to the quotient by dividing energy regenerated by the clutch motor 30 (energy corresponding to the area G1) by the revolving speed Ndr of the drive shaft 22B. In case that the front wheels 26 and 28 are stuck in mud to run at an idle, the front wheels 26 and 28 can not grip the road surface to receive the output torque of the engine 50. This results in increasing the revolving speed Ndf of the drive shaft 22A and the revolving speed Ne of the engine 50 and thereby decreasing the revolving speed difference Nc. The clutch motor 30 can thus not regenerate the sufficient electric power, and the output torque of the assist motor 40 may accordingly be lowered. Distribution of energy only by the engine 50 may cause insufficiency of the torque, for example, on a slope.

Figure 9:
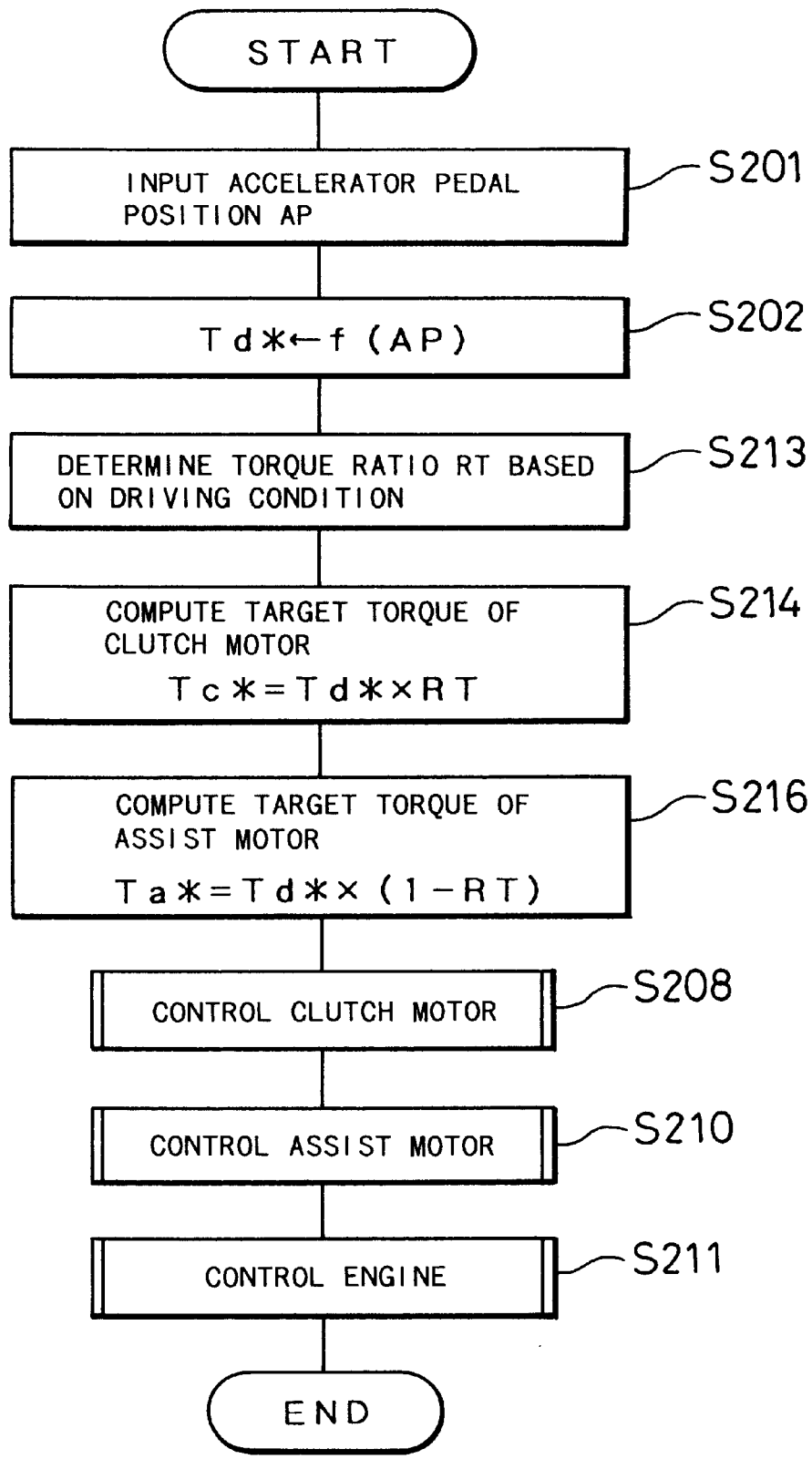
FIG. 9 is a flowchart showing a control routine for fixed distribution of the driving force as a second embodiment according to the present invention.

The structure of the second embodiment controls the torque applied by the assist motor 40 to the rear-wheel drive shaft 22B, regardless of the electric power regenerated by the clutch motor 30. FIG. 9 is a flowchart showing a main routine of torque control executed in the second embodiment. The routine of FIG. 9 corresponds to the routine of FIG. 5 in the first embodiment, and the corresponding steps have the same numerals in the lower two figures and are not described specifically. Referring to the flowchart of FIG. 9, after the torque Td* required for the vehicle is calculated from the accelerator pedal position AP at step S202, a torque ratio RT, at which the torque is distributed to the front wheels 26 and 28 and the rear wheels 27 and 29, is determined according to the driving state at step S213. At subsequent steps S214 and S216, the target torques Tc* and Ta* of the respective drive shafts 22A and 22B are calculated from the torque ratio RT. The clutch motor control executed at step S208 follows the routine of the first embodiment shown in FIG. 6 with the target torque Tc* thus obtained. The assist motor control executed at step S210 does not require the processing of steps S131 through S135 in the flowchart of FIG. 7, and starts the processing from step S136 with the target torque Ta* thus obtained. Since the torque Te of the engine 50 is equal to the torque Tc of the clutch motor 30, the engine control executed at step S211 to secure the required energy drives the engine 50 in the driving state defined by:

torque $Te=Tc$; and revolving speed $Ne=(Tc \cdot (Ndf-Ne)+Ta \cdot Ndr)/Tc$.

The control procedure of the second embodiment can secure the torque applicable to the front wheels 26 and 28 and the rear wheels 27 and 29, regardless of the regenerative energy of the engine 50 and generate the torque greater than the output of the engine 50, for example, on a slope. Namely this structure gives a sufficient torque for going up a slope. Even in case that the front wheels 26 and 28 are stuck in mud to run at an idle or slipped on a snowy road, this structure secures the torque of the rear wheels 27 and 29 and enables the vehicle from easily escape from the idling state.

Figure 10:
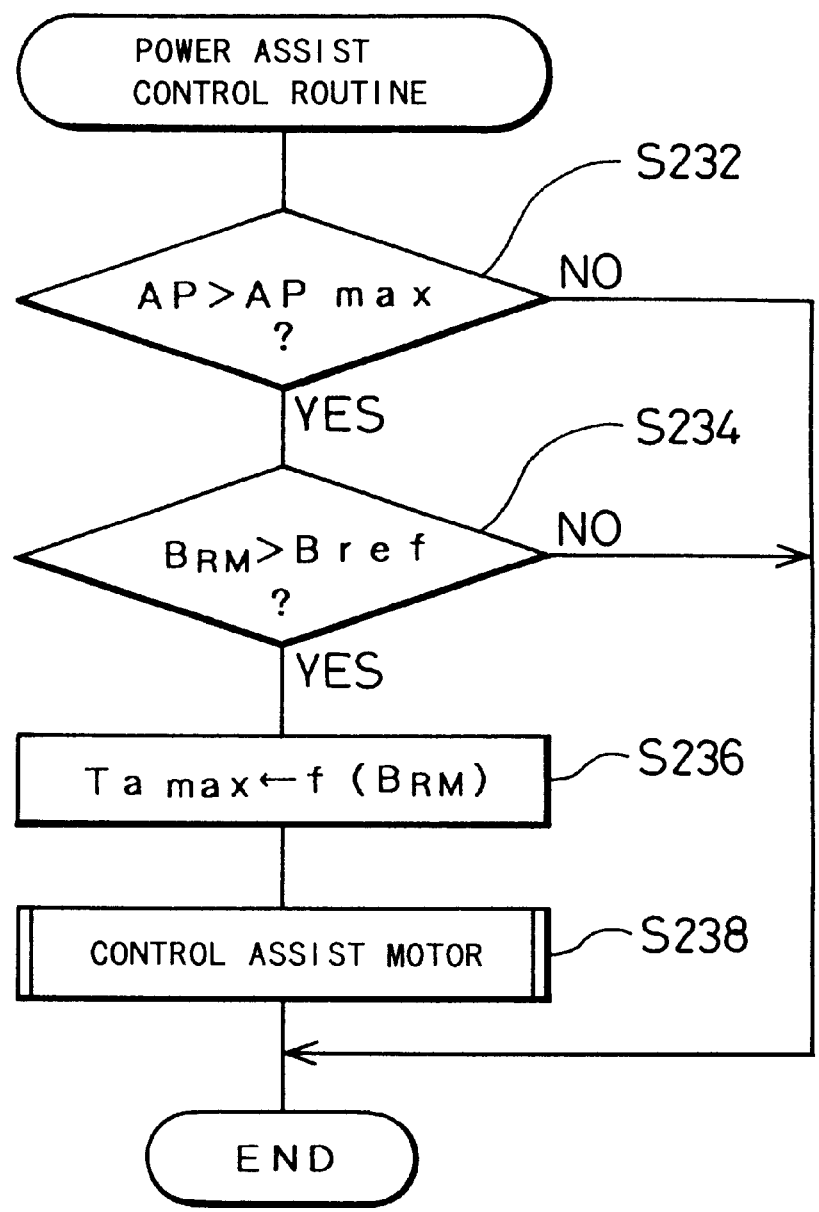
FIG. 10 is a flowchart showing a power assist control routine as a modification of the second embodiment.

The control procedure executed in this state (power assist control) utilizes the electric power stored in the battery 94 to secure the torque. The above embodiment consistently secures the torque of the assist motor 40 at the predetermined torque ratio RT and does not take into account the charge and discharge state of the battery 94. In accordance with another preferable application, the power assist control may be carried out according to the flowchart of FIG. 10. Referring to FIG. 10, it is determined at step S232 whether or not the accelerator pedal position AP read from the accelerator pedal position sensor 65 exceeds a threshold value APmax. When AP exceeds APmax, the remaining charge BRM of the battery 94 measured by the remaining charge meter 99 is compared with a predetermined reference value Bref at step S234. When the remaining charge BRM is sufficient, a target torque Tamax corresponding to the remaining charge BRM of the battery 94 is set at step S236. The assist motor 40 is then controlled with the target torque Tamax thus obtained at step S238. The control of the assist motor 40 executed at step S238 follows the procedure of FIGS. 7 and 8 described previously.

The power assist control enables the drive shafts 22A and 22B to be driven with the torque greater than the output of the engine 50. The magnitude of the applied torque depends upon the remaining charge BRM of the battery 94. This structure realizes a sufficient torque increase in case that the battery 94 has a sufficient remaining charge, while effectively protects the battery 94 from excessive consumption in case that the battery 94 does not have a sufficient remaining charge.

A third embodiment according to the present invention is described below. The structure of the power transmission apparatus 20 in the third embodiment is identical with that of the first embodiment. In the second embodiment discussed above, when the electric power regenerated by the clutch motor 30 doe not give a sufficient torque, the power assist control is carried out to make up for the insufficient torque with the electric power stored in the battery 94. The power assist control, however, consumes the electric power stored in the battery 94 and may decrease the remaining charge BRM of the battery 94 to a critical level. It is accordingly necessary to charge the battery 94 when the remaining charge BRM of the battery 94 decreases to or below a preset allowable minimum or otherwise whenever the driver requires. In any case, the battery 94 is charged with the electric power regenerated by the motor. As discussed in the first embodiment, in the process of assist control, the clutch motor 30 works as a generator and regenerates an electric power via the first driving circuit 91. Part of the regenerated electric power (that is, the portion not used by the assist motor 40 to produce an assist torque) may be used to charge the battery 94. The electric power regenerated by the clutch motor 30 is, however, insufficient for the rapid charging. In the four-wheel-drive vehicle 15 of the third embodiment, the battery 94 is charged with an electric power regenerated by the assist motor 40 as well as that regenerated by the clutch motor 30.

Figure 11:
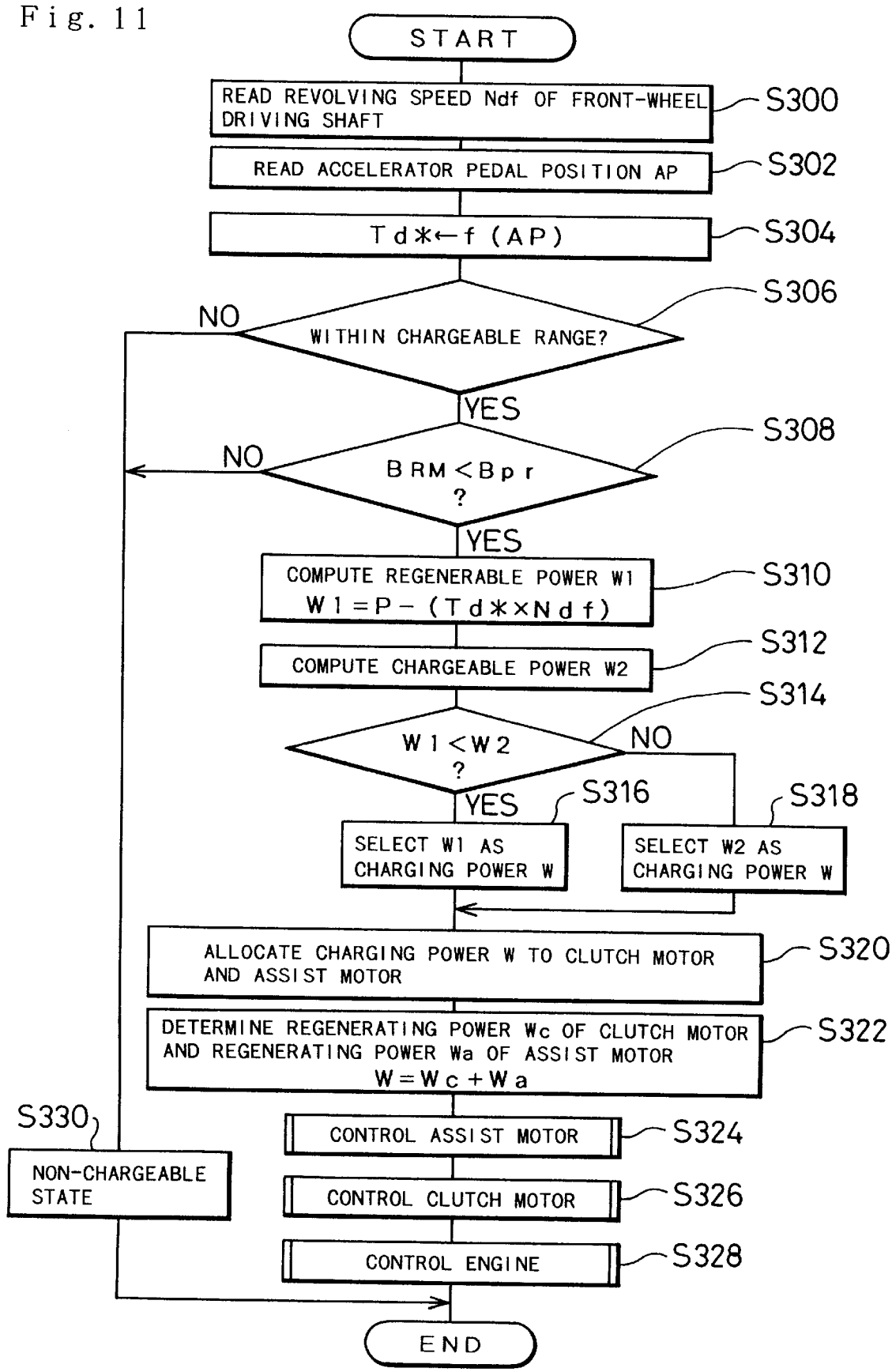
FIG. 11 is a flowchart showing an assist control routine executed in a third embodiment according to the present invention.

FIG. 11 is a flowchart showing a control routine executed by the power transmission apparatus 20 of the third embodiment. When the program enters the control routine of FIG. 11, the control CPU 90 of the controller 80 first receives data of revolving speed Ndf of the drive shaft 22A for driving the front wheels 26 and 28 at step S300 and reads the accelerator pedal position AP from the accelerator pedal position sensor 65 at step S302, in the same manner as the first embodiment. The control CPU 90 then computes the output torque command value Td* (torque of the drive shaft 22A) corresponding to the input accelerator pedal position AP at step S304.

Figure 12:
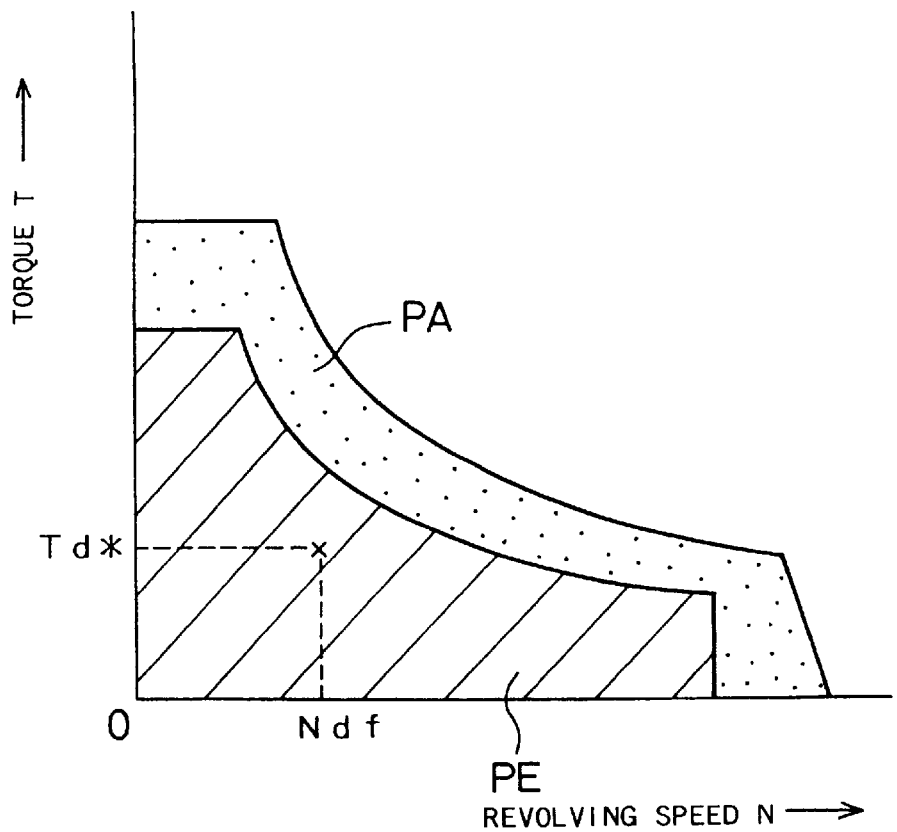
FIG. 12 shows a chargeable range map used in the third embodiment.

It is determined at step S306 whether or not the point defined by the output torque command value Td* thus calculated (torque of the drive shaft 22A) and the input revolving speed Ndf of the drive shaft 22A, that is, the energy output from the engine 50 (Td*·Ndf), is within a chargeable range. In accordance with a concrete procedure, it is determined whether or not the point of coordinates defined by the output torque command value Td* and the revolving speed Ndf of the drive shaft 22A is located in a chargeable range set in a chargeable range map as shown in FIG. 12. In the graph of FIG. 12, the torque of the drive shaft 22A is plotted as ordinate and the revolving speed of the drive shaft 22A as abscissa. In a chargeable range PE, the energy supplied from the engine 50 can be regenerated as an electric power. The chargeable range PE also corresponds to an operable range of the engine 50. In a power assist range PA, on the other hand, the power assist control described above is carried out to make up for the insufficient torque with the electric power stored in the battery 94. The electric power stored in the battery 94 is consumed in the power assist range PA, which accordingly represents a non-chargeable range.

When the defined point of coordinates is not in the chargeable range at step S306, the program recognizes a non-chargeable state at step S330 and exits from this control routine. When the defined point of coordinates is in the chargeable range at step S306, on the contrary, the program proceeds to step S308 at which the remaining charge BRM of the battery 94 measured by the remaining charge meter 99 is compared with a predetermined proper level Bpr. When the remaining charge BRM of the battery 94 is less than the predetermined proper level Bpr, the battery 94 requires charging and the program proceeds to step S310. When the remaining charge BRM is equal to or greater than the predetermined proper level Bpr, on the other hand, the battery 94 does not require charging and the program recognizes the non-chargeable state at step S330 and exits from the routine.

At step S310, an electric power W1 regenerable by the clutch motor 30 and the assist motor 40 is computed according to the equation given as:

$W1=P-(Td^* \cdot Ndf)$ wherein P denotes a maximum energy suppliable by the engine 50 under a certain condition. The electric power W1 regenerable by the clutch motor 30 and the assist motor 40 corresponds to a residual energy calculated by subtracting the energy output from the drive shaft 22A, that is, Td* Ndf, from the maximum energy P suppliable by the engine 50.

Figure 13:
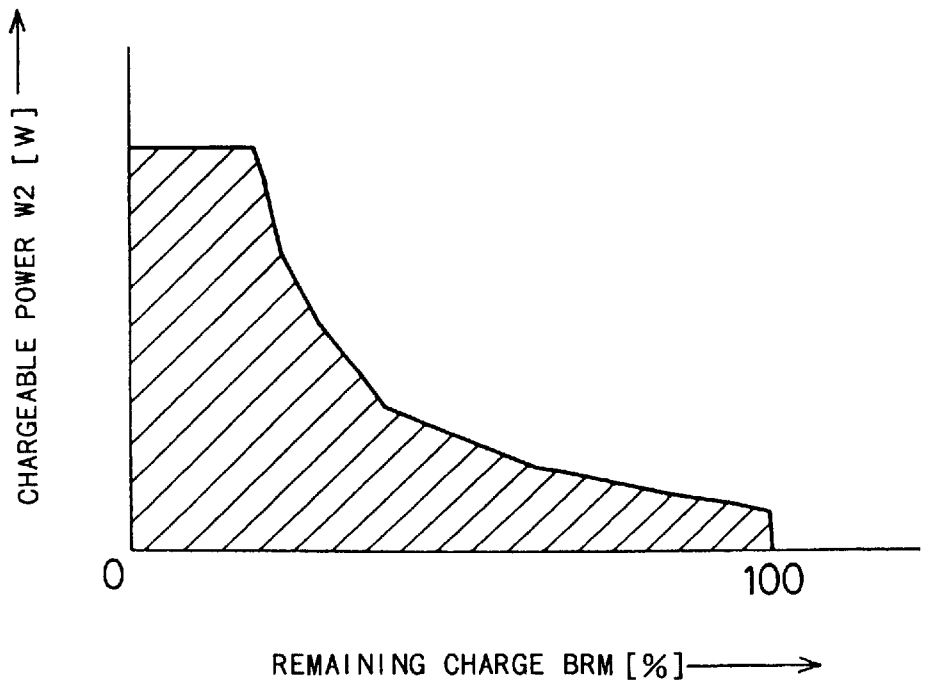
FIG. 13 is a graph showing the chargeable electric power plotted against the remaining charge of the battery 94 used in the third embodiment.

At subsequent step S312, an electric power W2 chargeable in the battery 94 is computed from the remaining charge BRM of the battery 94 measured by the remaining charge meter 99. FIG. 13 is a graph showing the relationship between the chargeable electric power and the remaining charge of the battery 94 in the third embodiment. In the graph of FIG. 13, the electric power W2 [w] chargeable in the battery 94 is plotted as ordinate and the remaining charge BRM [%] of the battery 94 as abscissa. As shown in FIG. 13, the electric power W2 chargeable in the battery 94 decreases with an increase in remaining charge BRM of the battery 94.

In the subsequent process, the control CPU 90 compares the electric power W1 regenerable by the clutch motor 30 and the assist motor 40 with the electric power W2 chargeable in the battery 94 and selects the lower power as an actual charging power W, with which the battery 94 is actually charged. In accordance with a concrete procedure, the regenerable electric power W1 is compared with the chargeable electric power W2 at step S314. When the regenerable electric power W1 is lower than the chargeable electric power W2, the regenerable electric power W1 is selected as the actual charging power W at step S316. When the chargeable electric power W2 is lower than the regenerable electric power W1, on the contrary, the chargeable electric power W2 is selected as the actual charging power W at step S318.

The control CPU 90 subsequently determines the allocation of the actual charging power W to the clutch motor 30 and the assist motor 40. In accordance with a concrete procedure, at step S320, the actual charging power W is divided into two parts, that is, an electric power Wc regenerated by the clutch motor 30 and an electric power Wa regenerated by the assist motor 40. The control CPU 90 specifies the regenerative power Wc of the clutch motor 30 and the regenerative power Wa of the assist motor 40 based on the allocation to satisfy the equation W=Wc+Wa at step S322. The allocation of the electric power W to the clutch motor 30 and the assist motor 40 is determined by taking into account the generation capacity and efficiency of the respective motors or the deviation from an allowable maximum temperature of each motor (that is, the allowable maximum temperature–current temperature).

After computing the regenerative powers of the clutch motor 30 and the assist motor 40 at step S322, the program proceeds to steps S324, S326, and S328 to control the assist motor 40, the clutch motor 30, and the engine 50, respectively. Like the flowchart of FIG. 5, as a matter of convenience of illustration, the control operations of the assist motor 40, the clutch motor 30, and the engine 50 are shown as separate steps in the flowchart of FIG. 11. In the actual procedure, however, these control operations are carried out comprehensively. For example, the control CPU 90 implements all the control operations simultaneously by utilizing the interrupt process.

The control of the assist motor 40 (step S324 in FIG. 11) is implemented according to an assist motor control routine, which is not specifically shown. When the program enters the routine, the control CPU 90 of the controller 80 first determines the torque command value Ta* of the assist motor 40 by the calculation expressed as:

$$Ta^* = -\{Wa/(Ksa \cdot Ndr)\}$$

The target torque or torque command value Ta* to be produced by the assist motor 40 is determined by dividing the regenerative power Wa of the assist motor 40 by the product of the generation (regeneration) efficiency Ksa of the assist motor 40 and the revolving speed Ndr of the drive shaft 22B for driving the rear wheels 27 and 29. Unlike the first and the second embodiments, the assist motor 40 is controlled to execute not the power operation but the regenerative operation in the third embodiment. The torque produced by the assist motor 40 in the third embodiment accordingly acts in the reverse direction of the torque produced by the assist motor 40 in the first or the second embodiment. Namely the torque of the assist motor 40 acts in reverse of the rotation of the drive shaft 22B. A minus sign is thus given to the right-side term of the above equation.

The assist motor 40 is then controlled with the torque command value Ta* thus determined. The control operation follows the procedure executed at steps S140 through S150 in the flowcharts of FIGS. 7 and 8 of the first embodiment. As mentioned above, note that the torque produced by the assist motor 40 in the third embodiment acts in the reverse direction of the torque produced in the first embodiment and that the torque command value Ta* thereby has the minus sign.

The control of the clutch motor 30 (step S326 in FIG. 11) is implemented according to a clutch motor control routine, which is not specifically shown. When the program enters the routine, the control CPU 90 of the controller 80 first determines the torque command value Tc* of the clutch motor 30 by the calculation expressed as:

$$Tc^* = Td^* - Ta^*$$

As described previously, the output torque (torque for the whole four-wheel-drive vehicle 15) is given as the sum of the torques of the clutch motor 30 and the assist motor 40. The torque command value Tc* of the clutch motor 30 is thus given as the difference between the output torque command value Td* and the torque command value Ta* of the assist motor 40. Here also note that the torque produced by the assist motor 40 acts in reverse of the rotation of the drive shaft 22B and that the torque command value Ta* of the assist motor 40 thereby has the minus sign.

The clutch motor 30 is then controlled with the torque command value Tc* thus determined. The control operation follows the procedure executed at steps S112 through S126 in the flowchart of FIG. 6 of the first embodiment.

The control of the engine 50 (step S328 in FIG. 11) is implemented according to an engine control routine, which is not specifically shown. When the program enters the routine, the control CPU 90 of the controller 80 first sets the target engine torque or torque command value Te* of the engine 50 based on the torque command value Tc* of the clutch motor 30. As previously mentioned, in order to keep the revolving speed of the engine 50 at a substantially constant level, it is required to make the torque of the clutch motor 30 balance the torque of the engine 50. The torque command value Te* of the engine 50 is thus set equal to the torque command value Tc* of the clutch motor 30.

The target engine speed or revolving speed command value Ne* of the engine 50 is then determined by the calculation expressed as:

$$Ne^* = Wc/(Ksc \cdot Tc^*) + Ndf \quad (5)$$

The revolving speed in the clutch motor 30 is given as the difference between the revolving speed of the engine 50 (revolving speed of the crankshaft 56) and the revolving speed of the drive shaft 22A for driving the front wheels 26 and 28. The revolving speed in the clutch motor 30 is also determined by dividing the electric power Wc to be regenerated by the clutch motor 30 by the product of the generation (regeneration) efficiency Ksc of the clutch motor 30 and the target torque or torque command value Tc* of the clutch motor 30. The target engine speed or revolving speed command value Ne* of the engine 50 is thus expressed as Equation (5) given above.

After determining the torque command value Te* and the revolving speed command value Ne* of the engine 50, the control CPU 90 regulates the torque and the revolving speed of the engine 50 to make them approach the respective command values Te* and Ne*. In accordance with a concrete procedure, the control CPU 90 sends an instruction to the EFIECU 70 through communication to regulate the amount of fuel injection or the throttle valve position. Such regulation makes the torque and the revolving speed of the engine 50 eventually approach the target engine torque Te* and the target engine speed Ne*, respectively.

Figure 14:
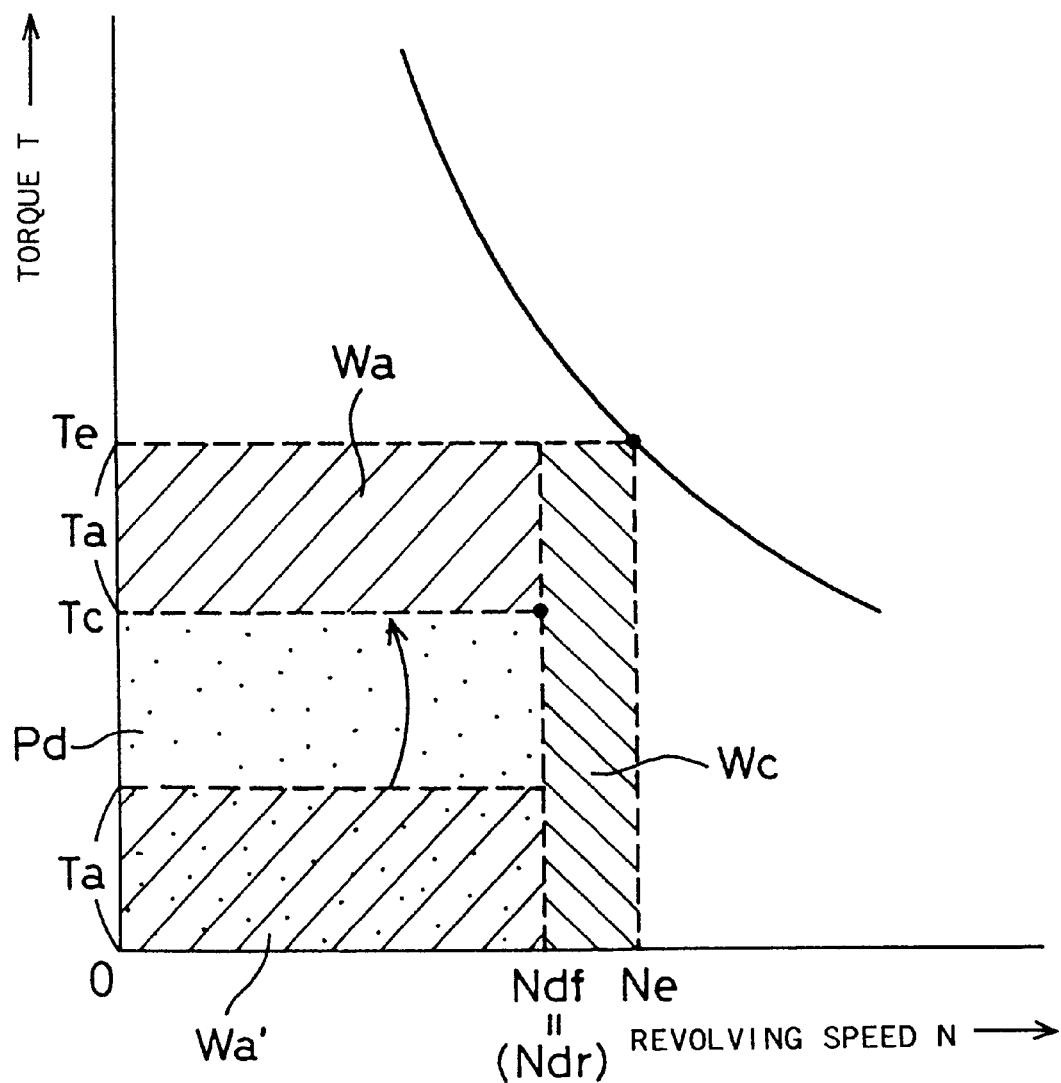
FIG. 14 shows distribution of energy supplied by the engine 50 in the third embodiment.

FIG. 14 shows allocation of the energy supplied by the engine 50 in the third embodiment. In the graph of FIG. 14, Taf represents the output torque (torque of the front-wheel drive shaft 22A), Ndf the revolving speed of the front-wheel drive shaft 22A, Te the torque of the engine 50 (engine torque), Ne the revolving speed of the engine 50 (engine speed), Tc the torque of the clutch motor 30, and Ta the torque of the assist motor 40. The energy supplied by the engine 50 is given as (TeNe). This energy is divided into the three parts, Pd. Wc, and Wa. Pd represents the output energy of the front-wheel drive shaft 22A, Wc the electric power regenerated by the clutch motor 30 and used to charge the battery 94, Wa the electric power regenerated by the assist motor 40 and used to charge the battery 94. Since the assist motor 40 and the clutch motor 30 have separate shafts, the electric power Wa regenerated by the assist motor 40 and used to charge the battery 94 may be considered as an independent area Wa' as shown in FIG. 14. In the four-wheel-drive vehicle 15 as a whole, however, the electric power Wa can be determined by subtracting the energy output via the clutch motor 30 and the energy regenerated by the clutch motor 30 from the energy output from the engine 50. It is thus thought that the assist motor 40 regenerates the electric power corresponding to the area Wa.

In the four-wheel-drive structure shown in FIG. 1, the procedure of the third embodiment allows both the clutch motor 30 and the assist motor 40 to regenerate an electric power. The battery 94 is accordingly charged with the regenerative power Wc of the clutch motor 30 and the regenerative power Wa of the assist motor 40. This structure enables the battery 94 to be charged with the electric power greater than the generation capacity of the clutch motor 30. The clutch motor 30 can be also controlled to implement the power operation in the direction of rotation of the engine 50 with the energy regenerated by the assist motor 40 or the energy stored in the battery 94. In this case, the drive shaft 22A for driving the front wheels 26 and 28 is rotated at a revolving speed greater than the revolving speed Ne of the engine 50, which is generally called the over-drive state.

While the electric current is regenerated by the assist motor 40 linked with the rear wheels 27 and 29, a braking force is applied to the rear wheels 27 and 29 rotated by the road surface. When the driver steps on the brake pedal 68, the first driving circuit 91 corresponding to the clutch motor 30 is switched to an of f state to make the driving force of the front wheels 26 and 28 equal to zero and brake the vehicle with the regenerative braking force of the rear wheels 27 and 29. In this case, fuel cut-off prevents the engine 50 from racing. The braking procedure with the assist motor 40 is based on the same principle as the known braking procedure in electric vehicles. Recovering the energy in the process of braking operation and charging the battery 94 with the recovered energy further enhance the energy efficiency of the whole vehicle.

Figure 15:
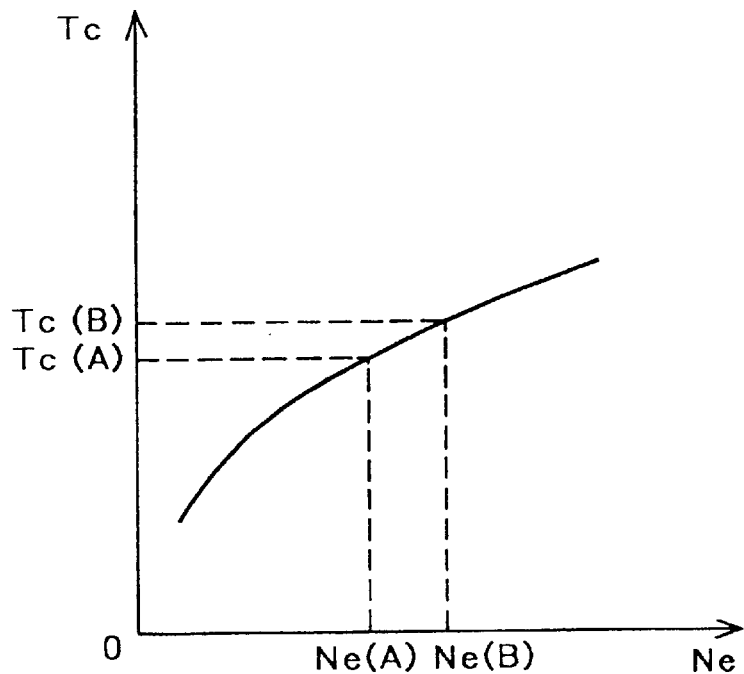
FIG. 15 is a graph showing the relationship between the external force (torque Tc) and the revolving speed Ne of the engine 50 when the fuel injection is stopped.

A braking operation with the clutch motor 30 in the four-wheel-drive vehicle 15 is described as a fourth embodiment according to the present invention. In order to implement the braking operation with the clutch motor 30, the clutch motor 30 applies a torque in reverse of the rotation of the drive shaft 22A linked with the front wheels 26 and 28. Here it is assumed that the drive shaft 22A rotates in the direction of moving the vehicle forward (that is, in the positive direction) and that a torque Tc, which acts in the reverse of the rotation of the drive shaft 22A (that is, in the negative direction), is applied to the drive shaft 22A by the clutch motor 30. A torque Tc, which has the same scalar as the torque Tc applied to the drive shaft 22A but acts in the reverse direction (positive direction), is then applied to the crankshaft 56 via the outer rotor 32, thereby racing the engine 50. When fuel injection is stopped under such conditions, the engine 50 rotates at the revolving speed to make the force required for friction and compression of the piston thereof balance the external force (torque Tc) acting in the positive direction. By way of example, the graph of FIG. 15 shows the relationship between the external force (torque Tc) and the revolving speed Ne of the engine 50 under the condition of ceased fuel injection. The engine 50 rotates at a revolving speed Ne(A) against the torque Tc acting as the external force equal to a value Tc(A) and at another revolving speed Ne(B) against the torque Tc equal to another value Tc(B).

The clutch motor 30 drives and rotates the inner rotor 34 connecting with the drive shaft 22A relative to the outer rotor 32, which is connected to the crankshaft 56 rotating at the revolving speed Ne of the engine 50. The revolving speed of the clutch motor 30 is accordingly equal to the difference Nc (=Ne−Ndf) between the revolving speed Ne of the engine 50 and the revolving speed Ndf of the drive shaft 22A. It is defined that the clutch motor 30 rotates in the positive direction when the inner rotor 34 rotates in the positive direction (that is, the direction of normal rotation of the drive shaft 22A) relative to the outer rotor 32, or in other words, when the revolving speed Ne of the engine 50 is less than the revolving speed Ndf of the drive shaft 22A (that is, the revolving speed difference Nc has a negative value). Application of the torque Tc in the negative direction to the drive shaft 22A by the clutch motor 30 rotating in the positive direction accordingly decreases the rate of relative rotation of the clutch motor 30 in the positive direction, thereby attaining the regenerative control of the clutch motor 30. In the description hereinafter, the braking operation under such conditions is referred to as 'braking operation by the regenerative control of the clutch motor 30'.

When the clutch motor 30 rotates in a negative direction, that is, when the revolving speed Ne of the engine 50 is greater than the revolving speed Ndf of the drive shaft 22A, on the contrary, application of the torque Tc in the negative direction to the drive shaft 22A by the clutch motor 30 increases the rate of relative rotation in the negative direction, thereby attaining the power control of the clutch motor 30. In the description hereinafter, the braking operation under such conditions is referred to as 'braking operation by the power control of the clutch motor 30'.

Figure 16:
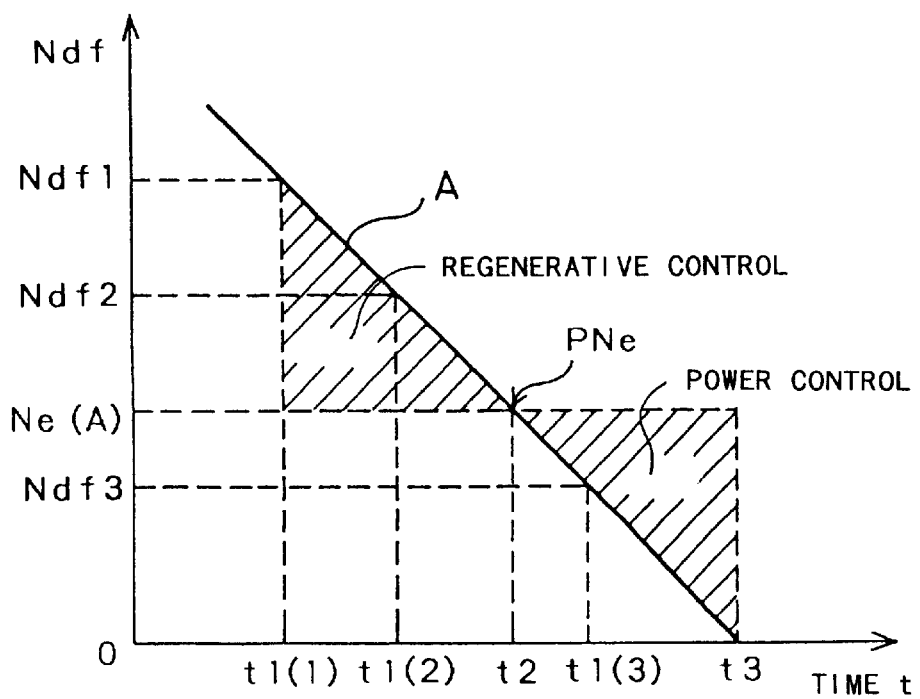
FIG. 16 is a graph showing the revolving speed Ndf of the drive shaft 22A plotted against the time t and the state of the clutch motor 30 when a negative torque Tc is set to the clutch motor 30.

FIG. 16 is a graph showing the revolving speed Ndf of the drive shaft 22A plotted against the time t (plane curve A) and the state of the clutch motor 30 when the negative value Tc(A) is set to the torque Tc of the clutch motor 30. The plane curve A represents a variation in revolving speed Ndf of the drive shaft 22A when the torque Tc (=the value Tc(A)) in the negative direction is applied onto the drive shaft 22A by the clutch motor 30. When the torque Tc (=the value Tc(A)) in the negative direction is set in the clutch motor 30, the revolving speed Ne of the engine 50 becomes equal to the value Ne(A) corresponding to the torque Tc (external force), as described previously with the graph of FIG. 15. Application of the torque Tc in the negative direction to the drive shaft 22A by the clutch motor 30 effects the following braking operations according to the position on the plane curve A depending upon the revolving speed Ndf of the drive shaft 22A. When the revolving speed Ndf of the drive shaft 22A is greater than the value Ne(A), that is, in a left upper region (left side of a time point t2) across a point PNe, which is an intersection of the plane curve A and a broken line Ndf=Ne(A), the clutch motor 30 rotates in the positive direction and executes braking operation by the regenerative control. When the revolving speed Ndf of the drive shaft 22A is less than the value Ne(A), that is, in a right lower region (right side of the time point t2) across the point PNe, the clutch motor 30 rotates in the negative direction and executes braking operation by the power control.

In accordance with a concrete procedure, both the regenerative control and the power control of the clutch motor 30 are carried out by controlling the transistors Tr1 through Tr6 of the first driving circuit 91 to consistently generate the torque Tc in the negative direction. The transistors Tr1 through Tr6 are controlled by the permanent magnets 35 attached to the outer rotor 32 and the revolving magnetic field generated by the currents passing through the three-phase coils 36 of the inner rotor 34. The same switching operation of the transistors Tr1 through Tr6 is accordingly executed for both the regenerative control and the power control. While the value of the torque Tc in the negative direction applied to the drive shaft 22A by the clutch motor 30 is kept constant, change of the braking operation of the clutch motor 30 from the regenerative control to the power control does not vary the switching operation of the transistors Tr1 through Tr6 in the first driving circuit 91.

When the revolving speed Ndf of the drive shaft 22A is equal to a first value Nd1 (at a time point t1(1)) or a second value Nd2 (at a time point t1(2)), which is greater than the value Ne(A), the clutch motor 30 functions as a generator and executes the regenerative control, in response to the negative torque Tc(A) set as the torque Tc of the clutch motor 30 by a step-on operation of the brake pedal 68. The clutch motor 30 executes the power control after the revolving speed Ndf of the drive shaft 22A coincides with the value Ne(A) (after the point PNe). When the revolving speed Ndf of the drive shaft 22A is equal to a third value Nd3 (at a time point t1(3)), which is smaller than the value Ne(A), in response to the negative torque Tc(A) set as the torque Tc of the clutch motor 30 by a step-on operation of the brake pedal 68, the clutch motor 30 does not execute the regenerative control but immediately starts the power control since the braking start position is after the time point t2.

Figure 17:
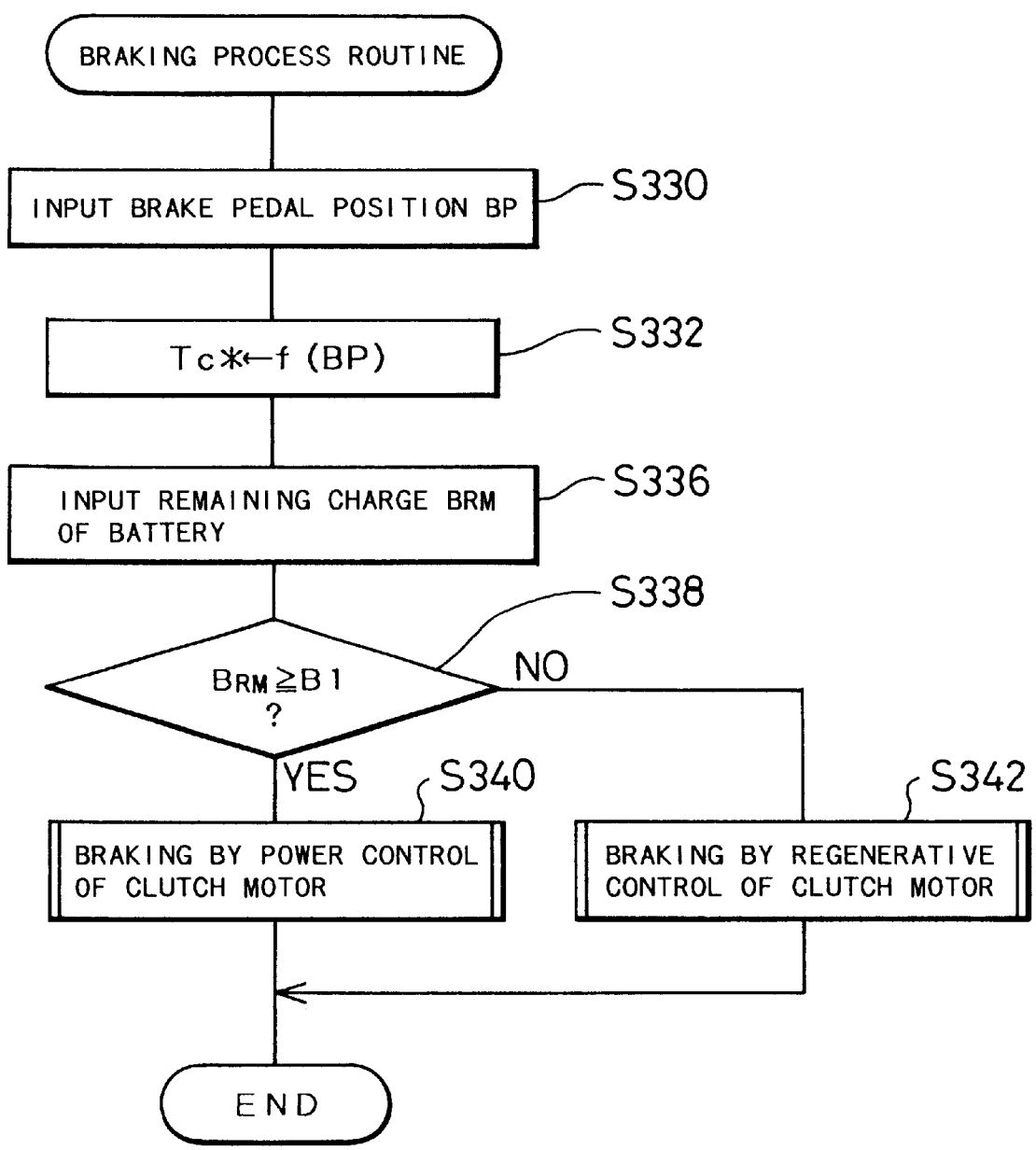
FIG. 17 is a flowchart showing a braking process routine executed by the controller 80 in a fourth embodiment according to the present invention.

The control procedure of the clutch motor 30 for the braking operation follows the control steps shown in the flowchart of FIG. 6. The clutch motor 30 executes either the power control or the regenerative control for the braking operation, based on the relationship between the revolving speed Ne of the engine 50 and the revolving speed Ndf of the drive shaft 22A linked with the front wheels 26 and 28. Either the power control or the regenerative control is selected for the braking operation according to which revolving speed is greater, Ne or Ndf. The revolving speed Ne of the engine 50 can be controlled to some extent by regulating the amount of fuel injection into the engine 50, so that selection of either the power control or the regenerative control for the braking operation may depend upon the remaining charge of the battery 94. The four-wheel-drive vehicle 15 with the power transmission apparatus 20 including the clutch motor 30 and the assist motor 40 can avoid the waste of energy and freely control the driving force. It is accordingly of great importance to charge and discharge the battery 94 with a high efficiency. Control of the engine 50 with the priority to the charge and discharge of the battery 94 is thus practical. An example of braking process routine in such a case is shown in the flowchart of FIG. 17.

When the program enters the braking process routine, the control CPU 90 of the controller 80 first reads a brake pedal position BP detected by the brake pedal position sensor 69 mounted on the brake pedal 68 at step S331, and determines a torque command value Tc* of the clutch motor 30 generating a braking force corresponding to the input brake pedal position BP at step S332. Torque command values Tc* have been set in advance for the respective brake pedal positions BP and stored in the ROM 90b. In response to an input of the brake pedal position BP, the torque command value Tc* corresponding to the brake pedal position BP is read from the ROM 90b.

The control CPU 90 then receives an input of the remaining charge BRM of the battery 94 measured by the remaining charge meter 99 at step S336, and compares the input remaining charge BRM with a threshold value B1 at step S338. The threshold value B1 represents a nearly full-charge state of the battery 94, that is, the state not requiring any further charging, and is set depending upon the type and characteristics of the battery 94.

When the remaining charge BRM of the battery 94 is not less than the threshold value B1, the program determines that no further charging is required and goes to step S340 to execute braking operation by the power control of the clutch motor 30. When the remaining charge BRM of the battery 94 is less than the threshold value B1, on the other hand, the program determines that further charging is required and goes to step S342 to execute braking operation by the regenerative control of the clutch motor 30. AS described previously, the actual braking operation by the power control of the clutch motor 30 is accomplished by making the revolving speed Ne of the engine 50 greater than the revolving speed Ndf of the drive shaft 22A. The braking operation by the regenerative control of the clutch motor 30 is attained by making the revolving speed Ne of the engine 50 smaller than the revolving speed Ndf of the drive shaft 22A. In either of the control procedures, while the braking operation is being carried out, the revolving speed Ne of the engine may be kept at a constant value, or alternatively the difference between the revolving speed Ne of the engine 50 and the revolving speed Ndf of the drive shaft 22A may be kept constant. Otherwise the difference between the revolving speed Ne of the engine 50 and the revolving speed Ndf of the drive shaft 22A may be varied successively.

The braking process routine described above implements either the braking operation by the power control of the clutch motor 30 or the braking operation by the regenerative control of the clutch motor 30, according to the state of the battery 94 in the four-wheel-drive vehicle 15. The braking operation can thus be carried out while the battery 94 is charged with the energy or the battery 94 is discharged to release the energy. This structure effectively protects the battery 94 from excessive charging or complete discharging.

The braking operation accompanied by the consumption or regeneration of the electric current in the clutch motor 30 may be combined with the braking operation accompanied by the consumption or regeneration of the electric current in the assist motor 40. It is also favorable to combine these braking operations and appropriately allocate the braking force to the four wheels.

As discussed above, the power transmission apparatus 20 having the two output shafts (that is, the drive shafts 22A and 22B) and the four-wheel-drive vehicle 15 with the power transmission apparatus 20 incorporated therein can implement the control procedure of outputting the torques from both the output shafts at a predetermined ratio, the control procedure of overdriving the front wheels 26 and 28, and the control procedure of carrying out the braking operation by the regenerative control or the power control. The control operations of the four-wheel-drive vehicle utilizing the power transmission apparatus of the present invention are, however, not restricted to these control procedures. The four-wheel-drive vehicle can also implement the reverse driving control and the starting control.

The following three method may be applied to drive the vehicle in the reverse direction:

(1) The fuel injection into the engine 50 is cut, and no electric current is supplied to the clutch motor 30. In this case, the output torque of the clutch motor 30 is equal to zero, and the drive shaft 22A is kept free. Under such conditions, the assist motor 40 is rotated with the electric power stored in the battery 94 in reverse of the normal rotation during the forward driving. This leads to rotation of the drive shaft 22B in the reverse direction and enables the vehicle to move backward.

(2) The engine 50 is kept at an idle or rotated at a very low speed, while the energy generated by the engine 50 is mostly recovered by the clutch motor 30. The assist motor 40 is rotated in the reverse direction with the recovered energy and the energy stored in the battery 94, in order to move the vehicle backward. In this case, although the drive shaft 22A is forcibly rotated in the reverse direction with the reverse rotation of the rear wheels 27 and 29, the vehicle can move backward in any way.

(3) The fuel injection into the engine 50 is cut, and the crankshaft 56 is at a stop. Under such conditions, the clutch motor 30 is rotated in the reverse direction with the electric power stored in the battery 94. In this case, the torque of the clutch motor 30 is controlled to be not greater than the static torque due to the static friction of the engine 50 with respect to the crankshaft 56. The engine 50 thus functions as a stationary wall relative to the clutch motor 30. This leads to rotation of the drive shaft 22A and enables the vehicle to move backward.

In the process of starting the vehicle, the assist motor 40 is servo-locked with the electric power stored in the battery 94 in order to prevent rotation of the drive shaft 22B, while the clutch motor 30 is driven to rotate the crankshaft 56 for cranking. In this case, although the driving force is transmitted to the front wheels 26 and 28 of the vehicle, the servo-locked assist motor 40 directly linked with the rear wheels 27 and 29 prevents movement of the four-wheel-drive vehicle 15 in principle. In accordance with another preferable structure, a clutch is interposed between the drive shaft 22A and the reduction gear 23 to fix the drive shaft 22A during the starting operation. This structure prevents the driving force from being transmitted to the front wheels 26 and 28.

Figure 18:
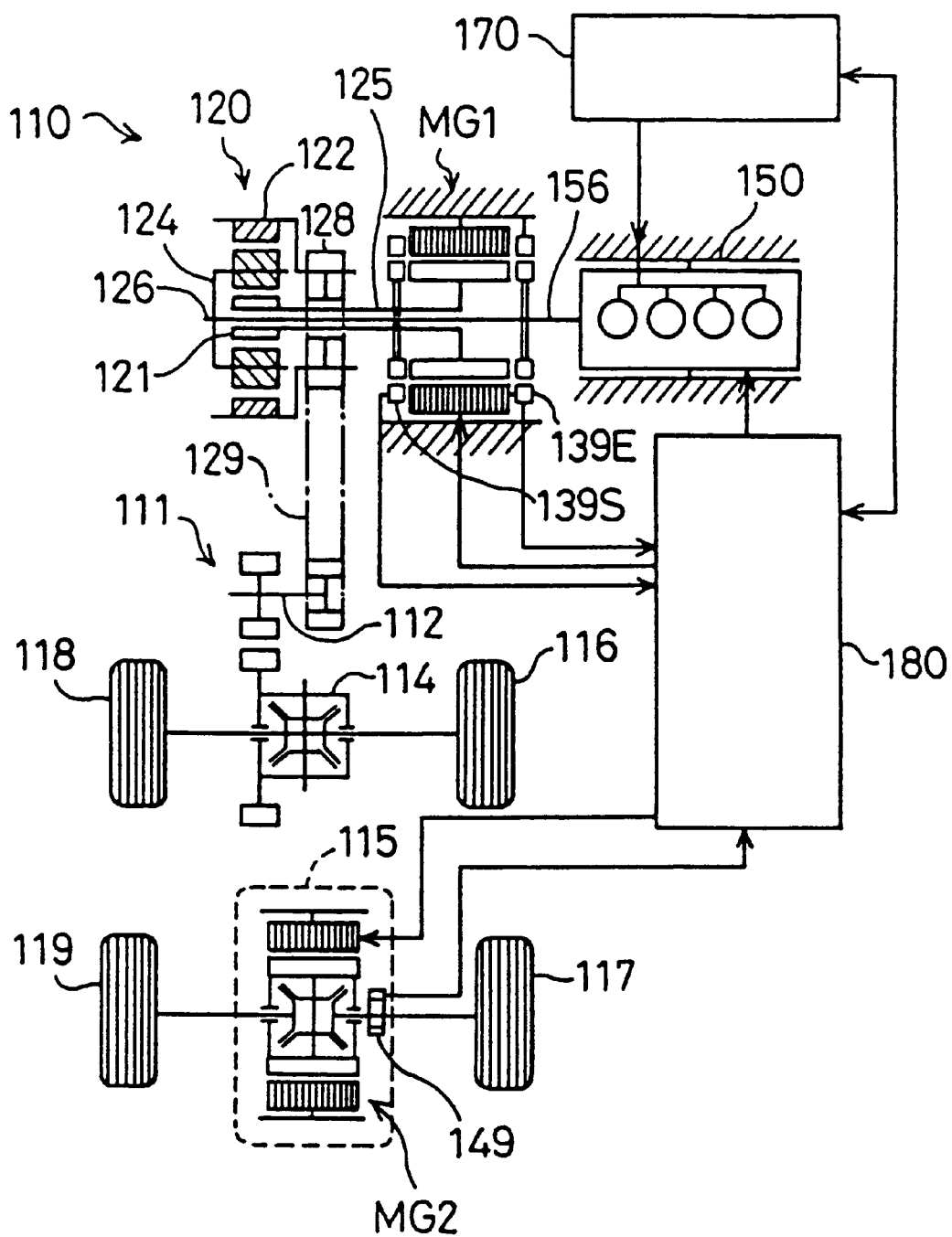
FIG. 18 schematically illustrates a general structure of a four-wheel-drive vehicle as a fifth embodiment according to the present invention.

The following describes a fifth embodiment according to the present invention, wherein the distribution means does not include the clutch motor 30 but uses a planetary gear. FIG. 18 shows the general structure of the four-wheel-drive vehicle with the planetary gear. The hardware structure except the distribution means is substantially identical with that of the first embodiment, and the accelerator pedal and the other peripheral elements are thus omitted from the illustration.

(1) Hardware Structure

Referring to FIG. 18, the four-wheel-drive vehicle includes a gasoline engine (hereinafter simply referred to as engine) 150, a planetary gear 120 linked with a crankshaft 156 of the engine 150, a first motor MG1 corresponding to the first motor of the present invention and connected to a sun gear shaft 125 of the planetary gear 120, a front-wheel differential gear 114 that receives the power of a ring gear shaft 126 of the planetary gear 120 transmitted via a chain belt 129, and a second motor MG2 incorporated in a rear-wheel differential gear 115. The following description regards the mechanism of power transmission through these constituents.

The crankshaft 156 of the engine 150 is mechanically connected via the planetary gear 120 to a power transmission gear 111, which rotates around a drive shaft 112, by the chain belt 129. The power transmission gear 111 is further linked with the front-wheel differential gear 114. The power generated by the power transmission apparatus 110 is thus eventually transmitted to left and right front driving wheels 116 and 118. Left and right rear driving wheels 117 and 119 are driven by the power of the second motor MG2. Both the first motor MG1 and the second motor MG2 are electrically connected to and controlled by a controller 180. The controller 180 has the same structure as that of the controller 80 of the first embodiment. Like the controller 80 of the first embodiment, the controller 180 is connected with a variety of sensors, such as a gearshift position sensor attached to a gearshift, which are omitted from the illustration. The controller 180 sends and receives a variety of data and information to and from an EFIECU 170, which controls operation of the engine 150, through communication. The EFIECU 170 has the same structure as that of the EFIECU 70 of the first embodiment.

Figure 19:
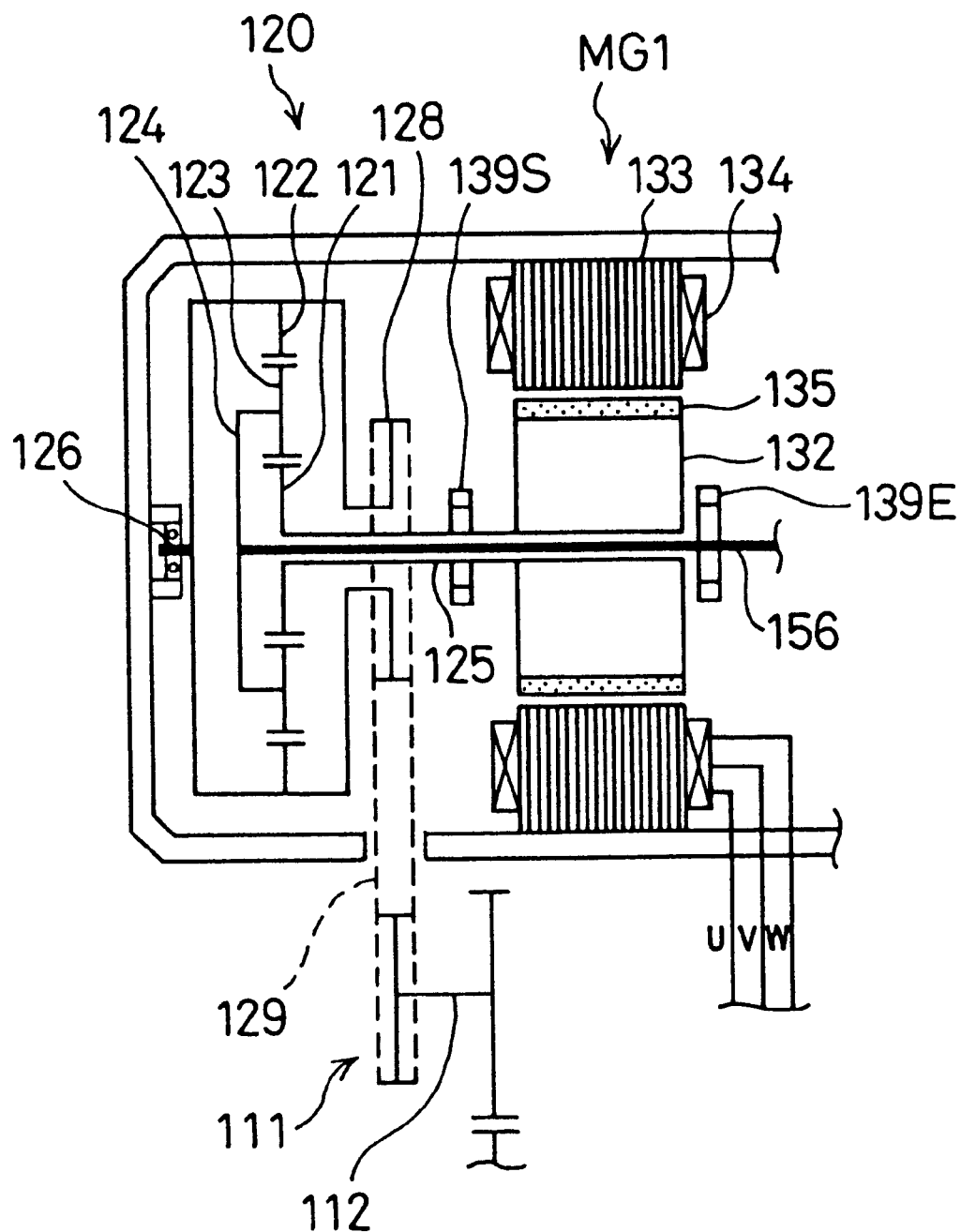
FIG. 19 shows structure of the first motor MG1 and the planetary gear 120 in the fifth embodiment.

The following describes structure of the planetary gear 120 and the first motor MG1 based on the drawing of FIG. 19. The planetary gear 120 includes a sun gear 121 linked with a hollow sun gear shaft 125 which the crankshaft 156 passes through, a ring gear 122 linked with a ring gear shaft 126 that is coaxial with the crankshaft 156, a plurality of planetary pinion gears 123 arranged between the sun gear 121 and the ring gear 122 to revolve around the sun gear 121 while rotating on its axis, and a planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the power input to or output from any two shafts among the three shafts automatically determines the power input to or output from the residual one shaft. The details of the input and output operations of the power into or from the three shafts of the planetary gear 120 will be discussed later.

The ring gear 122 is extended toward the first motor MG1 and connected on one end thereof to a power feed gear 128 for taking out the power. The power feed gear 128 is further connected to the power transmission gear 111 via the chain belt 129, so that the power is transmitted between the power feed gear 128 and the power transmission gear 111.

Like the assist motor 40 of the first embodiment, the first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 137. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139S for measuring its rotational angle s, whereas the crankshaft 156 is provided with a resolver 139E for measuring its rotational angle e.

Figure 20:
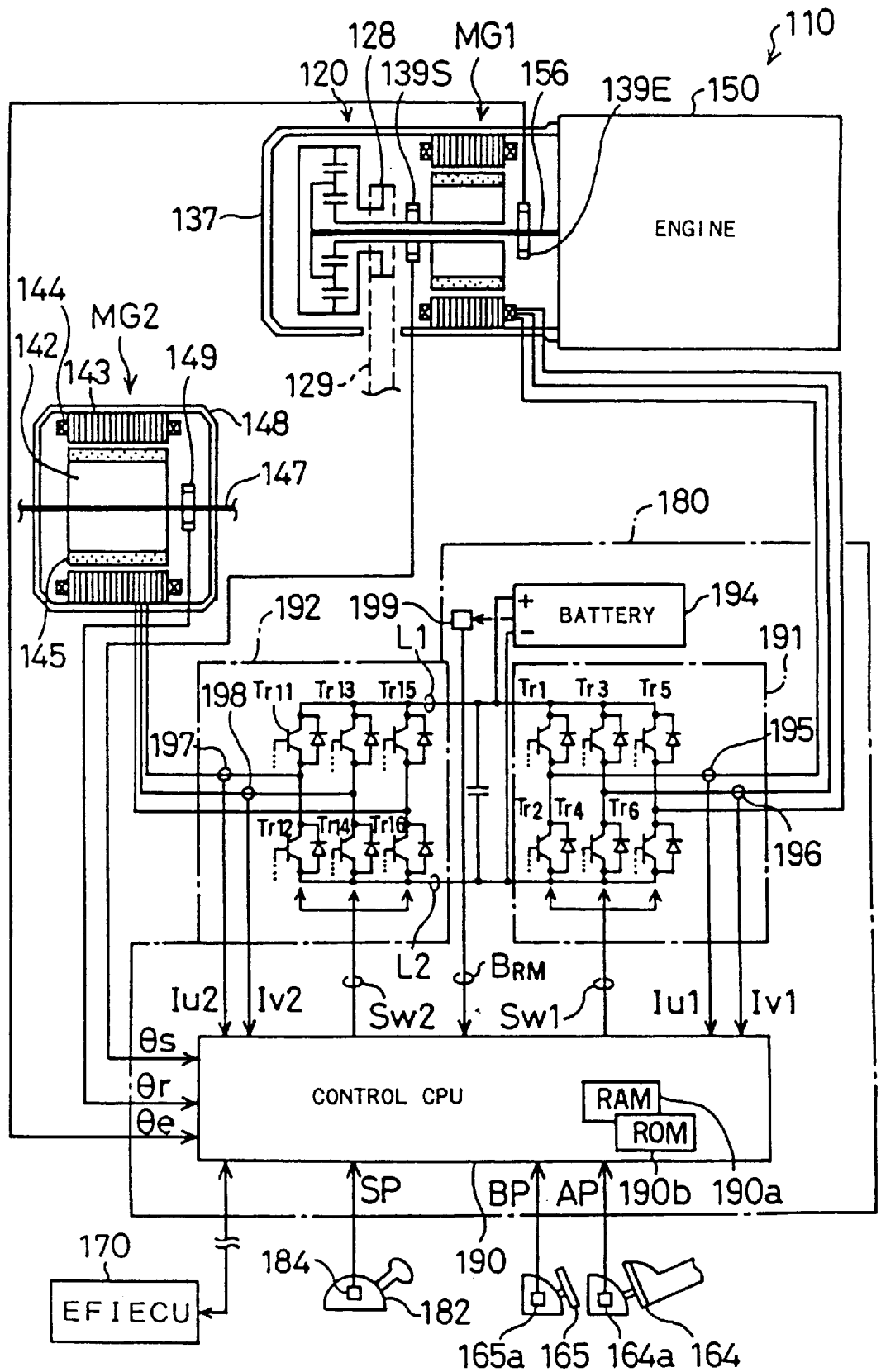
FIG. 20 schematically illustrates a power system of the four-wheel-drive vehicle including a controller 180.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field as shown in FIG. 20. The rotor 142 is linked with an axle 147 of the rear-wheel differential gear 115, and the stator 143 is fixed to a casing 148. The stator 143 of the second motor MG2 is also produced by laying thin plates of non-directional electromagnetic steel one upon another. Like the first motor MG1, the second motor MG2 also works as a motor or a generator. The axle 147 is further provided with a resolver 149 for measuring its rotational angle r.

The controller 180 for driving and controlling the first and the second motors MG1 and MG2 has the following configuration. Referring back to FIG. 20, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. These constituents are identical with those of the first embodiment and are thus not described specifically. The constituents of the controller 180 shown in FIG. 20 have the same numerals in the lower two figures as those of the first embodiment shown in FIG. 2.

(2) Principle of Operation

Figure 21:
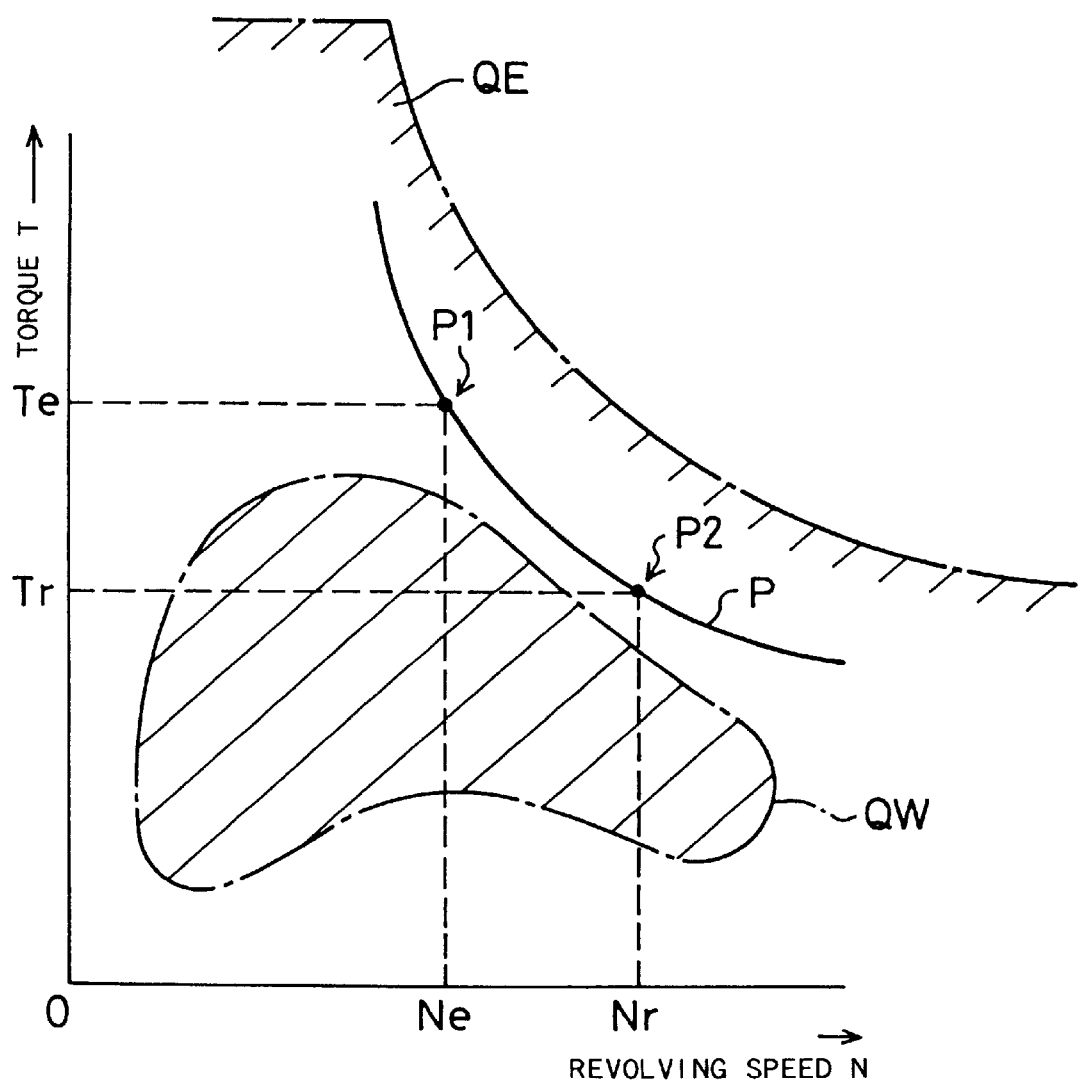
FIG. 21 shows an operable area QE of the engine 150 and driving points of the engine 150.

The four-wheel-drive vehicle thus constructed works in accordance with the operation principles discussed below, especially with the principle of torque conversion. By way of example, it is assumed that the engine 150 is driven at a driving point P1 having the revolving speed Ne and the torque Te and that the ring gear shaft 126 is driven at another driving point P2 having different revolving speed Nr and torque Tr but the same energy as an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 21.

Figure 22:
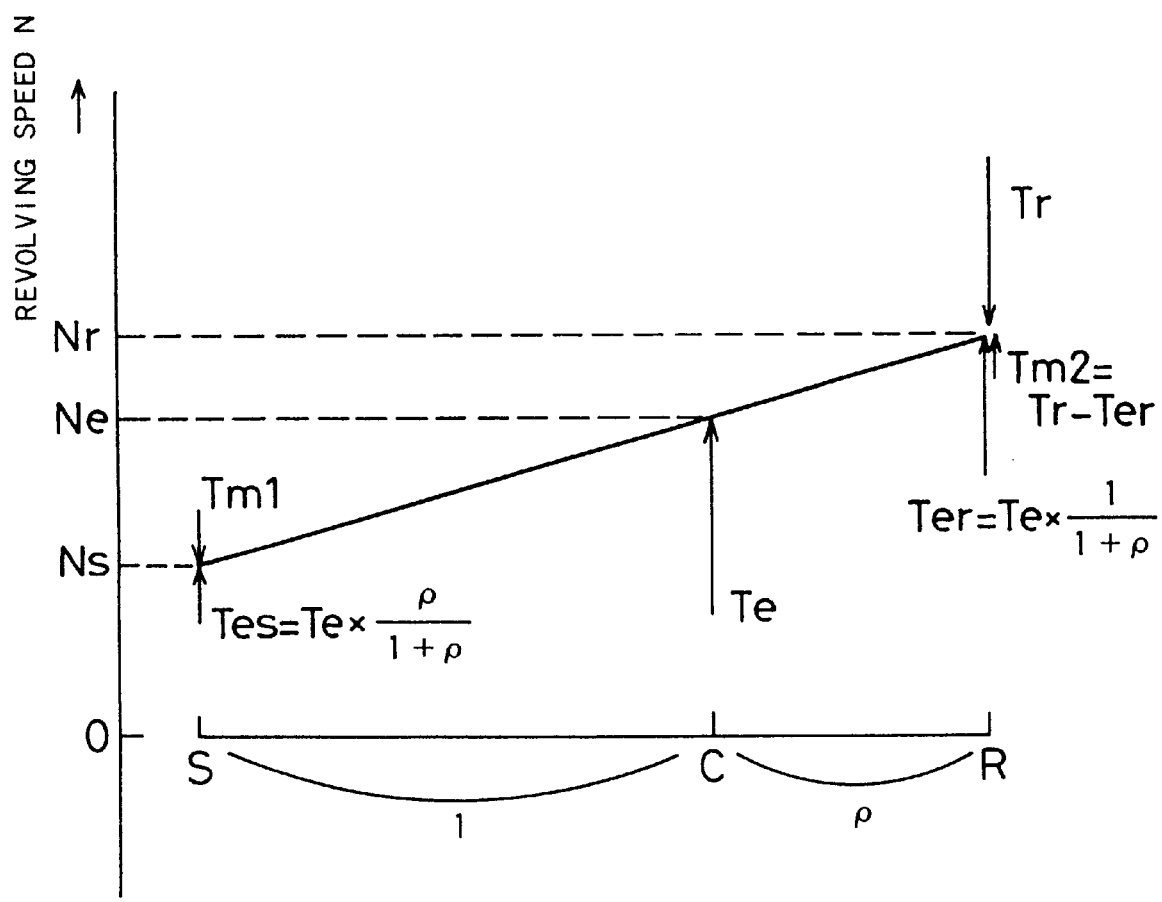
FIG. 22 is a nomogram showing the operation principle of the planetary gear 120.

According to the mechanics, the relationship between the revolving speed and the torque of the three shafts in the planetary gear 120 (that is, the sun gear shaft 125, the ring gear shaft 126, and the planetary carrier 124) can be expressed as a nomogram illustrated in FIG. 22 and solved geometrically. The relationship between the revolving speed and the torque of the three shafts in the planetary gear 120 may be analyzed numerically through calculation of energies of the respective shafts, without using the nomogram. For the clarity of explanation, the nomogram is used in this embodiment.

In the nomogram of FIG. 22, the revolving speed of the three shafts is plotted as ordinate and the positional ratio of the three shafts on a coordinate axis as abscissa. When a position S of the sun gear shaft 125 and a position R of the ring gear shaft 126 are on either ends of a line segment, a position C of the planetary carrier 124 is given as an interior division of the positions S and R at the ratio of 1 to ρ, where represents a ratio of the number of teeth of the sun gear 121 to that of the ring gear 122 and expressed as Equation (6a) given below:

$$\rho = \frac{\text{number of teeth of sun gear}}{\text{number of teeth of ring gear}} \qquad (6a)$$

As mentioned above, the engine 150 is driven at the revolving speed Ne, while the ring gear shaft 126 is driven at the revolving speed Nr. The revolving speed Ne of the engine 150 can thus be plotted on the position C of the planetary carrier 124 linked with the crankshaft 156 of the engine 150, and the revolving speed Nr of the ring gear shaft 126 on the position R of the ring gear shaft 126. A straight line passing through both the points is drawn (hereinafter referred to as dynamic collinear line). The value at the position S on the dynamic collinear line corresponds to a revolving speed Ns of the sun gear shaft 125. Namely the dynamic collinear line is used as a plane curve for proportional calculation of the revolving speed. The revolving speed Ns of the sun gear shaft 125 can be calculated from the revolving speed Ne of the engine 150 and the revolving speed Nr of the ring gear shaft 126 according to a proportional expression given as Equation (6) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)1 + \frac{\rho}{\rho} \qquad (6b)$$

The torque Te of the engine 150 is then applied upward (in the drawing) to the dynamic collinear line drawn in the nomogram of FIG. 22 at the position C of the planetary carrier 124. The dynamic collinear line against the torque can be handled as a rigid body which receives a force acting on each point as a vector. The force acting on one point is thus easily divided into the forces acting on two different points. The torque Te acting upward at the position C is then divided into a torque Tes on the position S and a torque Ter on the position R. The magnitudes of the torques Tes and Ter are given by Equations (7) below:

$$Tes = Te\frac{\rho}{1+\rho} \qquad (7)$$

$$Ter = Te\frac{1}{1+\rho}$$

The torque Te of the engine 150 acting on the position C, which represents the position of the planetary carrier 124, is treated as the torques on the positions S and R that correspond to either ends of the dynamic collinear line. The forces applied to the dynamic collinear line can accordingly be analyzed by determining the magnitudes of the torques externally applied to the positions S and R on both ends of the dynamic collinear line. The position S corresponding to the sun gear shaft 125 receives the torque of the first motor MG1, whereas the position R receives a reaction torque equal to the torque Ter, which is generated when the ring gear shaft 126 is driven at the revolving speed Nr. In case that the reaction torque Tr is identical with the torque required for driving the vehicle at the current speed, the vehicle continues running at a speed corresponding to the revolving speed Nr of the ring gear shaft 126. In the four-wheel-drive vehicle of this embodiment, the power required for driving the vehicle can be obtained by driving the second motor MG2. On the assumption that the coefficient of friction of the road surface is in an ideal state, a torque Tm2 produced by the second motor MG2 can be regarded as a torque acting at the position R for driving the vehicle. A torque Tm1 produced by the first motor MG1 is applied to the position S. In order to drive the vehicle in a desired state, it is required to control operation of the first and the second motors MG1 and MG2 and regulate the torques Tm1 and Tm2. If the torques are balanced in the state of FIG. 22, the torque Tm1 produced by the first motor MG1 is set equal to the torque allocation Tes of the engine torque Te. The torque Tm2 produced by the second motor MG2 is, on the other hand, set equal to the difference (=Tr−Ter) between the torque required for driving the vehicle at the current speed (speed corresponding to the revolving speed Nr), which is identical with the reaction torque Tr, and the torque allocation Ter of the engine torque Te.

The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy or power Pm2, which is given as the product of the torque Tm2 and the revolving speed Nr, to the axle of the rear wheels.

In case that the electrical energy Pm1 is identical with the electrical energy Pm2, all the electric power consumed by the second motor MG2 can be supplied by the electric power regenerated by the first motor MG1. In order to attain such a state, all the input energy should be output; that is, the energy Pe output from the engine 150 should be equal to the sum of energy Pf output to the sun gear shaft 125 and energy Pm output from the second motor MG2 to the axle of the rear wheels. Referring to FIG. 21, the power that is expressed as the product of the torque Te and the revolving speed Ne and output from the engine 150 driven at the driving point P1 is subjected to torque conversion, and output via the ring gear shaft 126 to the axle of the front wheels as the power expressed by the product of the torque Tr and the revolving speed Nr and to the axle of the rear wheels as the power expressed by the product of the torque Tm2 and the revolving speed Nr.

Figure 23:
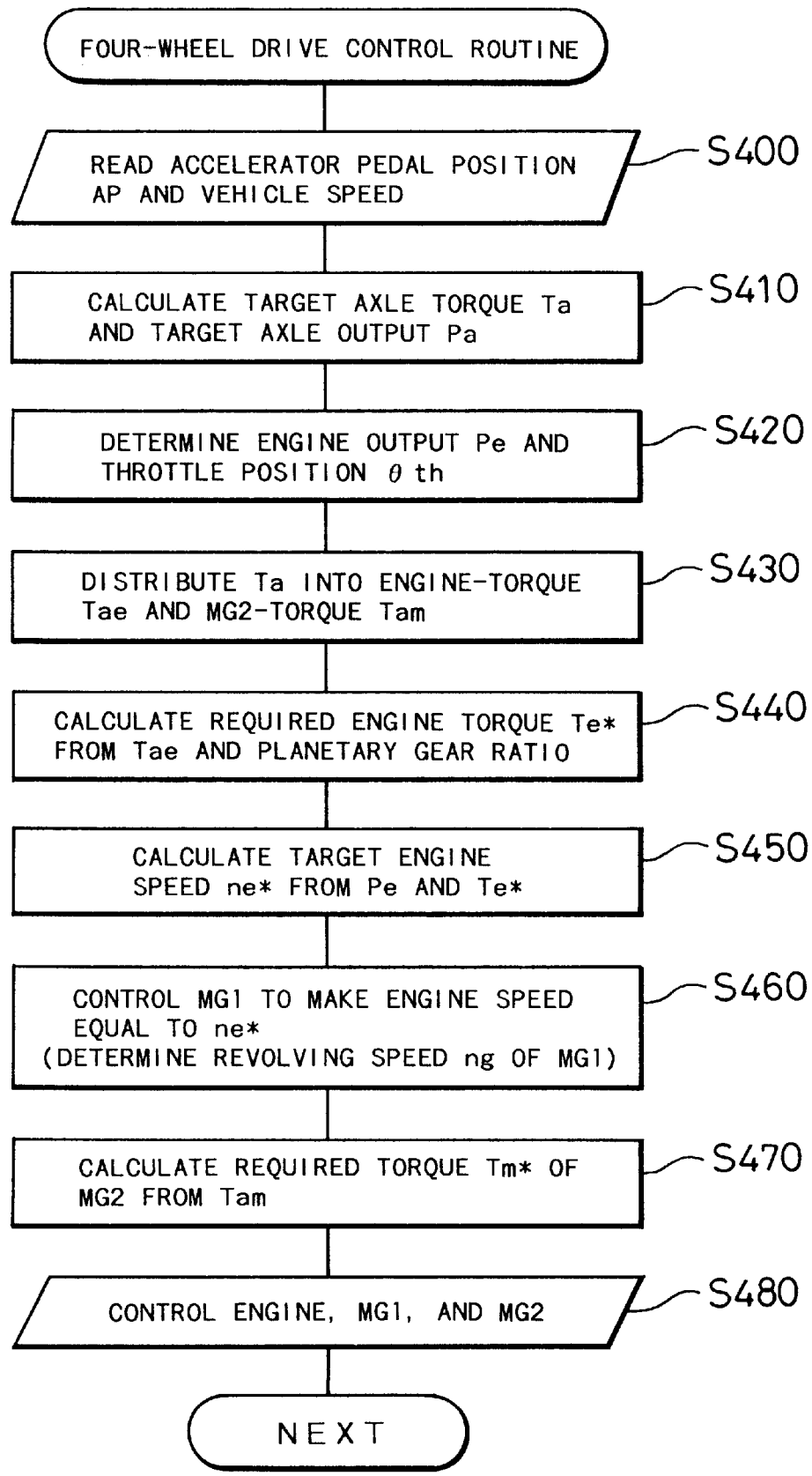
FIG. 23 is a flowchart showing a four-wheel-drive control routine executed by the controller 180 in the fifth embodiment.

Control of torque distribution in the four-wheel-drive vehicle having the above hardware structure is described next. The controller 180 repeatedly executes a four-wheel-drive control routine shown in the flowchart of FIG. 23. When the program enters the routine, the controller 180 first receives data of accelerator pedal position AP and vehicle speed (revolving speed na of the axle) at step S400. The accelerator pedal position AP is read from an accelerator pedal position sensor 164$a$. The vehicle speed may be calculated from the revolving speed of the rear-wheel axle read from the resolver 149, or otherwise may be directly read from a vehicle speed sensor (not shown) mounted on a propeller shaft.

Figure 24:
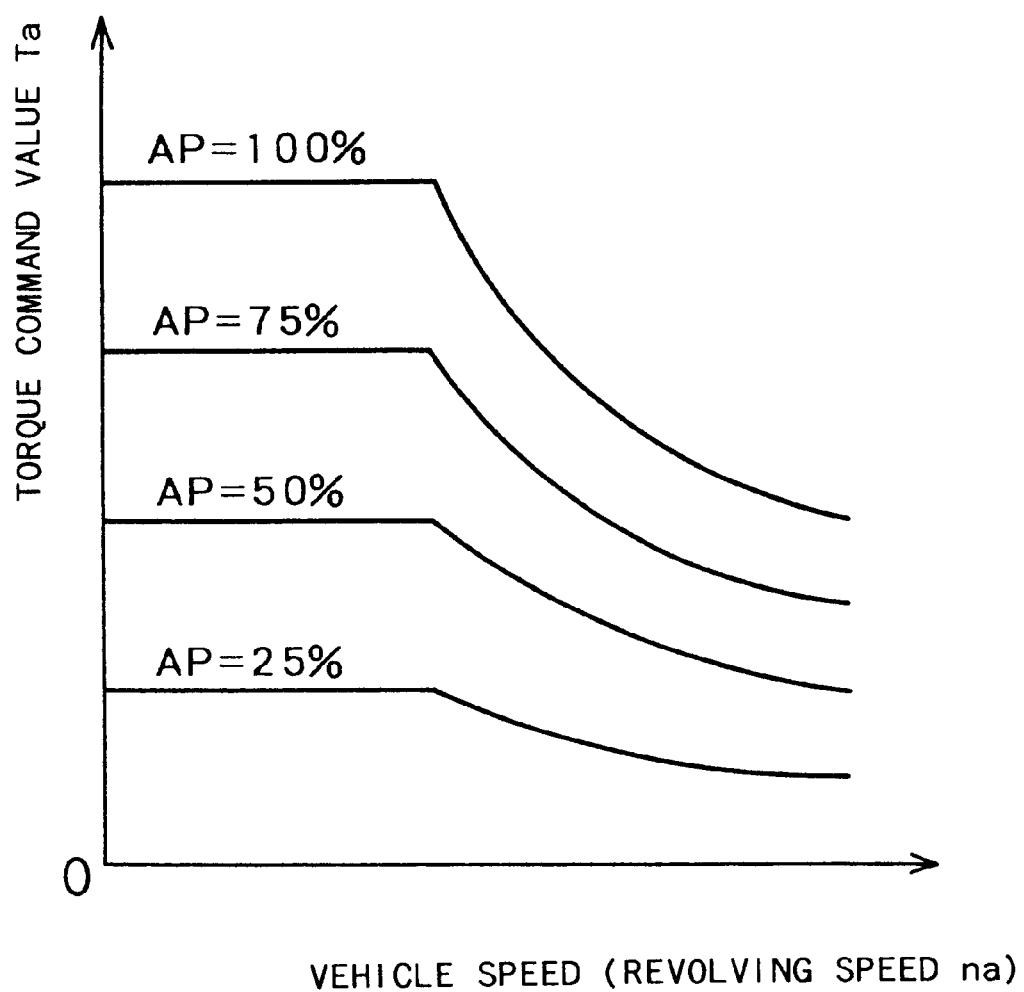
FIG. 24 is a graph used for obtaining the torque command value Ta based on the vehicle speed and the accelerator pedal position AP.
Figure 25:
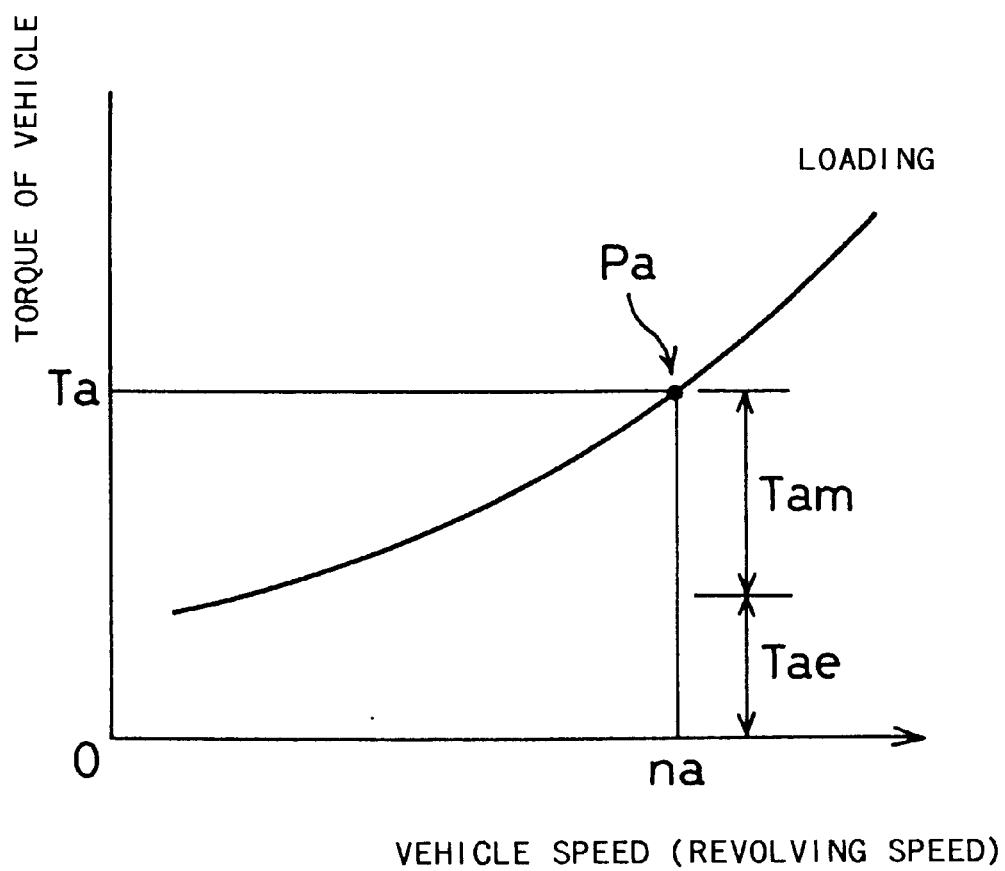
FIG. 25 is a graph used for determining the driving point of the engine 150 based on the vehicle speed and the torque of the vehicle.

The controller 180 then computes a torque command value Ta required for the vehicle and an output Pa of the vehicle from the accelerator pedal position AP and the vehicle speed (revolving speed na) at step S410. The torque command value Ta required for the vehicle is, for example, read from the graph of FIG. 24. The output Pa of the vehicle corresponds to a driving point defined by the torque Ta of the vehicle and the vehicle speed (revolving speed na) as shown in FIG. 25. On the assumption that the whole output Pa of the vehicle is generated by the engine 150, the controller 180 subsequently determines an output Pe of the engine 150 (Pe Pa) and a throttle position θth at step S420. At subsequent step S430, the torque Ta at the output Pa of the engine 150 is distributed into a torque allocation Tae of the engine 150 and a torque allocation Tam of the second motor MG2. This process determines the torque ratio, at which the torque is distributed into the front wheels and the rear wheels.

The controller 180 calculates a torque Te* required for the engine 150 from the torque allocation Tae of the engine 150 and the gear ratio of the planetary gear 120 at step S440, and subsequently computes a target revolving speed ne* of the engine 150 from the output Pe and the required torque Te* of the engine 150 at step S450. The first motor MG1 receives the results of these calculations and actually changes the driving state of the engine 150. As shown in the nomogram of FIG. 22, the dynamic collinear line is varied by the torques acting on either ends thereof. On the assumption that the vehicle runs at a constant speed and the right end of the dynamic collinear line (position R of the ring gear shaft 126) is fixed, the revolving speed of the engine 150 can be varied by adjusting the torque balance on the left end of the dynamic collinear line. A revolving speed ng of the first motor MG1 is thus determined to make the revolving speed of the engine 150 equal to ne* at step S460. The controller 180 also calculates a torque Tm* required for the second motor MG2 from the torque allocation Tam of the second motor MG2 at step S470.

The above steps determine all the operating points of the engine 150 and the first and the second motors MG1 and MG2, which are subjected to the control of the controller 180. The controller 180 accordingly gives an instruction to the EFIECU 170 to regulate the first driving circuit 191 and the other required constituents, so as to actually control the engine 150 and the motors MG1 and MG2 at step S480. The program then goes to NEXT and exits from this routine.

In the fifth embodiment discussed above, the planetary gear 120 is adopted for the distribution means, and the structure of mechanical distribution enables the power of the engine 150 to be freely distributed into the axle of the front wheels and the axle of the rear wheels. When the engine 150 is driven with a high revolving speed and a low torque, part of the power generated by the engine 150 is output to the front wheels via the planetary gear 120, the ring gear shaft 126, and the chain belt 129, whereas the residual power is taken out of the first motor MG1 via the first driving circuit 191 as the regenerative electric current. The regenerative electric current is supplied to the second motor MG2 via the second driving circuit 192 as the electric current for power operation. This structure enables the vehicle as a whole to be driven with a high torque. When the engine 150 is driven with a low revolving speed and a high torque, the electric current may be regenerated by the second motor MG2 on the side of the rear wheels and supplied to realize the power operation of the first motor MG1 on the side of the front wheels. This procedure implements the torque conversion to a high revolving speed and a low torque (overdrive control). The concrete procedures of such control are substantially identical with the procedures executed by the electric distribution-based four-wheel-drive vehicle discussed above as the first through the fourth embodiments.

Figure 26:
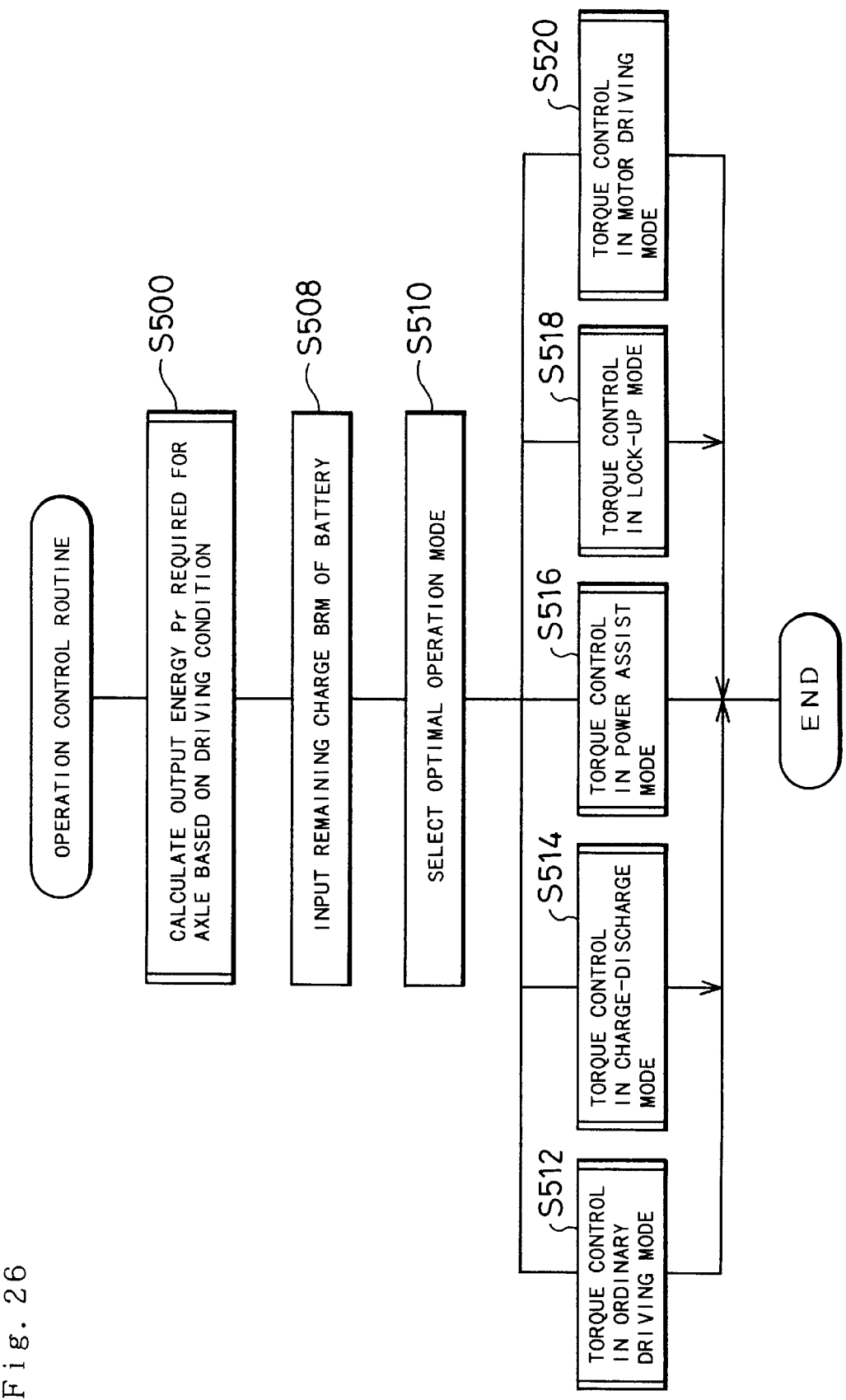
FIG. 26 is a flowchart showing an operation control routine executed in the four-wheel-drive vehicle of the mechanical distribution system.
Figure 27:
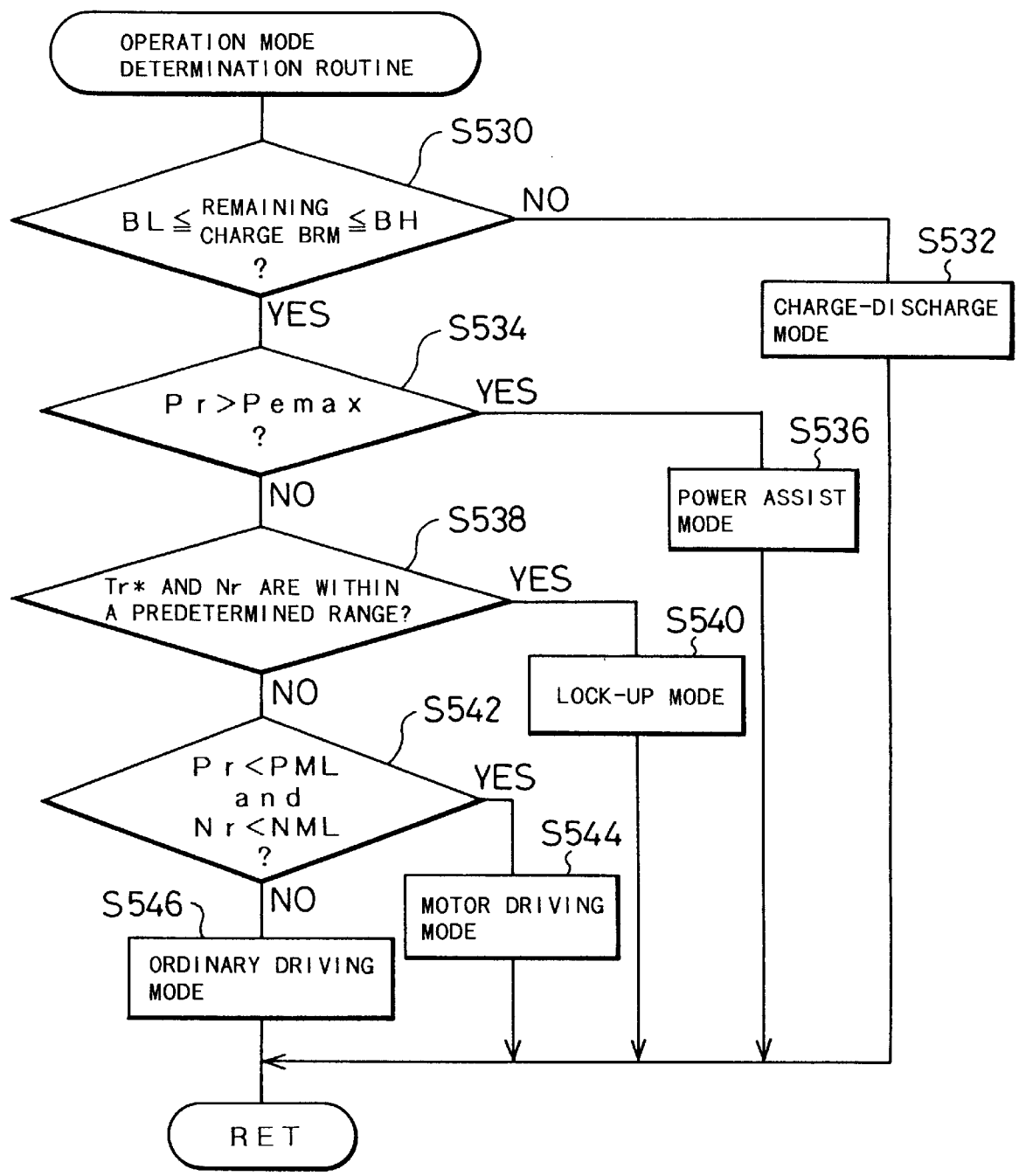
FIG. 27 is a flowchart showing an operation mode determination routine executed at step S510 in the flowchart of FIG. 26.

The four-wheel-drive vehicle of the fifth embodiment carries out the operation control based on an operation control routine shown in the flowchart of FIG. 26. When the program enters the operation control routine, the control CPU 190 of the controller 180 first calculates an output energy required for the vehicle based on the driving conditions of the vehicle, such as the accelerator pedal position AP, at step S500. The program then proceeds to step S508 to read the remaining charge BRM of the battery 194 measured with the remaining charge meter 199 and to step S510 to determine the operation mode. The determination of the operation mode is carried out according to an operation mode determination routine shown in the flowchart of FIG. 27. The operation mode determination routine selects an optimal operation mode of the four-wheel-drive vehicle under the current conditions, based on the data calculated or read at steps S500 and S508 in the operation control routine of FIG. 26. The following describes a concrete procedure of determining the operation mode, based on the operation mode determination routine of FIG. 27.

When the program enters the operation mode determination routine, the control CPU 190 of the controller 180 first determines whether or not the remaining charge BRM of the battery 194 is within a specific range defined by a first threshold value BL and a second threshold value BH at step S530. When the remaining charge BRM is out of the specific range, the program determines the necessity for charge or discharge of the battery 194 and proceeds to step S532, at which a charge-discharge mode is selected as the optimal operation mode of the four-wheel-drive vehicle. The first threshold value BL and the second threshold value BH respectively represent a lower limit and an upper limit of the remaining charge BRM of the battery 194. In this embodiment, the first threshold value BL is set to be equal to or greater than a required amount of electric power for continuing operation only with the second motor MG2 in a motor driving mode or addition of electric power discharged from the battery 194 in a power assist mode for a predetermined time period. The second threshold value BH is, on the other hand, set to be equal to or less than a value obtained by subtracting an amount of electric power that is regenerated by the first motor MG1 or the second motor MG2 when the vehicle stops from an ordinary running state, from the remaining charge BRM under the full-charge condition of the battery 194.

When the remaining charge BRM of the battery 194 is determined to be within the specific range defined by the first threshold value BL and the second threshold value BH at step S530, on the contrary, the program proceeds to step S534, at which the energy Pr to be output as the driving force of the whole vehicle is compared with a maximum energy Pemax that can be output from the engine 150. When the output energy Pr exceeds the maximum energy Pemax, the program determines the necessity for supplementing the insufficiency of the maximum energy Pemax output from the engine 150 by the energy stored in the battery 194 and proceeds to step S536, at which a power assist mode is selected as the optimal operation mode of the four-wheel-drive vehicle.

When the energy Pr to be output as the driving force is equal to or less than the maximum energy Pemax that can be output from the engine 150 at step S534, on the other hand, the program goes to step S538, at which it is determined whether or not a sum Tr* of torque command values of the front wheels and the rear wheels and an axial revolving speed Nr are within a predetermined range. When the total torque command value Tr* and the revolving speed Nr are within the predetermined range, a lock-up mode, in which rotation of the sun gear shaft 125 is stopped, is selected as the optimal operation mode of the four-wheel-drive vehicle at step S540. The predetermined range herein represents a specific range that allows the engine 150 to be driven at a high efficiency while the sun gear 121 stops its rotation. In accordance with a concrete procedure, the relationship between the revolving speed of the ring gear shaft 126 and the torque output to the ring gear shaft 126 when the engine 150 is driven at respective driving points within the specific range, which allows the engine 150 to be driven at a high efficiency while the sun gear 121 stops its operation, is prepared in advance and stored as a map in the ROM 190b. It is accordingly determined at step S538 whether or not the driving point defined by the total torque command value Tr* and the revolving speed Nr is within the range of the map. The specific range that allows the engine 150 to be driven at a high efficiency is shown as an area QW of one-dot chain line in the graph of FIG. 21. In the graph of FIG. 21, the engine 150 can be driven within an area QE, whereas the engine 150 can be driven at a high efficiency in the area QW. The area QW depends upon the driving efficiency of the engine 150, the emission, and the other conditions and can be set in advance experimentally.

When it is determined that the total torque command value Tr* and the axial revolving speed Nr are out of the predetermined range at step S538, the program further proceeds to step S542, at which it is determined whether or not the energy Pr to be output as the driving force is smaller than a predetermined energy PML and whether or not the revolving speed Nr of the ring gear shaft 126 is lower than a predetermined revolving speed NML. When both the answers are YES at step S542, the program goes to step S544 to set a motor driving mode, in which only the second motor MG2 is driven, as the optimal operation mode of the four-wheel-drive vehicle. Since the engine 150 lowers its efficiency under the condition of low revolving speed and small torque, the predetermined energy PML and the predetermined revolving speed NML are set as the energy Pr and the revolving speed Nr that define a certain operation range of the engine 150, in which the driving efficiency of the engine 150 is smaller than a predetermined level. The concrete values of PML and NML are determined by taking into account the properties of the engine 150 and the gear ratio of the planetary gear 120. When the output energy Pr is equal to or greater than the predetermined energy PML or when the revolving speed Nr is equal to or higher than the predetermined revolving speed NML at step S542, the program proceeds to step S546, at which an ordinary driving mode is selected as the optimal operation mode of the four-wheel-drive vehicle for ordinary driving.

Figure 28:
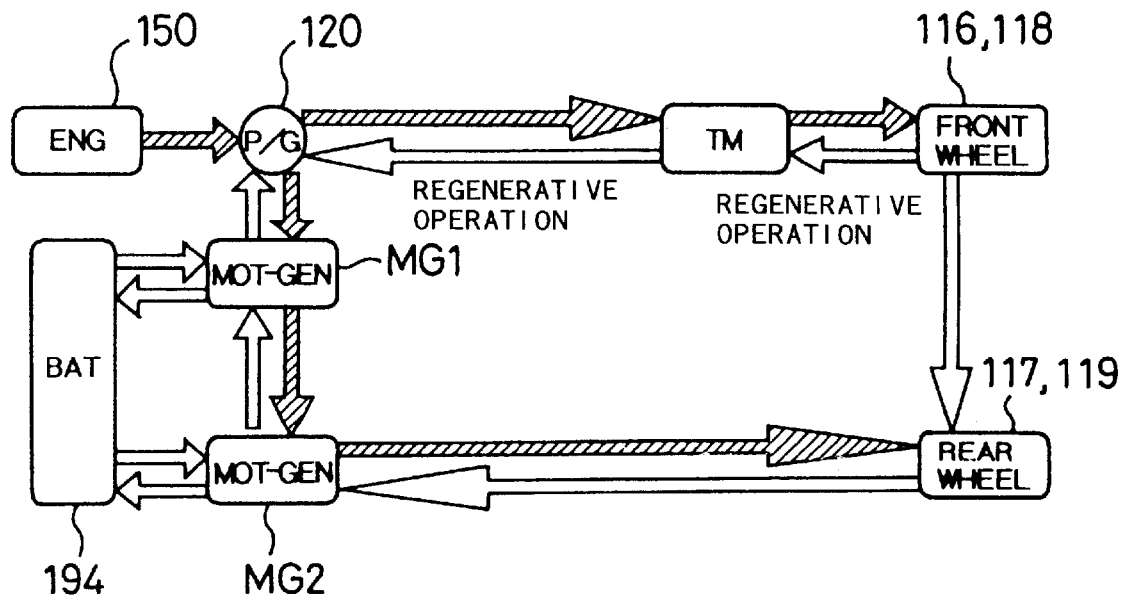
FIG. 28 shows a state in which the power of the engine 150 is distributed into the front wheels and the rear wheels.
Figure 29:
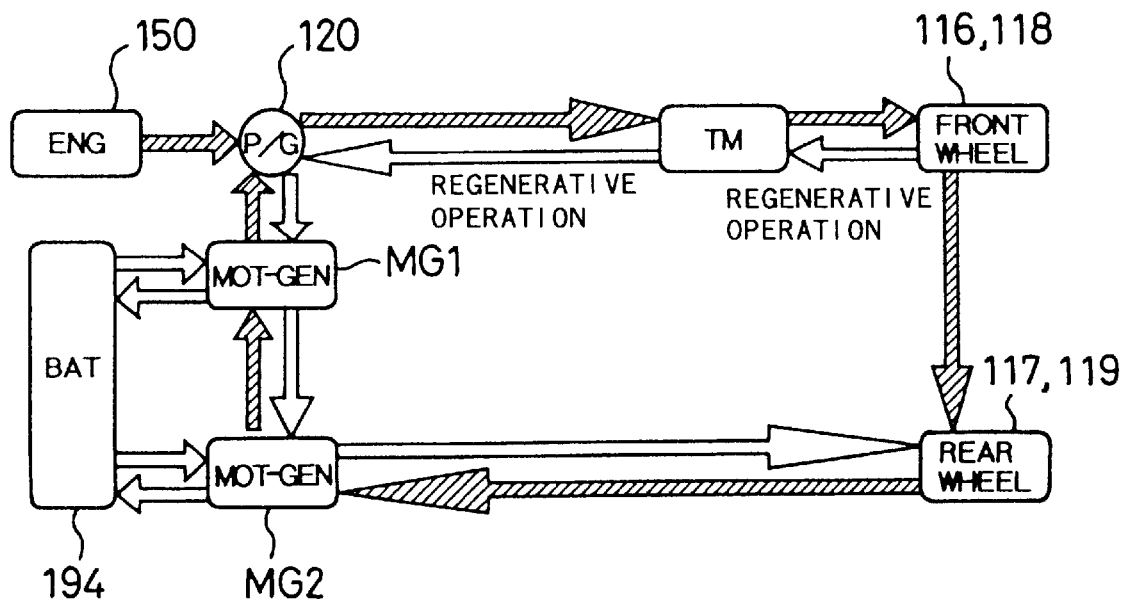
FIG. 29 shows a state in which the power of the engine 150 is transmitted from the front wheels to the rear wheels and recovered on the side of the rear wheels.

After the determination of the optimal operation mode, the four-wheel-drive vehicle is driven in the selected mode and executes the required torque control (steps S512 through S520). The concrete procedures of the torque control are identical with those executed by the electric distribution-based four-wheel drive vehicle, and are not specifically described here. Power flows in some of the typical control modes are shown in FIGS. 28 through 33. These drawings do not perfectly correspond to the operation modes discussed above, but teach the difference in power transmission route for the different torque control modes. In each drawing, arrows show the flows of energy; the hatched arrows represent actual energy flows in the operation mode while the open arrows represent virtual energy flows. FIG. 28 shows an energy flow in the ordinary driving mode, in which the power is distributed by the planetary gear 120 into the front wheels and the rear wheels. FIG. 29 shows an energy flow in the state of overdrive control. In the overdrive control, energy is recovered from the rear wheels, which receive the driving force of the front wheels and consequently rotate at the same revolving speed as that of the front wheels. The recovered energy is regenerated by the second motor MG2 to drive the first motor MG1, thereby increasing the revolving speed of the front wheels via the planetary gear 120 to be higher than the revolving speed of the engine 150.

Figure 30:
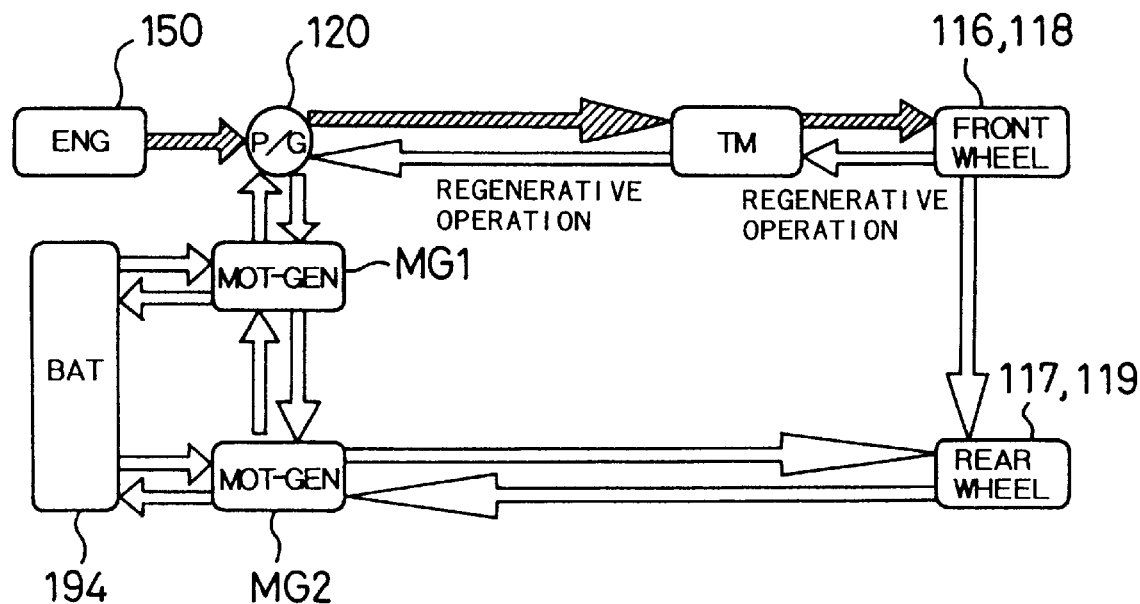
FIG. 30 shows a state in which all the power of the engine 150 is output to the front wheels.
Figure 31:
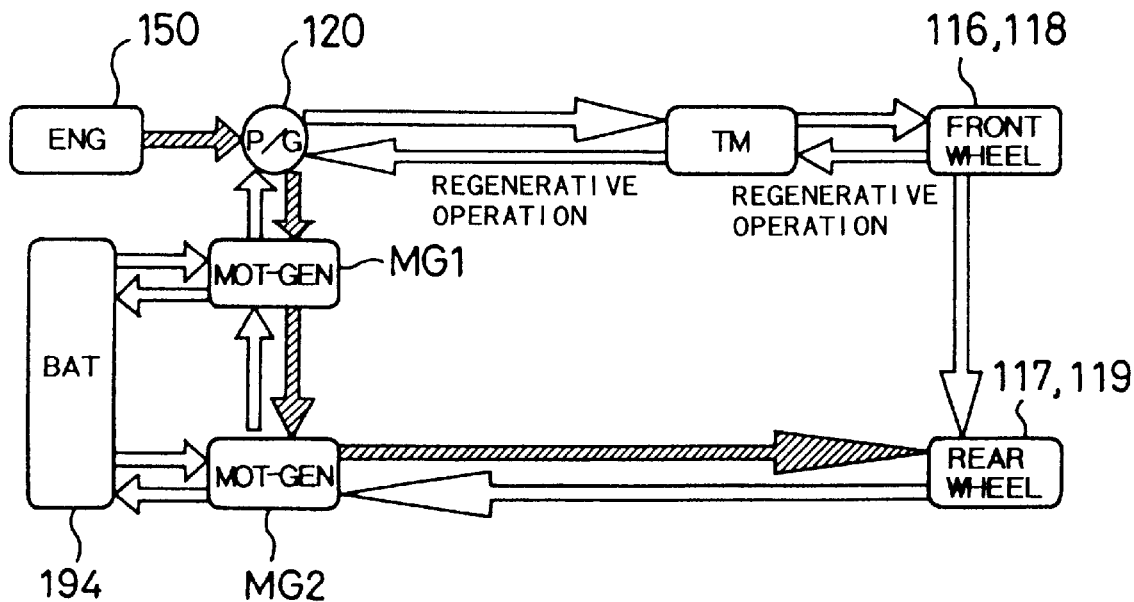
FIG. 31 shows a state in which all the power of the engine 150 is output to the rear wheels.
Figure 32:
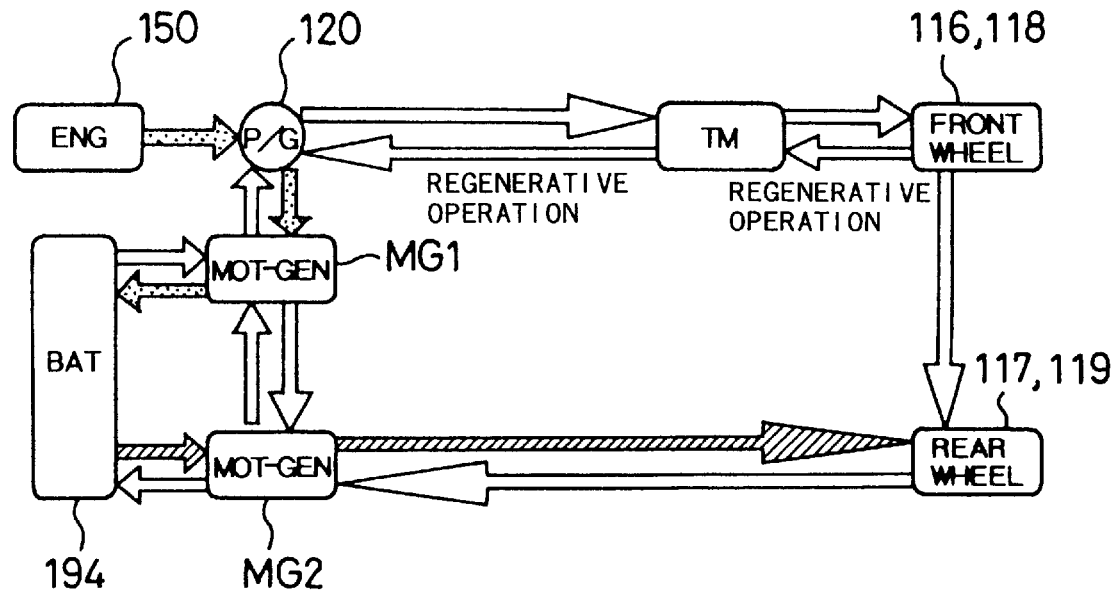
FIG. 32 shows a state in which the power of the engine 150 is converted to electrical energy and stored in the battery 194 before being output to the rear wheels.
Figure 33:
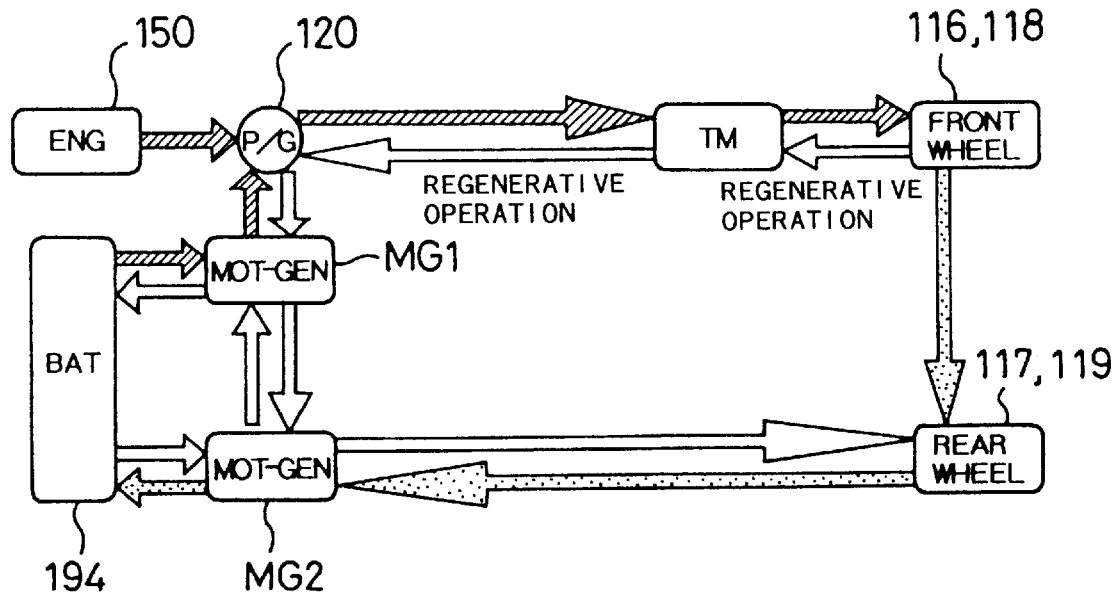
FIG. 33 shows a state in which the power of the engine 150 is transmitted from the front wheels to the rear wheels, recovered on the side of the rear wheels, and stored into the battery 194.

FIGS. 30 and 31 show energy flows in a specific driving mode, in which the output of the engine 150 is transmitted only to the front wheels or to the rear wheels. All the energy of the engine 150 is output only to the front wheels in the flow of FIG. 30, while all the energy of the engine 150 is output only to the rear wheels in the flow of FIG. 31. In these cases, it is required to lock the ring gear shaft 126 and keep the front wheels 116 and 118 in a neutral state. FIG. 32 shows an energy flow when all the energy of the engine 150 is recovered by the first motor MG1 in the form of regenerative electric current, which is stored in the battery 194 and then output only to the rear wheels. The regenerative electric current is stored in the battery 194 because only a small amount of energy is required for driving the vehicle and the engine 150 is driven in an intermittent manner. In the flow of FIG. 33, the second motor MG2 carries out the regenerative operation, in addition to the transmission of electric power between the battery 194 and the motors MG1 and MG2.

Figure 34:
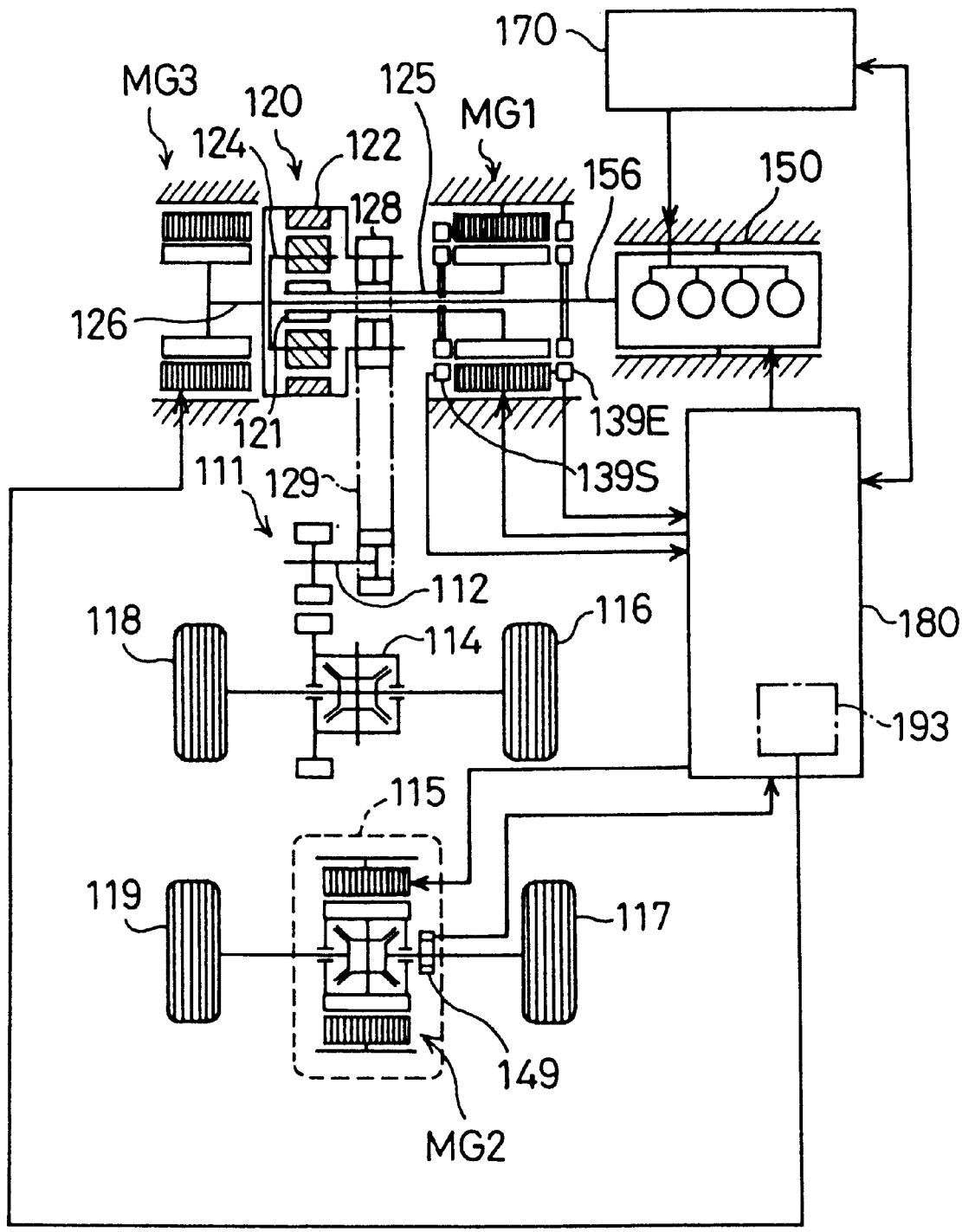
FIG. 34 schematically illustrates a hardware structure of a sixth embodiment according to the present invention.

The following describes a sixth embodiment according to the present invention. A four-wheel-drive vehicle of the sixth embodiment has structure shown in FIG. 34. The structure of the four-wheel-drive vehicle in the sixth embodiment is identical with that of the fifth embodiment, except that a third motor MG3 corresponding to the third motor of the present invention is linked with the ring gear shaft 126. The third motor MG3 has the same structure as that of the first motor MG1. In this embodiment, the controller 180 further includes a third driving circuit 193, which has the same structure as that of the first driving circuit 191. The four-wheel-drive vehicle thus constructed executes a control process shown in the flowchart of FIG. 35.

Figure 35:
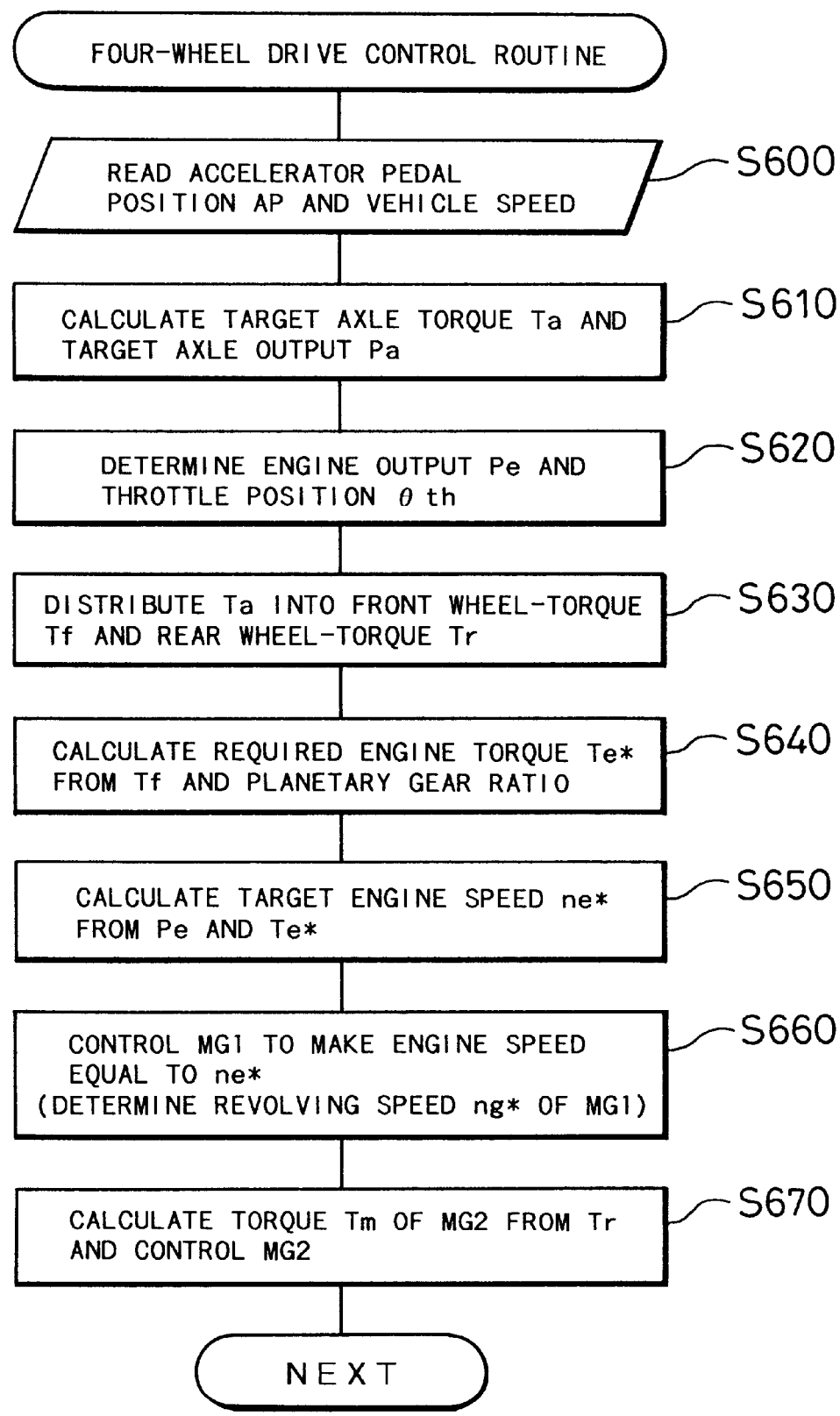
FIG. 35 is a flowchart showing a four-wheel-drive control routine executed in the sixth embodiment.

When the program enters the four-wheel-drive control routine of FIG. 35, the controller 180 first receives data of accelerator pedal position AP and vehicle speed (revolving speed na of the axle) at step S600. The accelerator pedal position AP is read from an accelerator pedal position sensor 164a. The vehicle speed may be calculated from the revolving speed of the rear-wheel axle read from the resolver 149, or otherwise may be directly read from a vehicle speed sensor (not shown) mounted on a propeller shaft.

The controller 180 then computes a torque command value Ta required for the vehicle and an output Pa of the vehicle from the accelerator pedal position AP and the vehicle speed (revolving speed na) at step S610. The torque command value Ta required for the vehicle is, for example, read from the graph of FIG. 24 as described in the fifth embodiment. The output Pa of the vehicle corresponds to a driving point defined by the torque Ta of the vehicle and the vehicle speed (revolving speed na) as shown in FIG. 25.

On the assumption that the whole output Pa of the vehicle is generated by the engine 150, the controller 180 subsequently determines an output Pe of the engine 150 (Pe←Pa) and a throttle position θth at step S620. At subsequent step S630, the torque Ta at the output Pa of the engine 150 is distributed into a torque allocation Tf of the front wheels and a torque allocation Tr of the rear wheels. This process determines the torque ratio, at which the torque is distributed into the front wheels and the rear wheels.

The controller 180 calculates a torque Te* required for the engine 150 from the torque allocation Tf of the front wheels and the gear ratio of the planetary gear 120 at step S640, and subsequently computes a target revolving speed ne* of the engine 150 from the output Pe and the required torque Te* of the engine 150 at step S650. The first motor MG1 receives the results of these calculations and actually changes the driving state of the engine 150. A revolving speed ng of the first motor MG1 is then determined to make the revolving speed of the engine 150 equal to ne* at step S660. The controller 180 subsequently calculates an output torque Tm of the second motor MG2 directly linked with the rear wheels from the torque allocation Tr of the rear wheels, and controls the second motor MG2 at step S670.

The above steps determine all the operating points of the engine 150 and the first and the second motors MG1 and MG2, which are subjected to the control of the controller 180. The controller 180 accordingly gives an instruction to the EFIECU 170 to regulate the first driving circuit 191 and the other required constituents, so as to actually control the engine 150 and the motors MG1 and MG2 at steps S660 and S670. The program then goes to NEXT and exits from this routine.

Figure 36:
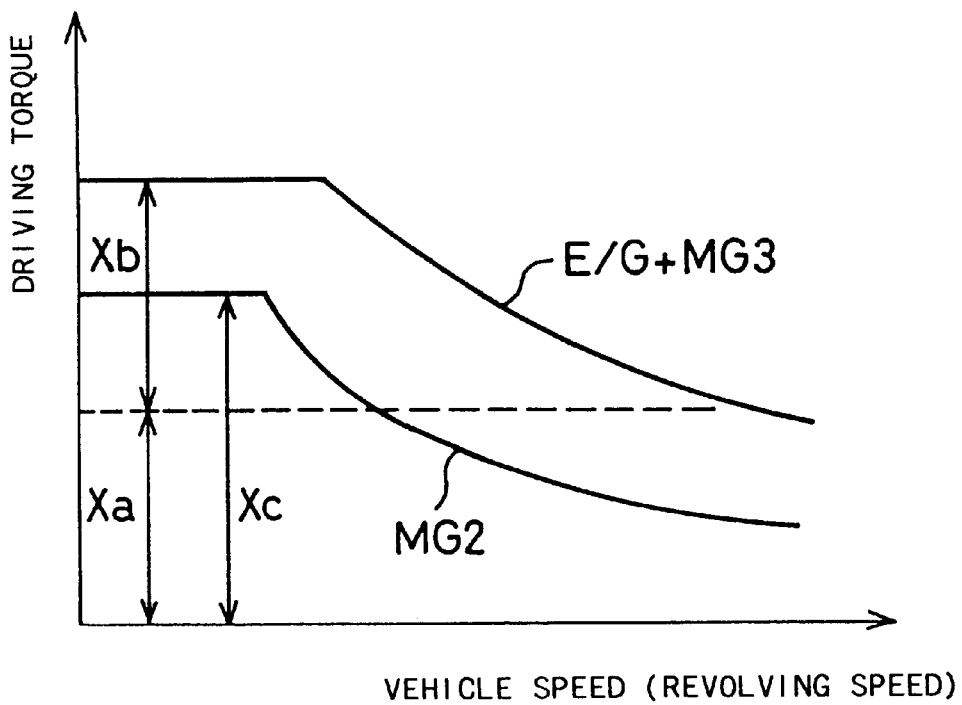
FIG. 36 shows a possible range of power distribution in the sixth embodiment.
Figure 37:
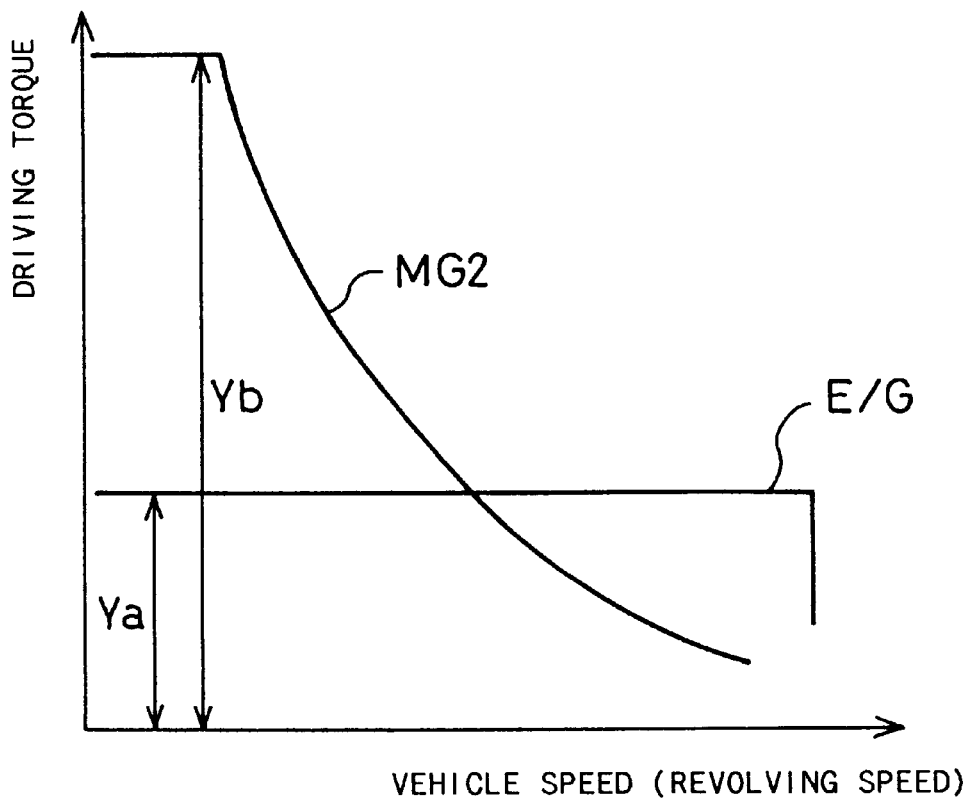
FIG. 37 shows a possible range of power distribution in the fifth embodiment.

Compared with the structure of the fifth embodiment, the four-wheel-drive vehicle of the sixth embodiment discussed above has the third motor MG3 corresponding to the third motor of the present invention in the pathway of power transmission. The maximum driving torque that can be output to the axle of the front driving wheels 116 and 118 is thus obtained by adding the torque of the third motor MG3 to the torque of the engine 150 as shown in FIG. 36. The driving torque that can be output to the axle of the rear driving wheels 117 and 119 is, on the other hand, determined by the torque of the second motor MG2. The structure including the third motor MG3 gives the greater maximum driving torque to the front wheels than the same given by the structure without the third motor MG3 (illustrated in FIG. 37). This results in an extremely large degree of freedom in torque distribution to the front wheels and the rear wheels. In the structure of the fifth embodiment, the maximum driving torque given to the front wheels is limited to the maximum driving torque of the engine 150 at the moment. Namely the range of the distribution ratio Ya to Yb is restricted by the output torque of the engine 150. In the structure of the sixth embodiment, on the other hand, the range of the distribution ratio (Xa+Xb) to Xc is not restricted by the output torque of the engine 150. This structure remarkably increases the degree of freedom in distribution of the driving force.

Figure 38:
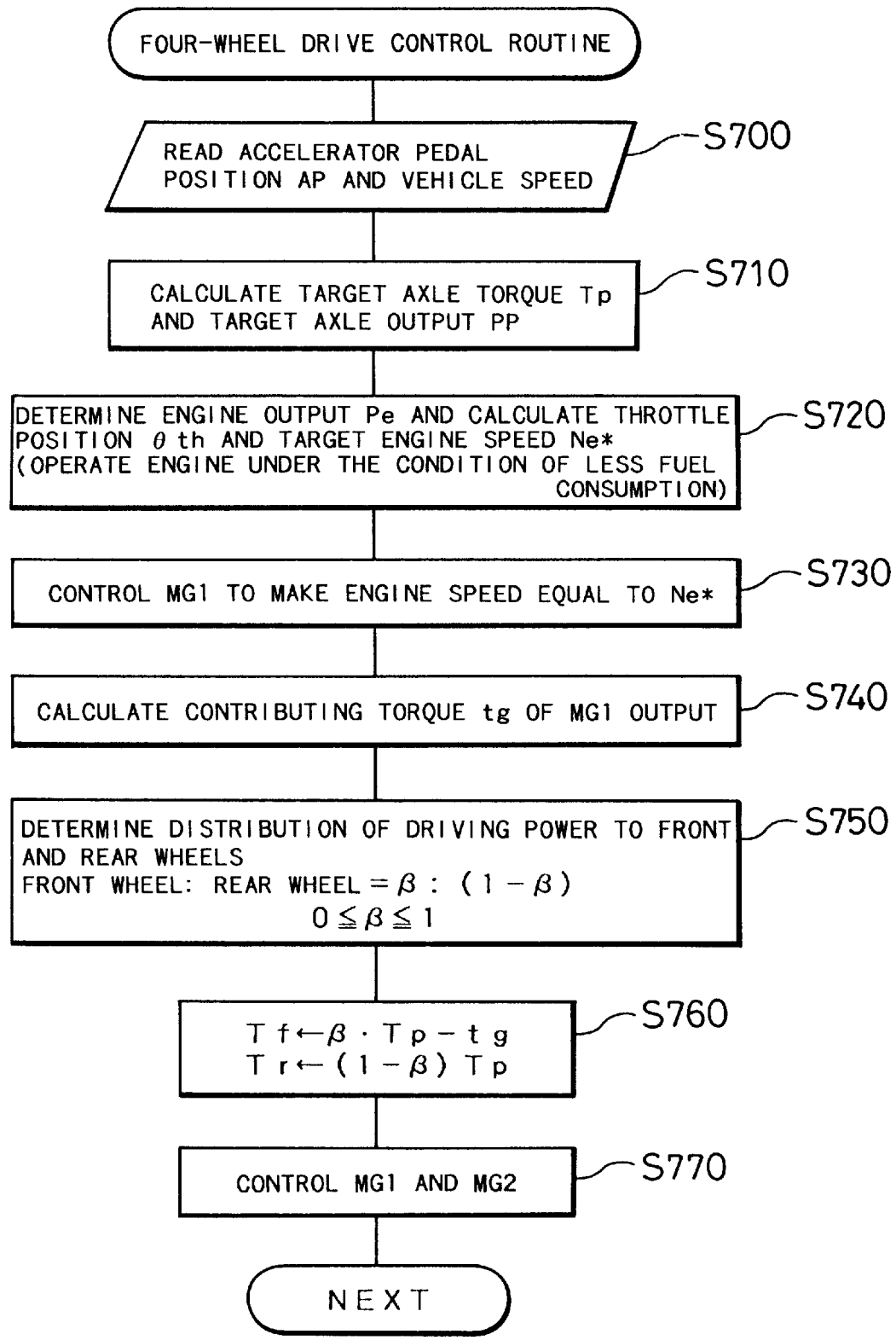
FIG. 38 is a flowchart showing a four-wheel-drive control routine executed in a seventh embodiment according to the present invention.

The following describes a seventh embodiment according to the present invention. A four-wheel-drive vehicle and a power transmission apparatus incorporated therein have the same hardware structure as that of the sixth embodiment, but follow a different control procedure. FIG. 38 is a flowchart showing a control process executed in the seventh embodiment. When the program enters the four-wheel-drive control routine of FIG. 38, the controller 180 first receives data of accelerator pedal position AP and vehicle speed (revolving speed Na of the axle) at step S700.

The controller 180 then computes a torque command value Ta required for the vehicle and an output PP of the vehicle from the accelerator pedal position AP and the vehicle speed (revolving speed Na) at step S710. On the assumption that the whole output PP of the vehicle is generated by the engine 150, the controller 180 subsequently determines an output Pe of the engine 150 (Pe←PP), and calculates a throttle position θth and a target revolving speed Ne* of the engine 150 to attain this output at step S720. Not only the output Pe but the target revolving speed Nd* of the engine 150 is determined at step S720, in order to enable the engine 150 to be driven in a state of lowest fuel consumption or best emission as discussed below.

Figure 39:
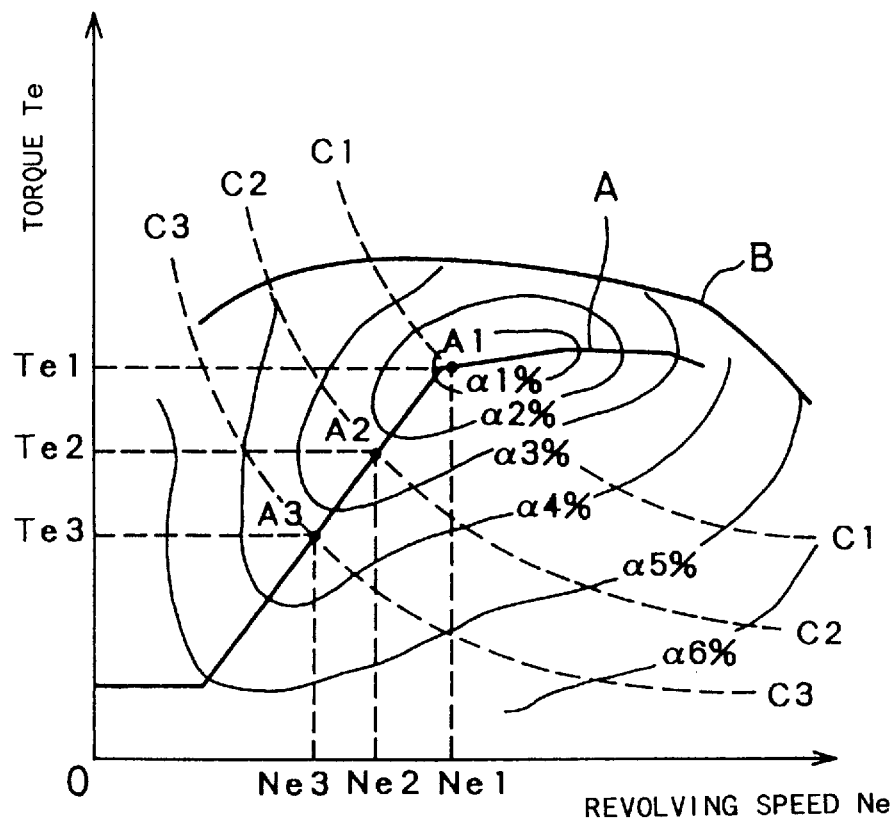
FIG. 39 is a graph showing the relationship between the driving point of the engine 150 and the efficiency.

FIG. 39 is a graph showing the relationship between the driving point of the engine 150 (defined by the engine torque Te and the engine speed Ne) and the efficiency of the engine 150. The curve B in FIG. 39 represents a boundary of an engine-operable range, in which the engine 150 can be driven. In the engine-operable range, efficiency curves, such as curves 1 through 6, can be drawn by successively joining the driving points having the identical efficiency. In the engine-operable range, constant energy curves expressed as the product of the torque Te and the revolving speed Ne, such as curves C1—C1 through C3—C3, can also be drawn. The graph of FIG. 40 shows the efficiency of the respective driving points along the constant energy curves C1—C1 through C3—C3 plotted against the revolving speed Ne of the engine 150.

Figure 40:
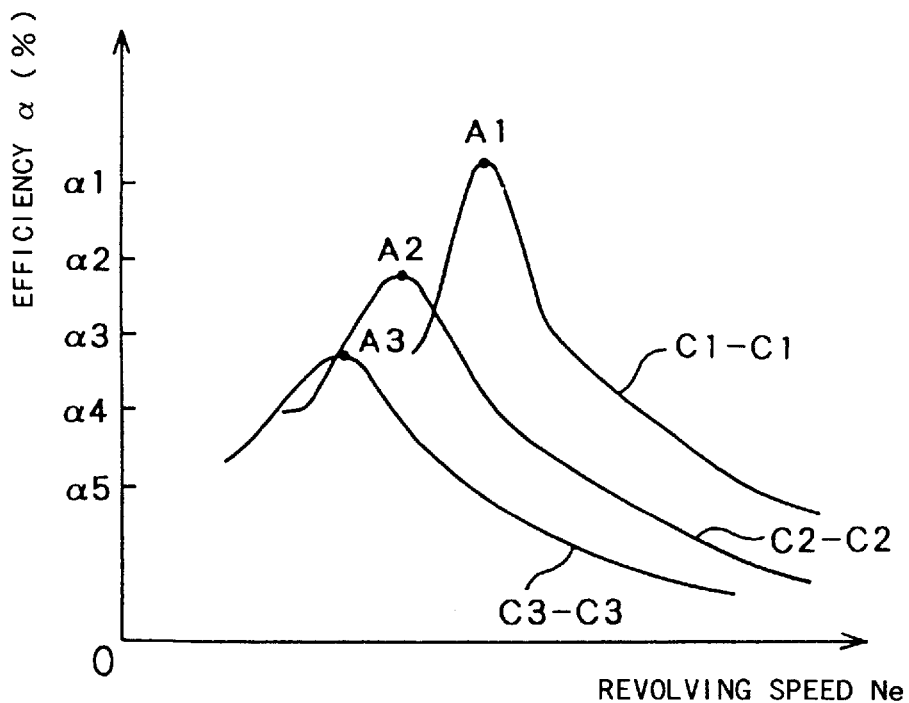
FIG. 40 is a graph showing the efficiency of the respective driving points along the constant energy curves plotted against the revolving speed Ne of the engine 150.

Referring to FIG. 40, the efficiency of the engine 150 with respect to the same output energy is significantly varied by the driving point of the engine 150. On the constant energy curve C1—C1, for example, the efficiency of the engine 150 reaches its maximum when the engine 150 is driven at a driving point A1 (torque Te1 and revolving speed Ne1). Such a driving point attaining the highest possible efficiency exists on each constant energy curve; a driving point A2 for the constant energy curve C2—C2 and a driving point A3 for the constant energy curve C3—C3. The curve A in FIG. 39 is obtained by joining such driving points attaining the highest possible efficiency of the engine 150 for the respective amounts of output energy Pr by a continuous curve. In this embodiment, the map representing the relationship between each driving point (torque Te and revolving speed Ne) on the curve A and the output energy Pr is used for setting the target revolving speed Ne* of the engine 150. The curve A is drawn as a continuous curve, in order to avoid a discontinuous abrupt change of the energy Pr.

After determining the optimum driving condition of the engine 150 to attain the required output PP, the controller 180 controls the first motor MG1 to make the revolving speed of the engine 150 equal to the target revolving speed Ne* at step S730. Namely the first motor MG1 shifts the driving condition of the engine 150 along the curve A shown in FIG. 39 to the optimum point of low fuel consumption. At subsequent step S740, the controller 180 calculates a torque tg, which is contributed by the operation of the first motor MG1. Since the first motor MG1 is linked with the planetary gear 120, operation of the first motor MG1 contributes to the torque given to the axle.

The controller 180 subsequently determines a distribution ratio, at which the driving force is distributed into the front wheels and the rear wheels at step S750. When the distribution ratio of the driving force is expressed as β, the distribution of the driving force into the front wheels and the rear wheels is given as β: (1−β) (0 ≦β≦1). At subsequent step S760, a torque allocation Tf of the front wheels and a torque allocation Tr of the rear wheels are calculated from the distribution ratio β. The torque allocation Tf of the front wheels and the torque allocation Tr of the rear wheels are calculated by Equation (8) from a torque Tp required for the whole vehicle, the contributing torque tg of the first motor MG1, and the distribution ratio β:

$$Tf \leftarrow \beta \cdot Tp - tg$$

$$Tr \leftarrow (1-\beta) \cdot Tp \qquad (8)$$

The controller 180 controls the motors MG2 and MG3 to attain the torque allocations of the front wheels and the rear wheels at step S770. The program then goes to NEXT and exits from the routine.

The structure of the seventh embodiment can freely change the distribution ratio β between 0 and 1, thereby enabling the distribution of the driving force into the front wheels and the rear wheels to be freely controlled in an extremely wide range with the priority to the control of the driving condition of the engine 150. The distribution ratio can be set according to the operation mode and the condition of the road surface. This structure realizes arbitrary distribution of the driving force while taking into account the fuel consumption and emission of the engine 150. The structure of the seventh embodiment also allows the braking force by the regenerative control to be freely distributed into the front wheels and the rear wheels, thereby realizing the anti-braking system and the control of the driving force.

In the seventh embodiment, the output of the engine 150 is connected to the drive shaft of the front wheels. In accordance with an alternative structure, the output of the engine 150 may be connected to the drive shaft of the rear wheels. In this case, the torque is distributed into the front wheels and the rear wheels at the distribution ratio β according to Equation (9) given as:

$$Tf \leftarrow \beta \cdot Tp + tg$$

$$Tr \leftarrow (1-\beta)Tp - tg \qquad (9)$$

Figure 41:
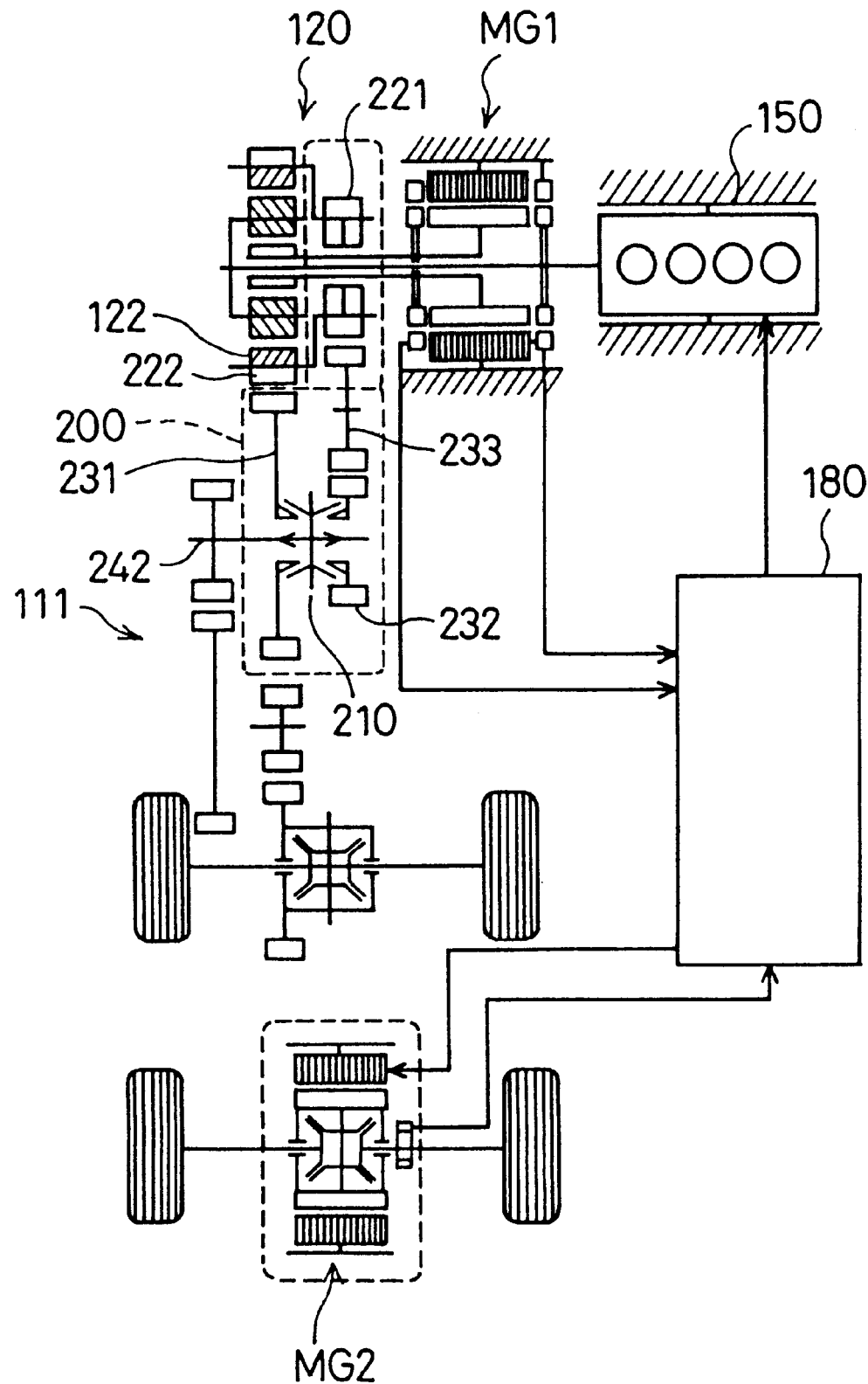
FIG. 41 schematically illustrates a modified structure of the mechanical distribution system.

The present invention is not restricted to the above embodiments, but there may be many modifications, changes, and alterations without departing from the scope or spirit of the main characteristics of the present invention. By way of example, the arrangement of the clutch motor 30 and the assist motor 40 with respect to the front wheels and the rear wheels as well as the arrangement of the motors MG1 through MG3 with respect to the front wheels and the rear wheels may be inverted according to the requirements. As shown in FIG. 41, in place of the chain belt 129, a double-gear structure 200 including a reverse mechanism may be used for the site of taking the power out of the planetary gear 120 to the axle of the front wheels. The double-gear structure 200 includes a first gear 231 that engages with a first connection gear 221 connected to the ring gear 122, and a second gear 232 that engages with a second connection gear 222 connected to the ring gear 122 via a reverse rotation gear 232. Gear switching means 210 functions to switch a drive shaft 242 of the power transmission gear 111 to engage either with the first gear 231 or with the second gear 232. This enables the output from the planetary gear 120 to be rotated in either the normal direction or in the reverse direction, thereby allowing the vehicle to move backward with the engine 150 rotating in a fixed direction.

Figure 42:
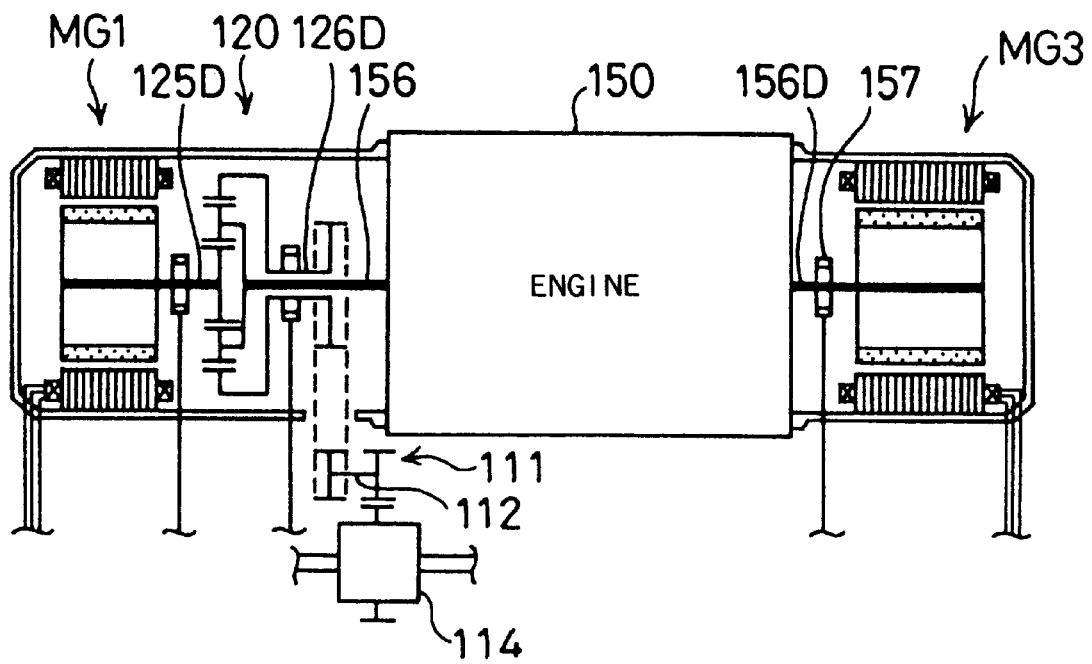
FIG. 42 schematically illustrates a modified structure of the mechanical distribution system.
Figure 43:
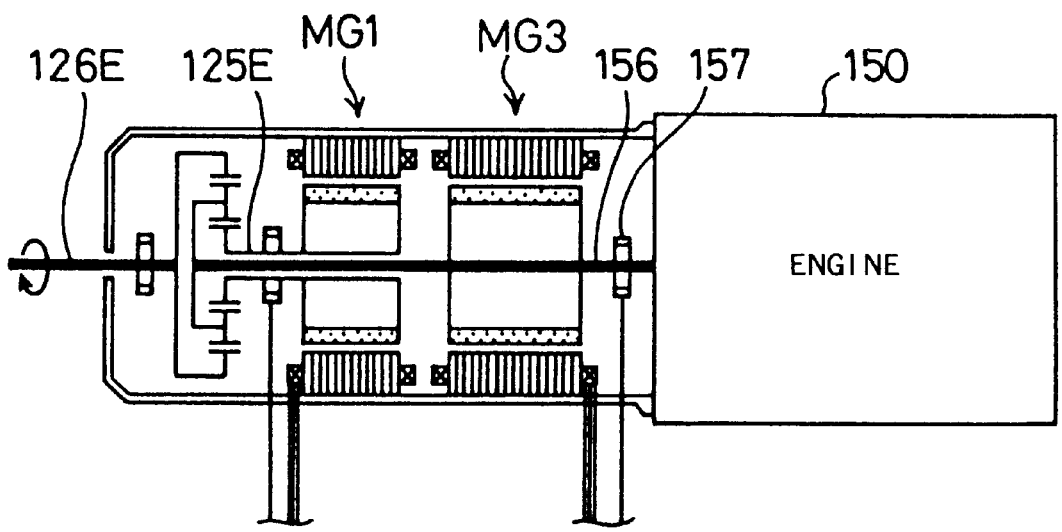
FIG. 43 schematically illustrates a modified structure of the mechanical distribution system.

In the structures of the sixth and seventh embodiments, the motors MG1 and MG3 and the planetary gear 120 are linked with the crankshaft 156 of the engine 150. There are, however, many possible variations. By way of example, as shown in FIG. 42, the engine 150 may be interposed between the motors MG1 and MG3. In the above embodiments, the power output to the ring gear shaft 126 is taken out of the space between the motors MG1 and MG3 via the power feed gear 128 linked with the ring gear 122. In another possible structure shown in FIG. 43, a ring gear shaft 126E is extended and the power is taken out of the casing 137.

Figure 44:
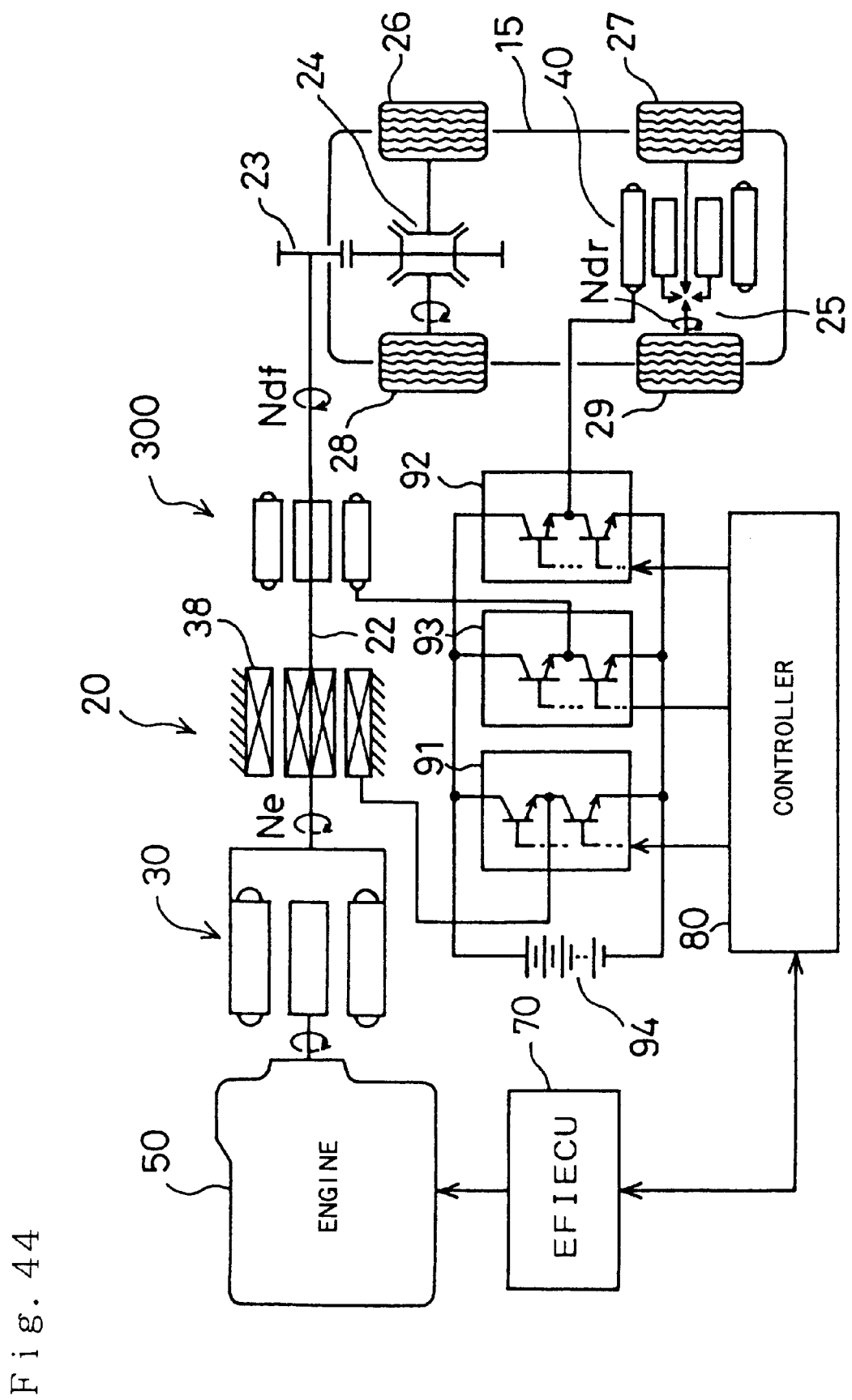
FIG. 44 schematically illustrates the structure of the sixth embodiment applied to the electrical distribution system.
Figure 45:
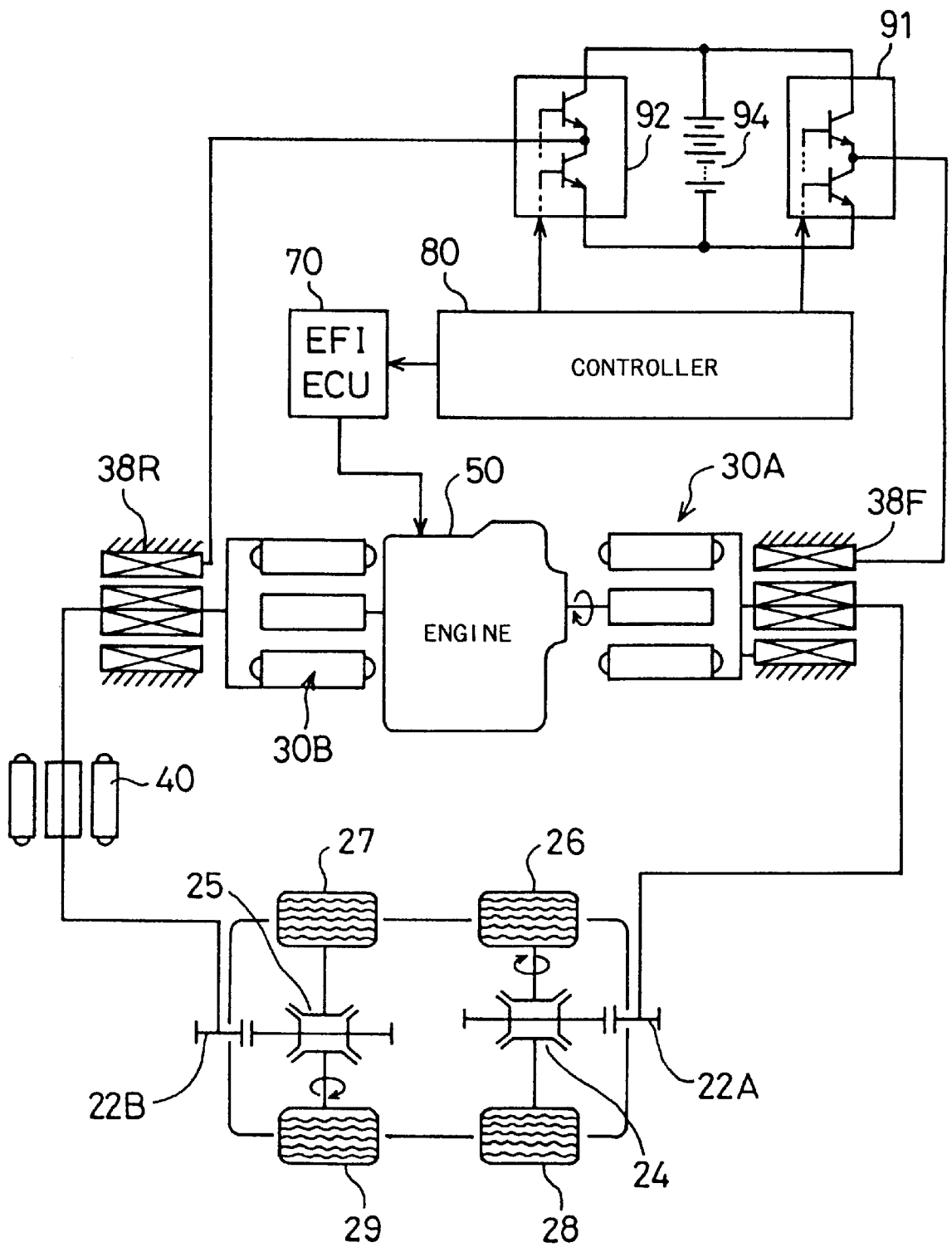
FIG. 45 schematically illustrates another possible structure of the electrical distribution system.

The first through the fourth embodiments based on the electric distribution mechanism also have some modifications. For example, like the sixth and the seventh embodiments, a motor 300 corresponding to the third motor of the present invention as well as the clutch motor 30 may be connected to the axle of the front wheels as shown in FIG. 44. The axle of the front wheels is driven by the power output from both the clutch motor 30 and the motor 300, whereas the axle of the rear wheels is driven by the assist motor 40. In the first embodiment shown in FIG. 1, the assist motor 40 is completely separate from the output shaft of the engine 50. In accordance with another possible structure shown in FIG. 45, two clutch motors 30A and 30B are attached to both ends of the crankshaft 56 of the engine 50. In this case, the assist motor 40 may be linked with the drive shaft 22B, which is the output shaft of the second clutch motor 30B. The positional relationship between the clutch motor 30B and the assist motor 40 may be reversed; that is, the assist motor 40 is directly linked with the crankshaft 56 and the second clutch motor 30B is connected to the output shaft of the assist motor 40.

The gasoline engine driven by means of gasoline is used as the engine 50 in the above embodiments. The principle of the invention is, however, applicable to other internal combustion engines and external combustion engines, such as reciprocating engines including Diesel engines, turbine engines, jet engines, and rotary engines.

Permanent magnet (PM)-type synchronous motors are used for the clutch motor 30 and the assist motor 40 in the above embodiments. Any other motors which can implement both the regenerative operation and the power operation, such as variable reluctance (VR)-type synchronous motors, vernier motors, d.c. motors, induction motors, and superconducting motors, may, however, be used according to the requirements. Stepping motors are also applicable only for the power operation.

In the clutch motor 30, the outer rotor 32 is linked with the crankshaft 56, whereas the inner rotor 34 is connected to the drive shaft 22A. This arrangement may, however, be inverted; that is, the outer rotor 32 is linked with the drive shaft 22A and the inner rotor 34 with the crankshaft 56. A pair of disk-shaped rotors facing each other may be used in place of the outer rotor 32 and the inner rotor 34.

The rotary transformer 38 used in the embodiments as means for transmitting the electric power to the clutch motor 30 may be replaced by a slip ring-brush contact, a slip ring-mercury contact, a semiconductor coupling of magnetic energy, or the like.

Transistor inverters are used for the first and the second driving circuits 91 and 92 of the above embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 94 consisting of the secondary cells in the above embodiments may include Pb cells, NiMH cells, Li cells, or the like cells. A capacitor may be used in place of the battery 94.

In the above discussion, the conversion efficiencies of the constituents including the clutch motor 30, the planetary gear 120, the motors MG1 through MG3, and the transistors Tr1 through Tr16 are set equal to the value '1' (that is, 100%), unless otherwise specified. In the actual state, however, the conversion efficiency is less than the value '1'. In order to realize the final torque distribution, it is accordingly required to make the energy Pe output from the engine 150 a little greater than the energy Pr output to the ring gear shaft 126 or alternatively to make the energy Pr output to the ring gear shaft 126 a little smaller than the energy Pe output from the engine 150. By way of example, the energy Pe output from the engine 150 is determined by multiplying the energy Pr output to the ring gear shaft 126 by the reciprocal of the conversion efficiency. Although the assist motor 40 and the planetary gear 120 lose their energy in the form of heat due to the mechanical friction or the like, the energy loss is extremely small relative to the whole amount of energy. The efficiency of the synchronous motors applied for the motors MG1 and MG2 is actually very close to the value '1'. The ON-state resistance of known transistors, such as GTOs, applicable to the transistors Tr1 through Tr16 is also extremely small. The conversion efficiency of the power is thus close to the value '1' and treated as the value '1' (100%) in the above embodiments as a matter of convenience.

Industrial Applicability

The power transmission apparatus of the present invention is applied to the four-wheel-drive vehicle in the above embodiments. The principle of the invention is, however, applicable to any structures having two output shafts, for example, transportation means like ships and airplanes as well as a variety of industrial machines. The structure of the four-wheel-drive vehicle of the present invention is also applicable to a variety of vehicles, such as automobiles, trucks, special motor vehicles, and off-road vehicles.

What is claimed is:

1. A power transmission apparatus comprising a rotating shaft, to which power output from an engine is transmitted, and transmitting the power input to said rotating shaft from said engine to a first output shaft and a second output shaft, which is different from said first output shaft, said power transmission apparatus comprising:

a first motor related to rotation of said rotating shaft;

distribution means for regulating distribution of the power input to said rotating shaft, power input to and output from said first output shaft in a mechanical form, and power input to and output from said first motor in an electrical form, in such a manner as to balance a total input power with a total output power;

a second motor linked with said second output shaft;

first power control means for controlling the power input to and output from said first motor in the electrical form, thereby varying a driving state of said first motor and controlling the distribution of the power executed in said distribution means; and second power control means for controlling operation of said second motor based on the power input to and output from said first motor in the electrical form by said first power control means, thereby regulating power output to said second output shaft.

2. A power transmission apparatus in accordance with claim 1, said power transmission apparatus further comprising:

a third motor connected with said first output shaft; and third power control means for controlling operation of said third motor, so as to input and output power by said third motor to and from said first output shaft, to and from which said distribution means inputs and outputs the power in the mechanical form.

3. A power transmission apparatus in accordance with claim 1, wherein said first motor comprises a first rotor mechanically linked with a rotating shaft of said engine and a second rotor that is electromagnetically connected with said first rotor so as to rotate relative to said first rotor and is mechanically linked with said first output shaft, thereby constituting said distribution means, said first power control means and said second power control means comprising:

a first motor-driving circuit for controlling electromagnetic connection between said first rotor and said second rotor in said first motor by multi-phase alternating current, so as to enable transmission of electric power between said first motor-driving circuit and said first motor at least in one direction;

a second motor-driving circuit for enabling transmission of electric power between said second motor-driving circuit and said second motor at least in one direction; and power distribution control means for controlling said first motor-driving circuit and said second motor-driving circuit to regulate distribution of the power input to and output from said first output shaft and said second output shaft.

4. A power transmission apparatus in accordance with claim 3, said power transmission apparatus further comprising a storage battery for storing at least part of electric power that is regenerated by either between said first motor and said first motor-driving circuit or between said second motor and said second motor-driving circuit, wherein said power distribution control means controls storage of electric power into said storage battery and discharge of electric power from said storage battery, in addition to the transmission of electric power between said first motor and said first motor-driving circuit and the transmission of electric power between said second motor and said second motor-driving circuit executed through the control of said first motor-driving circuit and said second motor-driving circuit, thereby regulating distribution of the power input to and output from said first output shaft and said second output shaft.

5. A power transmission apparatus in accordance with claim 3, wherein said power distribution control means comprises:

regenerative operation control means for controlling said first motor-driving circuit, thereby enabling electric power corresponding to slip rotation between said first rotor and said second rotor to be regenerated by said first motor via said first motor-driving circuit; and power operation control means for enabling said second motor to carry out power operation via said second motor-driving circuit with at least part of the electric power regenerated by said first motor.

6. A power transmission apparatus in accordance with claim 4, wherein said power distribution control means comprises:

first power operation control means for controlling said first motor-driving circuit, thereby enabling said first motor to carry out power operation by the electric power stored in said storage battery; and second power operation control means for controlling said second motor-driving circuit, thereby enabling said second motor to carry out power operation by the electric power stored in said storage battery.

7. A power transmission apparatus in accordance with claim 1, wherein said distribution means comprises three-shaft power input-output means having three shafts respectively connected to a rotating shaft of said engine, said first output shaft, and a rotating shaft of said first motor, said three-shaft power input-output means determining power input to and output from said shaft connected to said first output shaft, based on powers input to and output from said shaft connected to said rotating shaft of said engine and said shaft connected to said rotating shaft of said first motor, said first power control means and said second power control means comprising:

a first motor-driving circuit for enable transmission of electric power between said first motor-driving circuit and said first motor at least in one direction;

a second motor-driving circuit for enabling transmission of electric power between said second motor-driving circuit and said second motor at least in one direction; and power distribution control means for controlling said first motor-driving circuit and said second motor-driving circuit to regulate distribution of the power input to and output from said first output shaft and said second output shaft.

8. A power transmission apparatus in accordance with claim 7, said power transmission apparatus further comprising a storage battery for storing at least part of electric power that is regenerated by said first motor via said first motor-driving circuit and that is regenerated by said second motor via said second motor-driving circuit, wherein said power distribution control means controls storage of electric power into said storage battery and discharge of electric power from said storage battery, in addition to the transmission of electric power between said first motor and said first motor-driving circuit and the transmission of electric power between said second motor and said second motor-driving circuit executed through the control of said first motor-driving circuit and said second motor-driving circuit, thereby regulating distribution of the power input to and output from said first output shaft and said second output shaft.

9. A power transmission apparatus in accordance with claim 7, wherein said power distribution control means comprises:

regenerative operation control means for controlling said first motor-driving circuit, so as to enable electric power corresponding to a difference between the power input to and output from said rotating shaft of said engine and the power input to and output from said first output shaft to be regenerated by said first motor via said first motor-driving circuit; and power operation control means for enabling said second motor to carry out power operation via said second motor-driving circuit with at least part of the electric power regenerated by said first motor.

10. A power transmission apparatus in accordance with claim 8, wherein said power distribution control means comprises:

first power operation control means for controlling said first motor-driving circuit, thereby enabling said first motor to carry out power operation by the electric power stored in said storage battery; and second power operation control means for controlling said second motor-driving circuit, thereby enabling said second motor to carry out power operation by the electric power stored in said storage battery.

11. A power transmission apparatus in accordance with claim 1, said power transmission apparatus further comprising:

distribution determination means for determining distribution of power into a power allocation output to said first output shaft and a power allocation output to said second output shaft, wherein said first power control means and said second power control means carry out the control by setting the power allocations determined by said distribution determination means to target values.

12. A power transmission apparatus in accordance with claim 2, said power transmission apparatus further comprising:

engine operation means for controlling power of said first motor via said first power control means, thereby enabling said engine to be driven within a desired operation range; and distribution determination means for determining distribution of power into a power allocation output to said first output shaft and a power allocation output to said second output shaft, wherein said third power control means carries out the control by setting the power allocation for said first output shaft determined by said distribution determination means to a target value, and said second power control means carries out the control by setting the power allocation for said second output shaft determined by said distribution determination means to a target value.

13. A power transmission apparatus in accordance with claim 12, wherein said first motor comprises a first rotor mechanically linked with a rotating shaft of said engine and a second rotor that is electromagnetically connected with said first rotor so as to rotate relative to said first rotor and is mechanically linked with said first output shaft, thereby constituting said distribution means.

14. A power transmission apparatus in accordance with claim 12, wherein said distribution means comprises three-shaft power input-output means having three shafts respectively connected to a rotating shaft of said engine, said first output shaft, and a rotating shaft of said first motor, said three-shaft power input-output means determining power input to and output from said shaft connected to said first output shaft, based on powers input to and output from said shaft connected to said rotating shaft of said engine and said shaft connected to said rotating shaft of said first motor.

15. A power transmission apparatus in accordance with claim 1, wherein each said motor is a synchronous motor rotated by interaction between a revolving magnetic field formed by multi-phase alternating current and a magnetic field formed by a permanent magnet.

16. A power transmission apparatus for transmitting mechanical energy output from an engine via a rotating shaft to a first motor and enabling part of the transmitted mechanical energy to be and taken out as electrical energy by said first motor, the residual mechanical energy being output to a first output shaft while at least part of the electrical energy taken out of said first motor being used to drive a second motor and being output to a second output shaft, which is different from said first output shaft, distribution of the mechanical energy transmitted to said first motor and the electrical energy taken out of said first motor being controlled to regulate power allocations output to said first output shaft and said second output shaft to target magnitudes respectively.

17. A four-wheel-drive vehicle for transmitting power independently to a first axle and a second axle of said vehicle, said four-wheel-drive vehicle comprising:

an engine having a rotating shaft, from which power is taken out, said engine rotating said rotating shaft;

a first motor related to rotation of said rotating shaft;

distribution means for regulating distribution of power input to said rotating shaft, power input to and output from said first axle in a mechanical form and power input to and output from said first motor in an electrical form, in such a manner as to balance a total input power with a total output power;

a second motor linked with said second axle;

first power control means for controlling the power input to and output from said first motor in the electrical form, thereby varying a driving state of said first motor and controlling the distribution of the power executed in said distribution means; and second power control means for controlling operation of said second motor based on the power input to and output from said first motor in the electrical form by said first power control means, thereby regulating power output to said second axle.

18. A four-wheel-drive vehicle in accordance with claim 17, said four-wheel-drive vehicle further comprising:

a third motor connected with said first axle; and third power control means for controlling operation of said third motor, so as to input and output power by said third motor to and from said first axle, to and from which said distribution means inputs and outputs the power in the mechanical form.

19. A four-wheel-drive vehicle in accordance with claim 17, wherein said first motor comprises a first rotor mechanically linked with said rotating shaft of said engine and a second rotor that is electromagnetically connected with said first rotor so as to rotate relative to said first rotor and is mechanically linked with said first axle, thereby constituting said distribution means, said first power control means and said second power control means comprising:

a first motor-driving circuit for controlling electromagnetic connection between said first rotor and said second rotor in said first motor by multi-phase alternating current, so as to enable transmission of electric power between said first motor-driving circuit and said first motor at least in one direction;

a second motor-driving circuit for enabling transmission of electric power between said second motor-driving circuit and said second motor at least in one direction; and power distribution control means for controlling said first motor-driving circuit and said second motor-driving circuit, so as to output the power of said engine to said first axle and said second axle at a predetermined distribution ratio.

20. A four-wheel-drive vehicle in accordance with claim 19, said four-wheel-drive vehicle further comprising a storage battery for storing at least part of electric power that is regenerated by either between said first motor and said first motor-driving circuit or between said second motor and said second motor-driving circuit, wherein said power distribution control means controls storage of electric power into said storage battery and discharge of electric power from said storage battery, in addition to the transmission of electric power between said first motor and said first motor-driving circuit and the transmission of electric power between said second motor and said second motor-driving circuit executed through the control of said first motor-driving circuit and said second motor-driving circuit, thereby regulating distribution of the power input to and output from said first axle and said second axle.

21. A four-wheel-drive vehicle in accordance with claim 19, wherein said power distribution control means comprises:
regenerative operation control means for controlling said first motor-driving circuit, thereby enabling electric power corresponding to slip rotation between said first rotor and said second rotor to be regenerated by said first motor via said first motor-driving circuit; and
power operation control means for enabling said second motor to carry out power operation via said second motor-driving circuit with at least part of the electric power regenerated by said first motor.

22. A four-wheel-drive vehicle in accordance with either claim 19, wherein said power distribution control means comprises:
regenerative operation control means for controlling said second motor-driving circuit, thereby enabling electric power to be regenerated by said second motor driven by rotation of said second axle; and
power operation control means for enabling said first motor to carry out power operation via said first motor-driving circuit with at least part of the electric power regenerated by said second motor.

23. A four-wheel-drive vehicle in accordance with claim 20, wherein said power distribution control means comprises:
first regenerative operation control means for controlling said first motor-driving circuit, thereby enabling electric power corresponding to slip rotation between said first rotor and said second rotor to be regenerated by said first motor via said first motor-driving circuit; and
second regenerative operation control means for controlling said second motor-driving circuit, thereby enabling electric power to be regenerated by said second motor driven by rotation of said second axle,
at least part of the regenerated electric power being stored into said storage battery.

24. A four-wheel-drive vehicle in accordance with claim 20, wherein said power distribution control means comprises:
first power operation control means for controlling said first motor-driving circuit, thereby enabling said first motor to carry out power operation by the electric power stored in said storage battery; and
second power operation control means for controlling said second motor-driving circuit, thereby enabling said second motor to carry out power operation by the electric power stored in said storage battery.

25. A four-wheel-drive vehicle in accordance with claim 17, wherein said distribution means comprises three-shaft power input-output means having three shafts respectively connected to said rotating shaft of said engine, said first axle, and a rotating shaft of said first motor, said three-shaft power input-output means determining power input to and output from said shaft connected to said first axle, based on powers input to and output from said shaft connected to said rotating shaft of said engine and said shaft connected to said rotating shaft of said first motor,
said first power control means and said second power control means comprising:
a first motor-driving circuit for enabling transmission of electric power between said first motor-driving circuit and said first motor at least in one direction;
a second motor-driving circuit for enabling transmission of electric power between said second motor-driving circuit and said second motor at least in one direction; and
power distribution control means for controlling said first motor-driving circuit and said second motor-driving circuit to regulate distribution of the power input to and output from said first axle and said second axle.

26. A four-wheel-drive vehicle in accordance with claim 25, said four-wheel-drive vehicle further comprising a storage battery for storing at least part of electric power that is regenerated by said first motor via said first motor-driving circuit and that is regenerated by said second motor via said second motor-driving circuit,
wherein said power distribution control means controls storage of electric power into said storage battery and discharge of electric power from said storage battery, in addition to the transmission of electric power between said first motor and said first motor-driving circuit and the transmission of electric power between said second motor and said second motor-driving circuit executed through the control of said first motor-driving circuit and said second motor-driving circuit, thereby regulating distribution of the power input to and output from said first axle and said second axle.

27. A four-wheel-drive vehicle in accordance with claim 25, wherein said power distribution control means comprises:
regenerative operation control means for controlling said first motor-driving circuit, so as to enable electric power corresponding to a difference between the power input to and output from said rotating shaft of said engine and the power input to and output from said first axle to be regenerated by said first motor via said first motor-driving circuit; and
power operation control means for enabling said second motor to carry out power operation via said second motor-driving circuit with at least part of the electric power regenerated by said first motor.

28. A four-wheel-drive vehicle in accordance with claim 25, wherein said power distribution control means comprises:
regenerative operation control means for controlling said second motor-driving circuit, thereby enabling electric power to be regenerated by said second motor driven by rotation of said second axle; and
power operation control means for enabling said first motor to carry out power operation via said first motor-driving circuit with at least part of the electric power regenerated by said second motor.

29. A four-wheel-drive vehicle in accordance with claim 26, wherein said power distribution control means comprises:
first regenerative operation control means for controlling said first motor-driving circuit, so as to enable electric power corresponding to a difference between the power input to and output from said rotating shaft of said engine and the power input to and output from said first axle to be regenerated by said first motor via said first motor-driving circuit,
second regenerative operation control means for controlling said second motor-driving circuit, thereby enabling electric power to be regenerated by said second motor driven by rotation of said second axle; and
means for storing at least part of the regenerated electric power into said storage battery.

30. A four-wheel-drive vehicle in accordance with claim 26, wherein said power distribution control means utilizes the electric power stored in said storage battery and comprises:

first power operation control means for controlling said first motor-driving circuit, thereby enabling said first motor to carry out power operation; and second power operation control means for controlling said second motor-driving circuit, thereby enabling said second motor to carry out power operation.

31. A four-wheel-drive vehicle in accordance with any claim 17, said four-wheel-drive vehicle further comprising:

distribution determination means for determining distribution of power into a power allocation output to said first axle and a power allocation output to said second axle, wherein said first power control means carries out the control by setting the distribution of power determined by said distribution determination means to a target value.

32. A four-wheel-drive vehicle in accordance with claim 18, said four-wheel-drive vehicle further comprising:

engine operation means for controlling power of said first motor via said first power control means, thereby enabling said engine to be driven within a desired operation range; and distribution determination means for determining distribution of power into a power allocation output to said first axle and a power allocation output to said second axle, wherein said third power control means carries out the control by setting the power allocation for said first axle determined by said distribution determination means to a target value, and said second power control means carries out the control by setting the power allocation for said second axle determined by said distribution determination means to a target value.

33. A four-wheel-drive vehicle in accordance with claim 32, wherein said first motor comprises a first rotor mechanically linked with said rotating shaft of said engine and a second rotor that is electromagnetically connected with said first rotor so as to rotate relative to said first rotor and is mechanically linked with said first axle, thereby constituting said distribution means.

34. A four-wheel-drive vehicle in accordance with claim 32, wherein said distribution means comprises three-shaft power input-output means having three shafts respectively connected to said rotating shaft of said engine, said first axle, and a rotating shaft of said first motor, said three-shaft power input-output means determining power input to and output from said shaft connected to said first axle, based on powers input to and output from said shaft connected to said rotating shaft of said engine and said shaft connected to said rotating shaft of said first motor.

35. A four-wheel-drive vehicle for transmitting mechanical energy output from an engine via a rotating shaft to a first motor and enabling part of the transmitted mechanical energy to be converted to and taken out as electrical energy by said first motor, the residual mechanical energy being output to a first axle while at least part of the electrical energy taken out of said first motor being used to drive a second motor and being output to a second axle, distribution of the mechanical energy transmitted to said first motor and the electrical energy taken out of said first motor being controlled to regulate power allocations output to said first axle and said second axle to predetermined magnitudes.

36. A four-wheel-drive vehicle comprising a power transmission apparatus for transmitting power of an engine to a first axle of said vehicle and a second axle, which is not in direct mechanical connection with said first axle, said four-wheel-drive vehicle comprising:

said engine having a rotating shaft for outputting the power, said engine rotating said rotating shaft;

a first motor comprising a first rotor mechanically linked with said rotating shaft of said engine and a second rotor electromagnetically connected with said first rotor so as to rotate relative to said first rotor, said second rotor being mechanically linked with said first axle;

a first motor-driving circuit for controlling electromagnetic connection between said first rotor and said second rotor in said first motor by multi-phase alternating current, so as to enable transmission of electric power between said first motor-driving circuit and said first motor at least in one direction;

a second motor comprising a third rotor mechanically linked with another rotating shaft of said engine and a fourth rotor electromagnetically connected with said third rotor so as to rotate relative to said third rotor, said fourth rotor being mechanically linked with said second axle;

a second motor-driving circuit for controlling electromagnetic connection between said third rotor and said fourth rotor in said second motor by multi-phase alternating current, so as to enable transmission of electric power between said second motor-driving circuit and said second motor at least in one direction; and power distribution control means for controlling said first motor-driving circuit and said second motor-driving circuit, thereby enabling the power of said engine to be output to said first axle and said second axle at a predetermined distribution ratio.

37. A four-wheel-drive vehicle in accordance with claim 36, said four-wheel-drive vehicle further comprising a storage battery for storing at least part of electric power that is regenerated by either between said first motor and said first motor-driving circuit or between said second motor and said second motor-driving circuit, wherein said power distribution control means comprises storage battery control means for controlling storage of electric power into said storage battery and/or discharge of electric power from said storage battery, in addition to regeneration and consumption of electric power through the control of said first motor-driving circuit and said second motor-driving circuit.

38. A four-wheel-drive vehicle comprising a power transmission apparatus for transmitting power of an engine to a first axle and a second axle of said vehicle, said four-wheel-drive vehicle comprising:

said engine having a rotating shaft for outputting the power, said engine rotating said rotating shaft;

a first motor comprising a first rotor mechanically linked with said rotating shaft of said engine and a second rotor electromagnetically connected with said first rotor so as to rotate relative to said first rotor, said second rotor being mechanically linked with said first axle;

a first motor-driving circuit for controlling electromagnetic connection between said first rotor and said second rotor in said first motor by multi-phase alternating current, so as to enable transmission of electric power between said first motor-driving circuit and said first motor at least in one direction;

a second motor linked with said second axle, which is not in direct mechanical connection with said first axle;

a second motor-driving circuit for enabling transmission of electric power between said second motor-driving circuit and said second motor at least in one direction; and braking force control means for controlling said first motor-driving circuit and said second motor-driving circuit, thereby giving a braking torque to said first axle and/or said second axle.

39. A method of controlling distribution of power input from an engine via a rotating shaft into a power allocation input to and output from a first output shaft connected to a first motor and a power allocation input to and output from a second output shaft which is different from said first output shaft and linked with a second motor, said method comprising the steps of:

providing distribution means for regulating distribution of the power input to said rotating shaft, the power input to and output from said first output shaft in a mechanical form, and power input to and output from said first motor in an electrical form, in such a manner as to balance a total input power with a total output power;

controlling the power input to and output from said first motor in the electrical form, thereby varying a driving state of said first motor and controlling the distribution of the power executed in said distribution means; and controlling operation of said second motor based on the power input to and output from said first motor in the electrical form through the operation of said distribution means, thereby regulating the power output to said second output shaft.

40. A method of controlling four-wheel-drive, said method controlling distribution of power input from an engine via a rotating shaft into a power allocation input to and output from a first axle connected to a first motor and a power allocation input to and output from a second axle which is different from said first axle and linked with a second motor, said method comprising the steps of:

providing distribution means for regulating distribution of the power input to said rotating shaft, the power input to and output from said first axle in a mechanical form, and power input to and output from said first motor in an electrical form, in such a manner as to balance a total input power with a total output power;

controlling the power input to and output from said first motor in the electrical form, thereby varying a driving state of said first motor and controlling the distribution of the power executed in said distribution means; and controlling operation of said second motor based on the power input to and output from said first motor in the electrical form through the operation of said distribution means, thereby regulating the power output to said second axle.

* * * * *